United States Patent
Sung et al.

(10) Patent No.: US 11,479,566 B1
(45) Date of Patent: Oct. 25, 2022

(54) COMPOUND AND COLOR CONVERSION FILM COMPRISING SAME

(71) Applicant: LG CHEM, LTD., Seoul (KR)

(72) Inventors: Jiyeon Sung, Daejeon (KR); Dyu Hieu Le, Daejeon (KR); Hoyong Lee, Daejeon (KR); Sang Pil Moon, Daejeon (KR); Hye Mi Oh, Daejeon (KR); Nari Kim, Daejeon (KR); Dong Mok Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 691 days.

(21) Appl. No.: 16/326,617

(22) PCT Filed: Sep. 1, 2017

(86) PCT No.: PCT/KR2017/009604
§ 371 (c)(1),
(2) Date: Feb. 19, 2019

(87) PCT Pub. No.: WO2018/044120
PCT Pub. Date: Mar. 8, 2018

(30) Foreign Application Priority Data

Sep. 2, 2016 (KR) .................. 10-2016-0113374
Aug. 31, 2017 (KR) .................. 10-2017-0110559

(51) Int. Cl.
| C07F 5/02 | (2006.01) |
| F21V 8/00 | (2006.01) |
| G02F 1/13357 | (2006.01) |

(52) U.S. Cl.
CPC .............. *C07F 5/022* (2013.01); *G02B 6/005* (2013.01); *G02F 1/133603* (2013.01)

(58) Field of Classification Search
CPC ..................................................... C07F 5/022
See application file for complete search history.

(56) References Cited

U.S. PATENT DOCUMENTS

| 6,001,999 | A | 12/1999 | Wolfbeis et al. |
| 9,616,140 | B2 * | 4/2017 | Pinchuk ............ A61K 49/0032 |
| 10,544,166 | B2 * | 1/2020 | Lee ........................... F21K 9/64 |
| 10,703,768 | B2 * | 7/2020 | Sung ....................... C07F 5/022 |
| 11,091,503 | B2 * | 8/2021 | Moon ..................... C09K 11/06 |
| 2016/0230961 | A1 | 8/2016 | Seo et al. |
| 2017/0088771 | A1 | 3/2017 | Harding et al. |
| 2017/0260212 | A1 | 9/2017 | Lee et al. |
| 2017/0349822 | A1 | 12/2017 | Lee et al. |

FOREIGN PATENT DOCUMENTS

| CN | 102492306 A | 6/2012 |
| JP | 11-176572 A | 7/1999 |
| JP | 2011-241160 A | 12/2011 |
| JP | 4947142 B2 | 3/2012 |
| JP | 2014-527645 A | 10/2014 |
| JP | 2016-006033 A | 1/2016 |
| KR | 10-2014-0063435 A | 5/2014 |
| KR | 10-2016-0097146 A | 8/2016 |
| WO | 2016-108411 A1 | 7/2016 |
| WO | 2016-122117 A1 | 8/2016 |

OTHER PUBLICATIONS

Kim et al (2012): STN International HCAPLUS database, (Columbus, Ohio), Accession No. 2012: 310000.*
Flores-Rizo, et al., "8-Alkoxy- and 8-Aryloxy-BODIPYs: Straightforward Fluorescent Tagging of Alcohols and Phenols", J. Org. Chem., 2013, vol. 78, pp. 5867-5877.
Wang, et al., "Synthesis and Transformations of 5-Chloro-2,2'-Dipyrrins and Their Boron Complexes, 8-Chloro-BODIPYs", Chem. Eur. J., 2014, vol. 20, pp. 5064-5074.
Noël Boens, et al., "8-HaloBODIPYs and Their 8-(C, N, O, S) Substituted Analogues: Solvent Dependent UV-Vis Spectroscopy, Variable Temperature NMR, Crystal Structure Determination, and Quantum Chemical Calculations", The Journal of Physics Chemistry, 2014, 118, (9), pp. 1576-1594.
International Search Report issued for International Application PCT/KR2017/009604 dated Dec. 7, 2017, 10 pages.
Goud, et al., "Synthesis of 8-heteroatom-substituted 4,4-difluoro-4-bora-3a, 4a-diaza-s-indacene dyes (BODIPY)", Tetrahedron, vol. 62, pp. 5084-5091, 2006.
Gómez-Infante et al., "Synthesis, Properties, and Functionalization of Nonsymmetric 8-MethylthioBODIPYs", Eur. J. Org. Chem. pp. 5009-5523, Aug. 19, 2016.
Bacalum et al., "A Blue-Light-Emitting BODIPY Probe for Lipid Membranes", Langmuir, vol. 32, pp. 3495-3505, Mar. 22, 2016.
Verbelen, et al., "Radical C—H Alkylation of BODIPY Dyes Using Potassium Trifluoroborates or Boronic Acids", Chemistry—A European Journal, 2015, 21(36), p. 12667-12675.
Zhao et al., "Synthesis of 3,8-Dichloro-6-ethyl-1,2,5,7-tetramethyl-BODIPY from an Asymmetric Dipyrroketone and Reactivity Studies at the 3,5,8-Positions", Chemistry—A European Journal, 2015,21(16), p. 6181-6192.
Roacho et al., "Unprecedented one-pot sequential thiolate substitutions under mild conditions leading to a red emissive BODIPY dye 3,5,8-tris(PhS)-BODIPY", Organic & Biomolecular Chemistry, 2015, 13(4), p. 995-999.
Leen, et al., "Synthesis of Meso-Halogenated BODIPYs and Access to Meso-Substituted Analogues", Organic Letters, 2012, 14(24), p. 6150-6153.

* cited by examiner

*Primary Examiner* — Golam M Shameem
(74) *Attorney, Agent, or Firm* — Rothwell, Figg, Ernst & Manbeck, P.C.

(57) ABSTRACT

The present specification relates to a compound, and a color conversion film, a backlight unit, and a display device, including the same.

4 Claims, 1 Drawing Sheet

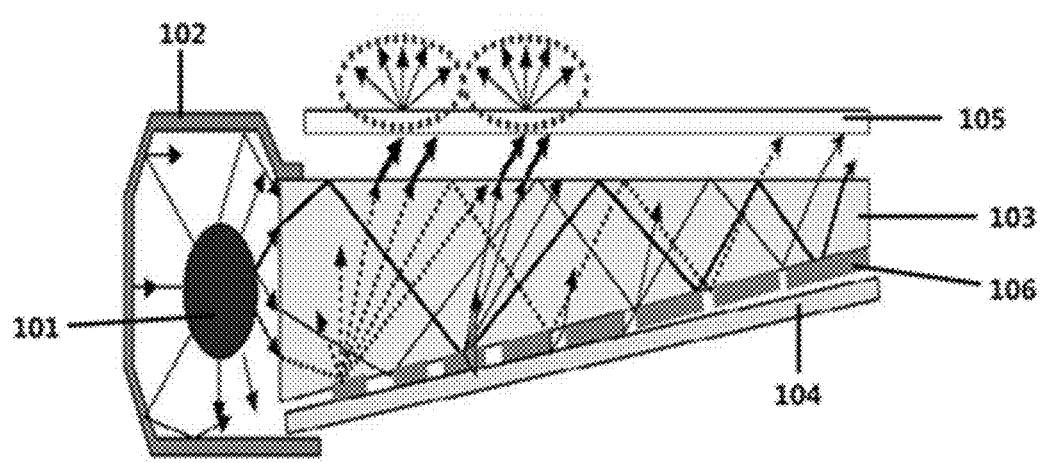

COMPOUND AND COLOR CONVERSION FILM COMPRISING SAME

TECHNICAL FIELD

This application is a 35 U.S.C. § 371 National Phase Entry Application from PCT/KR2017/009604, filed on Sep. 1, 2017, and designating the United States, which claims priority to and the benefit of Korean Patent Application Nos. 10-2016-0113374 and 10-2017-0110559 filed in the Korean Intellectual Property Office on Sep. 2, 2016 and Aug. 31, 2017, respectively, the entire contents of which are incorporated herein by reference.

The present specification relates to a compound, and a color conversion film, a backlight unit, and a display device including the same.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the deterioration in the color gamut and reduce the production costs, methods of implementing green and red colors have been recently attempted by using a method of producing a quantum dot in the form of a film and combining the same with a blue LED. However, cadmium-based quantum dots have safety problems, and the other quantum dots have much lower efficiencies than those of the cadmium-based quantum dots. Further, quantum dots have low stability against oxygen and water, and have a disadvantage in that the performance thereof significantly deteriorates when the quantum dots are aggregated. In addition, when quantum dots are produced, it is difficult to constantly maintain the size thereof, and thus, the production cost is high.

DETAILED DESCRIPTION OF THE INVENTION

Technical Problem

The present specification provides a compound, and a color conversion film, a backlight unit, and a display device including the same.

Technical Solution

An exemplary embodiment of the present specification provides a compound represented by the following Chemical Formula 1.

[Chemical Formula 1]

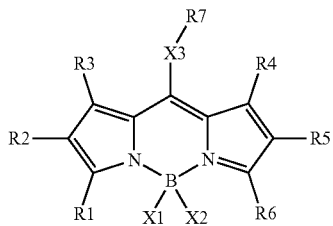

In Chemical Formula 1,

X1 and X2 are the same as or different from each other, and are each independently a halogen group; a nitrile group; a substituted or unsubstituted ester group; a substituted or unsubstituted alkyl group; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heterocyclic group, X3 is O or S, R1 to R6 are the same as or different from each other, and are each independently hydrogen; deuterium; a halogen group; a nitrile group; a nitro group; a hydroxy group; a carbonyl group; a substituted or unsubstituted ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; a substituted or unsubstituted coumarin group; a substituted or unsubstituted sulfonic acid group; or a substituted or unsubstituted heterocyclic group, and R7 is hydrogen; deuterium; a halogen group; a nitrile group; a nitro group; a hydroxy group; a carbonyl group; a substituted or unsubstituted ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heterocyclic group.

Another exemplary embodiment of the present specification provides a color conversion film including: a resin matrix; and the compound which is dispersed in the resin matrix.

Still another exemplary embodiment of the present specification provides a backlight unit including the color conversion film.

Yet another exemplary embodiment of the present specification provides a display device including the backlight unit.

Advantageous Effects

A metal complex according to an exemplary embodiment of the present specification, that is, the compound represented by Chemical Formula 1 has high fluorescence efficiency, is stable to water or oxygen, and has a lower production unit cost than quantum dots. Therefore, by using the compound represented by Chemical Formula 1, which is described in the present specification, as a fluorescent material of a color conversion film, it is possible to provide a color conversion film which has excellent brightness and color gamut, a simple production process, and a low manufacturing cost.

BRIEF DESCRIPTION OF DRAWINGS

FIG. 1 is a schematic view in which a color conversion film according to an exemplary embodiment of the present specification is applied to a backlight unit.
101: Side chain-type light source
102: Reflective plate
103: Light guide plate
104: Reflective layer
105: Color conversion film
106: Light dispersion pattern

BEST MODE

Hereinafter, the present specification will be described in more detail.

A color conversion film according to an exemplary embodiment of the present specification provides the compound represented by Chemical Formula 1.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

In the present specification, examples of the substituent will be described below, but are not limited thereto.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of deuterium; a halogen group; a nitrile group; a nitro group; an imide group; an amide group; a carbonyl group; an ester group; an ether group; a hydroxy group; a coumarin group; an alkyl group; a cycloalkyl group; an alkoxy group; a substituted or unsubstituted aryloxy group; an alkylthioxy group; an arylthioxy group; an alkylsulfoxy group; a substituted or unsubstituted arylsulfoxy group; an alkenyl group; a silyl group; a boron group; an amine group; an arylphosphine group; a phosphine oxide group; an aryl group; a sulfonic acid group; and a heterocyclic group, or being substituted with a substituent to which two or more substituents among the exemplified substituents are linked or having no substituent. For example, "the substituent to which two or more substituents are linked" may be a biphenyl group. That is, the biphenyl group may also be an aryl group, and may be interpreted as a substituent to which two phenyl groups are linked.

In the present specification,

means a moiety bonded to another substituent or a bonding portion.

In the present specification, a halogen group may be fluorine, chlorine, bromine, or iodine.

In the present specification, the number of carbon atoms of an imide group is not particularly limited, but is preferably 1 to 30. Specifically, the imide group may be a compound having the following structures, but is not limited thereto.

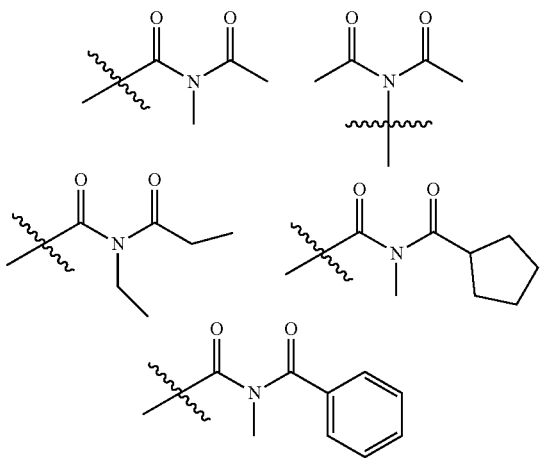

In the present specification, for an amide group, the nitrogen of the amide group may be substituted with hydrogen, a straight, branched, or cyclic alkyl group having 1 to 30 carbon atoms, or an aryl group having 6 to 30 carbon atoms. Specifically, the amide group may be a compound having the following structural formulae, but is not limited thereto.

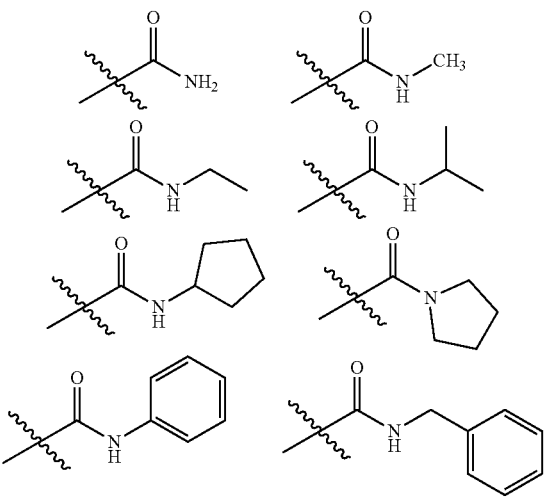

In the present specification, the number of carbon atoms of a carbonyl group is not particularly limited, but is preferably 1 to 30. Specifically, the carbonyl group may be a compound having the following structures, but is not limited thereto.

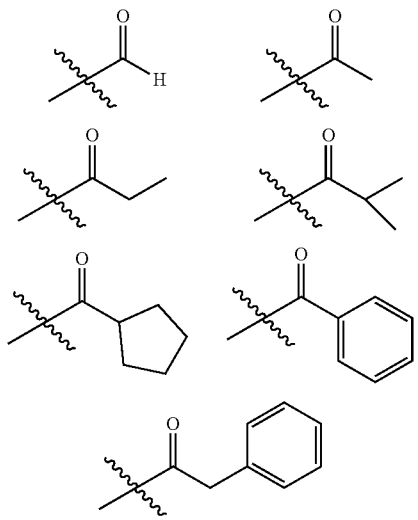

In the present specification, for an ester group, the oxygen of the ester group may be substituted with a straight, branched, or cyclic alkyl group having 1 to 25 carbon atoms, or an aryl group having 6 to 30 carbon atoms. Specifically, the ester group may be a compound having the following structural formulae, but is not limited thereto.

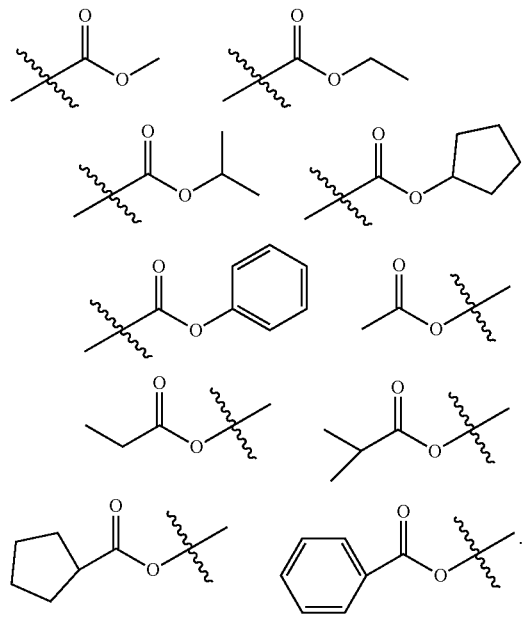

In the present specification, for an ether group, the oxygen of the ether group may be substituted with a straight, branched, or cyclic alkyl group having 1 to 25 carbon atoms, or an aryl group having 6 to 30 carbon atoms. Specifically, the ether group may be a compound having the following structural formulae, but is not limited thereto.

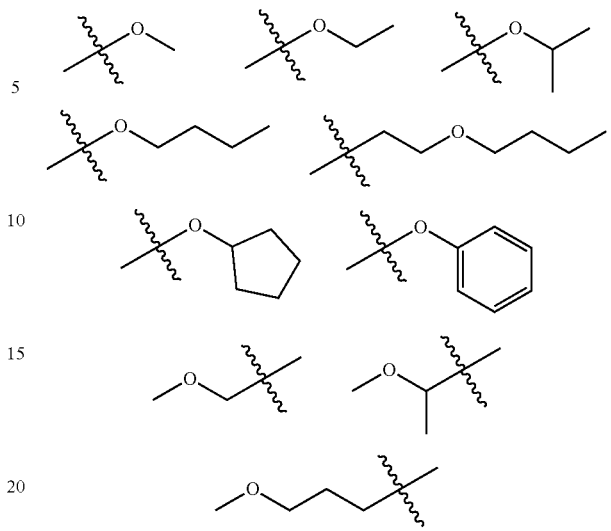

In the present specification, for a coumarin group, the carbon of the coumarin group may be substituted with a halogen group; a nitrile group; a straight, branched, or cyclic alkyl group having 1 to 25 carbon atoms; an amine group; a straight or branched alkoxy group having 1 to 25 carbon atoms; or an aryl group having 6 to 30 carbon atoms. Specifically, the coumarin group may be a compound having the following structural formulae, but is not limited thereto.

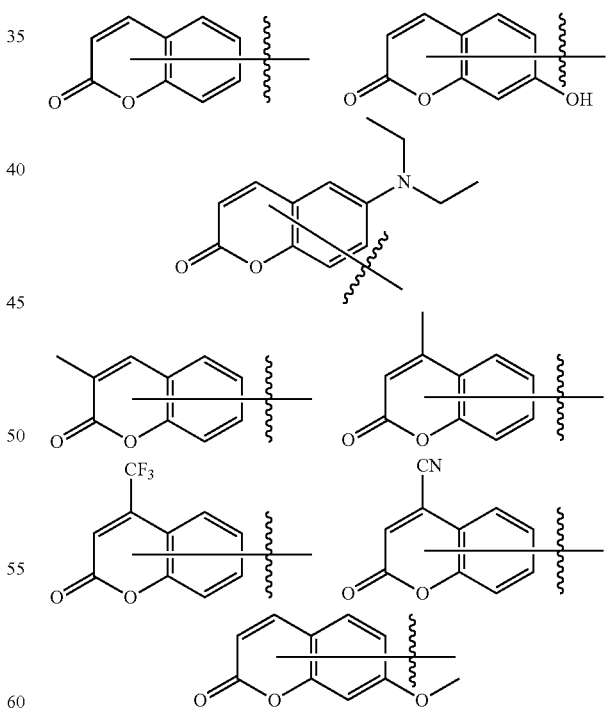

In the present specification, a sulfonic acid group means a group represented by the following Chemical Formula, and at this time, $R_{100}$ is hydrogen; a halogen group; a substituted or unsubstituted alkyl group; or a substituted or unsubstituted aryl group.

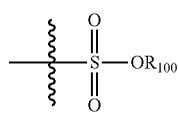

In the present specification, the alkyl group may be straight or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 4-methylhexyl, 5-methylhexyl, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkoxy group may be straight, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, an amine group may be selected from the group consisting of —$NH_2$; a monoalkylamine group; a dialkylamine group; an N-alkylarylamine group; a monoarylamine group; a diarylamine group; an N-arylheteroarylamine group; an N-alkylheteroarylamine group, a monoheteroarylamine group, and a diheteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenylterphenylamine group, an N-phenanthrenylfluorenylamine group, an N-biphenylfluorenylamine group, and the like, but are not limited thereto.

In the present specification, an N-alkylarylamine group means an amine group in which N of the amine group are substituted with an alkyl group and an aryl group.

In the present specification, an N-arylheteroarylamine group means an amine group in which N of the amine group are substituted with an aryl group and a heteroaryl group.

In the present specification, an N-alkylheteroarylamine group means an amine group in which N of the amine group are substituted with an alkyl group and a heteroaryl group.

In the present specification, the alkyl group in the alkylamine group, the N-alkylarylamine group, the alkylthioxy group, the alkylsulfoxy group, and the N-alkylheteroarylamine group is the same as the above-described examples of the alkyl group. Specifically, examples of the alkylthioxy group include a methylthioxy group, an ethylthioxy group, a tert-butylthioxy group, a hexylthioxy group, an octylthioxy group, and the like, and examples of the alkylsulfoxy group include methyl, an ethylsulfoxy group, a propylsulfoxy group, a butylsulfoxy group, and the like, but the examples are not limited thereto.

In the present specification, the alkenyl group may be straight or branched, and the number of carbon atoms thereof is not particularly limited, but is preferably 2 to 30. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the alkynyl group may be straight or branched, and the number of carbon atoms thereof is not particularly limited, but is preferably 2 to 30. Specific examples thereof include an alkynyl group such as ethynyl, propynyl, 2-methyl-2-propynyl, 2-butynyl, and 2-pentynyl, and the like, but are not limited thereto.

In the present specification, specific examples of a silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, and the like, but are not limited thereto.

In the present specification, a boron group may be —$BR_{100}R_{101}$, and $R_{100}$ and $R_{101}$ are the same as or different from each other, and may be each independently selected from the group consisting of hydrogen; deuterium; halogen; a nitrile group; a substituted or unsubstituted monocyclic or polycyclic cycloalkyl group having 3 to 30 carbon atoms; a substituted or unsubstituted straight or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, specific examples of a phosphine oxide group include a diphenylphosphine oxide group, dinaphthylphosphine oxide, and the like, but are not limited thereto.

In the present specification, an aryl group is not particularly limited, but has preferably 6 to 30 carbon atoms, and the aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a perylenyl group, a chrysenyl group, a fluorenyl group, and the like, but are not limited thereto.

In the present specification, the fluorenyl group may be substituted, and adjacent substituents may be bonded to each other to form a ring.

When the fluorenyl group is substituted, the fluorenyl group may be

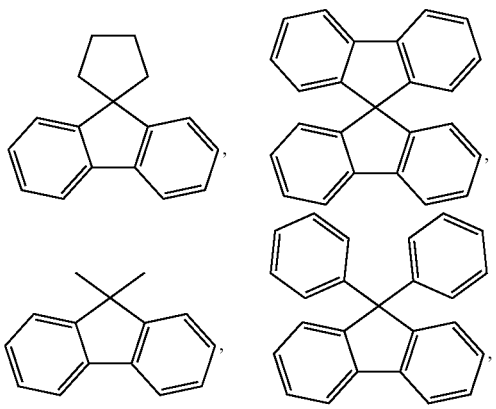

and the like. However, the fluorenyl group is not limited thereto.

In the present specification, the "adjacent" group may mean a substituent substituted with an atom directly linked to an atom in which the corresponding substituent is substituted, a substituent disposed sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present specification, the aryl group in the aryloxy group, the arylthioxy group, the arylsulfoxy group, the N-arylalkylamine group, the N-arylheteroarylamine group, and the arylphosphine group is the same as the above-described examples of the aryl group. Specifically, examples of the aryloxy group include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, examples of an arylamine group include a substituted or unsubstituted monoarylamine group, a substituted or unsubstituted diarylamine group, or a substituted or unsubstituted triarylamine group. The aryl group in the arylamine group may be a monocyclic aryl group or a polycyclic aryl group. The arylamine group including two or more aryl groups may include a monocyclic aryl group, a polycyclic aryl group, or both a monocyclic aryl group and a polycyclic aryl group. For example, the aryl group in the arylamine group may be selected from the above-described examples of the aryl group.

In the present specification, a heteroaryl group includes one or more atoms other than carbon, that is, one or more heteroatoms, and specifically, the heteroatom may include one or more atoms selected from the group consisting of O, N, Se, and S, and the like. The number of carbon atoms thereof is not particularly limited, but is preferably 2 to 30, and the heteroaryl group may be monocyclic or polycyclic. Examples of a heteroaryl group include a thiophene group, a furanyl group, a pyrrole group, an imidazolyl group, a triazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a phenothiazinyl group, a dibenzofuranyl group, and the like, but are not limited thereto.

In the present specification, examples of the heteroarylamine group include a substituted or unsubstituted monoheteroarylamine group, a substituted or unsubstituted diheteroarylamine group, or a substituted or unsubstituted triheteroarylamine group. The heteroarylamine group including two or more heteroaryl groups may include a monocyclic heteroaryl group, a polycyclic heteroaryl group, or both a monocyclic heteroaryl group and a polycyclic heteroaryl group. For example, the heteroaryl group in the heteroarylamine group may be selected from the above-described examples of the heteroaryl group.

In the present specification, examples of the heteroaryl group in the N-arylheteroarylamine group and the N-alkylheteroarylamine group are the same as the above-described examples of the heteroaryl group.

In the present specification, in a substituted or unsubstituted ring formed by bonding adjacent groups, the "ring" means a substituted or unsubstituted hydrocarbon ring; or a substituted or unsubstituted hetero ring.

In the present specification, a hydrocarbon ring may be an aromatic ring, an aliphatic ring, or a fused ring of the aromatic ring and the aliphatic ring, and may be selected from the examples of the cycloalkyl group or the aryl group, except for the hydrocarbon ring which is not monovalent.

In the present specification, an aromatic ring may be monocyclic or polycyclic, and may be selected from the examples of the aryl group, except for the aromatic ring which is not monovalent.

In the present specification, a hetero ring includes one or more atoms other than carbon, that is, one or more heteroatoms, and specifically, the heteroatom may include one or more atoms selected from the group consisting of O, N, Se, and S, and the like. The hetero ring may be monocyclic or polycyclic, may be an aromatic ring, an aliphatic ring, or a fused ring of the aromatic ring and the aliphatic ring, and may be selected from the examples of the heteroaryl group.

In an exemplary embodiment of the present specification, when R1 to R6 are all hydrogen, X1 and X2 are the same as or different from each other, and may be each independently a nitrile group; a substituted or unsubstituted alkyl group; a substituted or unsubstituted alkoxy group; a substituted or unsubstituted ester group; a substituted or unsubstituted alkenyl group; a substituted or unsubstituted alkynyl group;

a substituted or unsubstituted aryl group; a substituted or unsubstituted aryloxy group; or a substituted or unsubstituted heterocyclic group.

In an exemplary embodiment of the present specification, when R7 is a phenyl group, and at least four of R1 to R6 are a methyl group, X1 and X2 are the same as or different from each other, and may be each independently a nitrile group; an ester group; a substituted or unsubstituted alkyl group; a substituted or unsubstituted alkoxy group; a substituted or unsubstituted alkenyl group; a substituted or unsubstituted alkynyl group; a substituted or unsubstituted aryl group; a substituted or unsubstituted aryloxy group; a substituted or unsubstituted coumarin group; or a substituted or unsubstituted heterocyclic group.

In an exemplary embodiment of the present specification, when X3 is S, R7 may be hydrogen; deuterium; a halogen group; a nitrile group; a nitro group; a hydroxy group; a carbonyl group; an ester group; an imide group; an amide group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; a substituted or unsubstituted coumarin group; or a substituted or unsubstituted heterocyclic group.

In an exemplary embodiment of the present specification, X1 and X2 are the same as or different from each other, and are each independently a halogen group; a nitrile group; an ester group; a substituted or unsubstituted alkyl group; a substituted or unsubstituted alkoxy group; a substituted or unsubstituted alkynyl group; or a substituted or unsubstituted aryloxy group.

In an exemplary embodiment of the present specification, X1 and X2 are the same as or different from each other, and are each independently a halogen group.

In an exemplary embodiment of the present specification, X1 and X2 are each fluorine.

In an exemplary embodiment of the present specification, X1 and X2 are each a nitrile group.

In an exemplary embodiment of the present specification, X1 and X2 are the same as or different from each other, and are each independently a substituted or unsubstituted ester group.

In an exemplary embodiment of the present specification, X1 and X2 are the same as or different from each other, and are each independently an ester group substituted with a substituted or unsubstituted alkyl group.

In an exemplary embodiment of the present specification, X1 and X2 are the same as or different from each other, and are each independently an ester group substituted with an alkyl group substituted with a halogen group.

In an exemplary embodiment of the present specification, X1 and X2 are each an ester group substituted with $CF_3$.

In an exemplary embodiment of the present specification, X1 and X2 are the same as or different from each other, and are each independently a substituted or unsubstituted aryloxy group.

In an exemplary embodiment of the present specification, X1 and X2 are the same as or different from each other, and are each independently a substituted or unsubstituted phenoxy group.

In an exemplary embodiment of the present specification, X1 and X2 are each a phenoxy group substituted with a nitro group.

In an exemplary embodiment of the present specification, X1 and X2 are the same as or different from each other, and are each independently a substituted or unsubstituted alkoxy group.

In an exemplary embodiment of the present specification, X1 and X2 are the same as or different from each other, and are each independently an alkoxy group substituted with a halogen group.

In an exemplary embodiment of the present specification, X1 and X2 are the same as or different from each other, and are each independently an alkoxy group substituted with fluorine.

In an exemplary embodiment of the present specification, X1 and X2 are the same as or different from each other, and are each independently a butoxy group substituted with fluorine.

In an exemplary embodiment of the present specification, X1 and X2 are the same as or different from each other, and are each independently a substituted or unsubstituted alkyl group.

In an exemplary embodiment of the present specification, X1 and X2 are the same as or different from each other, and are each independently an alkyl group substituted with a substituted or unsubstituted aryl group.

In an exemplary embodiment of the present specification, X1 and X2 are the same as or different from each other, and are each independently an alkyl group substituted with an aryl group substituted with a nitro group.

In an exemplary embodiment of the present specification, X1 and X2 are the same as or different from each other, and are each independently an alkyl group substituted with a phenyl group substituted with a nitro group.

In an exemplary embodiment of the present specification, X1 and X2 are each a methyl group substituted with a phenyl group substituted with a nitro group.

In an exemplary embodiment of the present specification, X1 and X2 are the same as or different from each other, and are each independently a substituted or unsubstituted alkynyl group.

In an exemplary embodiment of the present specification, X1 and X2 are the same as or different from each other, and are each independently an alkynyl group substituted with a substituted or unsubstituted aryl group.

In an exemplary embodiment of the present specification, X1 and X2 are the same as or different from each other, and are each independently an alkynyl group substituted with an aryl group substituted with an alkyl group.

In an exemplary embodiment of the present specification, X1 and X2 are the same as or different from each other, and are each independently an alkynyl group substituted with a phenyl group substituted with an alkyl group.

In an exemplary embodiment of the present specification, X1 and X2 are each an alkynyl group substituted with a phenyl group substituted with a tert-butyl group.

In an exemplary embodiment of the present specification, R1 to R6 are the same as or different from each other, and are each independently hydrogen; a nitrile group; a halogen group; a substituted or unsubstituted ester group; a substituted or unsubstituted alkyl group; a substituted or unsubstituted cycloalkyl group; a substituted or unsubstituted alkoxy group; a substituted or unsubstituted aryl group; a substituted or unsubstituted sulfonic acid group; or a substituted or unsubstituted heterocyclic group.

In an exemplary embodiment of the present specification, R1 to R6 are each hydrogen.

In an exemplary embodiment of the present specification, R1, R3, R4, and R6 are each hydrogen.

In an exemplary embodiment of the present specification, R1, R3, R4, and R6 are the same as or different from each other, and are each independently a substituted or unsubstituted alkyl group.

In an exemplary embodiment of the present specification, R1, R3, R4, and R6 are the same as or different from each other, and are each independently an alkyl group having 1 to 30 carbon atoms.

In an exemplary embodiment of the present specification, R1, R3, R4, and R6 are the same as or different from each other, and are each independently an alkyl group having 1 to 20 carbon atoms.

In an exemplary embodiment of the present specification, R1, R3, R4, and R6 are the same as or different from each other, and are each independently an alkyl group having 1 to 10 carbon atoms.

In an exemplary embodiment of the present specification, R1, R3, R4, and R6 are each a methyl group.

In an exemplary embodiment of the present specification, R1, R3, R4, and R6 are the same as or different from each other, and are each independently a substituted or unsubstituted aryl group.

In an exemplary embodiment of the present specification, R1, R3, R4, and R6 are the same as or different from each other, and are each independently an aryl group substituted with an alkyl group.

In an exemplary embodiment of the present specification, R1, R3, R4, and R6 are the same as or different from each other, and are each independently an aryl group substituted with an alkoxy group.

In an exemplary embodiment of the present specification, R1, R3, R4, and R6 are the same as or different from each other, and are each independently a substituted or unsubstituted phenyl group.

In an exemplary embodiment of the present specification, R1, R3, R4, and R6 are each a phenyl group.

In an exemplary embodiment of the present specification, R1, R3, R4, and R6 are the same as or different from each other, and are each independently a phenyl group substituted with an alkyl group.

In an exemplary embodiment of the present specification, R1, R3, R4, and R6 are the same as or different from each other, and are each independently a phenyl group substituted with an alkoxy group.

In an exemplary embodiment of the present specification, R1, R3, R4, and R6 are each a phenyl group substituted with a methoxy group.

In an exemplary embodiment of the present specification, R1, R3, R4, and R6 are the same as or different from each other, and are each independently a substituted or unsubstituted cycloalkyl group.

In an exemplary embodiment of the present specification, R1, R3, R4, and R6 are the same as or different from each other, and are each independently a cycloalkyl group substituted with an alkyl group.

In an exemplary embodiment of the present specification, R1, R3, R4, and R6 are each a cyclohexane group.

In an exemplary embodiment of the present specification, R1, R3, R4, and R6 are the same as or different from each other, and are each independently a cyclohexane group substituted with an alkyl group.

In an exemplary embodiment of the present specification, R1, R3, R4, and R6 are each a cyclohexane group substituted with a methyl group.

In an exemplary embodiment of the present specification, R2 and R5 are each hydrogen.

In an exemplary embodiment of the present specification, R2 and R5 are the same as or different from each other, and are each independently a halogen group.

In an exemplary embodiment of the present specification, R2 and R5 are each chlorine.

In an exemplary embodiment of the present specification, R2 and R5 are each a nitrile group.

In an exemplary embodiment of the present specification, R2 and R5 are the same as or different from each other, and are each independently a substituted or unsubstituted alkyl group.

In an exemplary embodiment of the present specification, R2 and R5 are the same as or different from each other, and are each independently an alkyl group having 1 to 30 carbon atoms.

In an exemplary embodiment of the present specification, R2 and R5 are the same as or different from each other, and are each independently an alkyl group having 1 to 20 carbon atoms.

In an exemplary embodiment of the present specification, R2 and R5 are the same as or different from each other, and are each independently an alkyl group having 1 to 10 carbon atoms.

In an exemplary embodiment of the present specification, R2 and R5 are each a methyl group.

In an exemplary embodiment of the present specification, R2 and R5 are each an ethyl group.

In an exemplary embodiment of the present specification, R2 and R5 are the same as or different from each other, and are each independently an alkyl group substituted with a halogen group.

In an exemplary embodiment of the present specification, R2 and R5 are the same as or different from each other, and are each independently an alkyl group substituted with fluorine.

In an exemplary embodiment of the present specification, R2 and R5 are each $CF_3$.

In an exemplary embodiment of the present specification, R2 and R5 are the same as or different from each other, and are each independently a substituted or unsubstituted alkoxy group.

In an exemplary embodiment of the present specification, R2 and R5 are each an alkoxy group substituted with a coumarin group.

In an exemplary embodiment of the present specification, R2 and R5 are the same as or different from each other, and are each independently a substituted or unsubstituted aryl group.

In an exemplary embodiment of the present specification, R2 and R5 are the same as or different from each other, and are each independently an aryl group substituted with a halogen group.

In an exemplary embodiment of the present specification, R2 and R5 are the same as or different from each other, and are each independently an aryl group substituted with fluorine.

In an exemplary embodiment of the present specification, R2 and R5 are the same as or different from each other, and are each independently an aryl group substituted with a substituted or unsubstituted alkyl group.

In an exemplary embodiment of the present specification, R2 and R5 are the same as or different from each other, and are each independently an aryl group substituted with an alkyl group substituted with a halogen group.

In an exemplary embodiment of the present specification, R2 and R5 are the same as or different from each other, and are each independently an aryl group substituted with $CF_3$.

In an exemplary embodiment of the present specification, R2 and R5 are each a phenyl group.

In an exemplary embodiment of the present specification, R2 and R5 are the same as or different from each other, and are each independently a phenyl group substituted with a halogen group.

In an exemplary embodiment of the present specification, R2 and R5 are each a phenyl group substituted with fluorine.

In an exemplary embodiment of the present specification, R2 and R5 are the same as or different from each other, and are each independently a phenyl group substituted with a substituted or unsubstituted alkyl group.

In an exemplary embodiment of the present specification, R2 and R5 are each a phenyl group substituted with $CF_3$.

In an exemplary embodiment of the present specification, R2 and R5 are the same as or different from each other, and are each independently a substituted or unsubstituted heterocyclic group.

In an exemplary embodiment of the present specification, R2 and R5 are each a dibenzofuran group.

In an exemplary embodiment of the present specification, R2 and R5 are the same as or different from each other, and are each independently a substituted or unsubstituted sulfonic acid group.

In an exemplary embodiment of the present specification, R2 and R5 are each a methyl sulfonate group.

In an exemplary embodiment of the present specification, R2 and R5 are each a methyl methanesulfonate group.

In an exemplary embodiment of the present specification, R2 and R5 are each a substituted or unsubstituted ester group.

In an exemplary embodiment of the present specification, R2 and R5 are each an ester group substituted with a coumarin group.

In an exemplary embodiment of the present specification, R2 and R5 are each an ester group substituted with a phenyl group.

In an exemplary embodiment of the present specification, R2 and R5 are the same as or different from each other, and are each independently a substituted or unsubstituted alkoxy group.

In an exemplary embodiment of the present specification, R2 and R5 are each a methoxy group.

In an exemplary embodiment of the present specification, R2 and R5 are each an alkoxy group substituted with a coumarin group.

In an exemplary embodiment of the present specification, R7 is a substituted or unsubstituted alkyl group; a substituted or unsubstituted aryl group; a substituted or unsubstituted coumarin group; or a substituted or unsubstituted heterocyclic group.

In an exemplary embodiment of the present specification, R7 is a substituted or unsubstituted alkyl group.

In an exemplary embodiment of the present specification, R7 is an alkyl group having 1 to 30 carbon atoms.

In an exemplary embodiment of the present specification, R7 is an alkyl group having 1 to 20 carbon atoms.

In an exemplary embodiment of the present specification, R7 is an alkyl group having 1 to 10 carbon atoms.

In an exemplary embodiment of the present specification, R7 is a methyl group.

In an exemplary embodiment of the present specification, R7 is an alkyl group substituted with a substituted or unsubstituted aryl group.

In an exemplary embodiment of the present specification, R7 is an alkyl group substituted with an aryl group substituted with $CF_3$.

In an exemplary embodiment of the present specification, R7 is an alkyl group substituted with a phenyl group substituted with $CF_3$.

In an exemplary embodiment of the present specification, R7 is a methyl group substituted with a phenyl group substituted with $CF_3$.

In an exemplary embodiment of the present specification, R7 is a substituted or unsubstituted aryl group.

In an exemplary embodiment of the present specification, R7 is an aryl group substituted with a halogen group.

In an exemplary embodiment of the present specification, R7 is an aryl group substituted with an alkoxy group.

In an exemplary embodiment of the present specification, R7 is a substituted or unsubstituted phenyl group.

In an exemplary embodiment of the present specification, R7 is a phenyl group.

In an exemplary embodiment of the present specification, R7 is a phenyl group substituted with a halogen group.

In an exemplary embodiment of the present specification, R7 is a phenyl group substituted with fluorine.

In an exemplary embodiment of the present specification, R7 is a phenyl group substituted with an alkoxy group.

In an exemplary embodiment of the present specification, R7 is a phenyl group substituted with a methoxy group.

In an exemplary embodiment of the present specification, R7 is a substituted or unsubstituted coumarin group.

In an exemplary embodiment of the present specification, R7 is a substituted or unsubstituted heterocyclic group.

In an exemplary embodiment of the present specification, R7 is a dibenzofuran group.

In an exemplary embodiment of the present specification, R7 is a substituted or unsubstituted coumarin group.

In an exemplary embodiment of the present specification, R7 is a coumarin group.

According to an exemplary embodiment of the present specification, the maximum light emission peak of the compound represented by Chemical Formula 1 in a film state is present within 500 nm to 550 nm. The compound described above emits green light.

According to an exemplary embodiment of the present specification, the maximum light emission peak of the compound represented by Chemical Formula 1 in a film state is present within 500 nm to 550 nm, and the full width half maximum of the light emission peak is 50 nm or less. In the case of having a narrow full width half maximum as described above, the color gamut may be further increased. At this time, the narrower full width half maximum of the light emission peak of the compound represented by Chemical Formula 1 is preferred.

According to an exemplary embodiment of the present specification, the maximum light emission peak of the compound represented by Chemical Formula 1 in a film state is present within 600 nm to 650 nm. The compound described above emits red light.

According to an exemplary embodiment of the present specification, the maximum light emission peak of the compound represented by Chemical Formula 1, in a film state is present within 600 nm to 650 nm, and the full width half maximum of the light emission peak is 60 nm or less. In the case of having a narrow full width half maximum as described above, the color gamut may be further increased.

At this time, the full width half maximum of the light emission peak of the compound represented by Chemical Formula 1 may be 5 nm or more.

According to an exemplary embodiment of the present specification, the compound represented by Chemical Formula 1 has quantum efficiency of 0.8 or more.

In the present specification, "a film state" does not mean a solution state, but means a state prepared in the form of a film by using the compound represented by Chemical Formula 1 alone or mixing the compound represented by Chemical Formula 1 with other components which does not affect the measurement of the full width half maximum and the quantum efficiency.

In the present specification, the full width half maximum means a width of the light emission peak when the height is half the maximum height at the maximum light emission peak of light emitted from the compound represented by Chemical Formula 1.

In the present specification, the quantum efficiency may be measured by using a method known in the art, and may be measured by using, for example, an integrating sphere.

According to an exemplary embodiment of the present specification, a combination of R1 to R6 is any one from 1A to 132A of the following Table 1.

TABLE 1

| #A | R1 | R2 | R3 |
|---|---|---|---|
| 1A | H | H | H |
| 2A | H | $CH_3$ | H |
| 3A | H | $CF_3$ | H |
| 4A | H | phenyl | H |
| 5A | H | 2-fluorophenyl | H |
| 6A | H | 2-(trifluoromethyl)phenyl | H |
| 7A | H | Cl | H |
| 8A | H | CN | H |
| 9A | H | $-S(=O)_2-O-CH_3$ | H |
| 10A | H | dibenzofuran-4-yl | H |
| 11A | H | $-C(=O)-O-CH_3$ (methyl ester) | H |
| 12A | H | $-C(=O)-O-C_6H_5$ (phenyl ester) | H |

TABLE 1-continued

| | | | |
|---|---|---|---|
| 13A | H | (7-coumarinyl ester: -C(CH₃)(~)-C(=O)O-[coumarin-7-yl]) | H |
| 14A | H | (7-coumarinyl ether: -C(CH₃)(~)-O-[coumarin-7-yl]) | H |
| 15A | H | (4-coumarinyl ether: -C(CH₃)(~)-O-[coumarin-4-yl]) | H |
| 16A | H | CH₃ | H |
| 17A | H | CF₃ | H |
| 18A | H | CF₃ | H |
| 19A | H | (phenyl-C(CH₃)(~)-) | H |
| 20A | H | (2-(trifluoromethyl)phenyl-C(CH₃)(~)-) | H |
| 21A | CH₃ | H | CH₃ |
| 22A | CH₃ | CH₃ | CH₃ |
| 23A | CH₃ | CF₃ | CH₃ |
| 24A | CH₃ | (phenyl-C(CH₃)(~)-) | CH₃ |
| 25A | CH₃ | (2-fluorophenyl-C(CH₃)(~)-) | CH₃ |
| 26A | CH₃ | (2-(trifluoromethyl)phenyl-C(CH₃)(~)-) | CH₃ |
| 27A | CH₃ | Cl | CH₃ |
| 28A | CH₃ | CN | CH₃ |

TABLE 1-continued

| | | | |
|---|---|---|---|
| 29A | CH₃ | [methanesulfonate group: -S(=O)(=O)-O-CH₃ attached via C] | CH₃ |
| 30A | CH₃ | [dibenzofuran-4-yl group] | CH₃ |
| 31A | CH₃ | [-C(=O)-O-CH₃ with methyl] | CH₃ |
| 32A | CH₃ | [-C(=O)-O-phenyl with methyl] | CH₃ |
| 33A | CH₃ | [coumarin-7-yl ester group] | CH₃ |
| 34A | CH₃ | [7-(oxy)-coumarin group] | CH₃ |
| 35A | CH₃ | [4-(oxy)-coumarin group] | CH₃ |
| 36A | CH₃ | CH₃ | CH₃ |
| 37A | CH₃ | CF₃ | CH₃ |
| 38A | CH₃ | CF₃ | CH₃ |
| 39A | CH₃ | [phenyl group with methyl] | CH₃ |
| 40A | CH₃ | [2-(trifluoromethyl)phenyl group with methyl] | CH₃ |

TABLE 1-continued
| | | | |
|---|---|---|---|
| 41A | 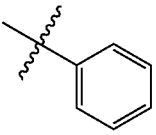 [SMILES: *c1ccccc1] | H | 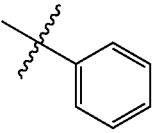 [SMILES: *c1ccccc1] |
| 42A | 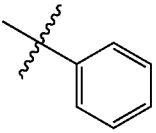 [SMILES: *c1ccccc1] | CH$_3$ | 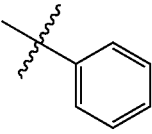 [SMILES: *c1ccccc1] |
| 43A | 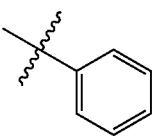 [SMILES: *c1ccccc1] | CF$_3$ | 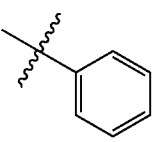 [SMILES: *c1ccccc1] |
| 44A | 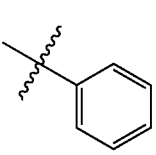 [SMILES: *c1ccccc1] | 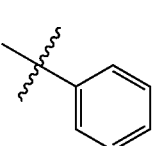 | 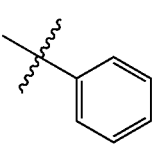 [SMILES: *c1ccccc1] |
| 45A | 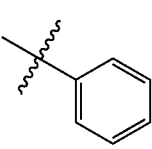 [SMILES: *c1ccccc1] | 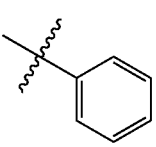 [SMILES: *c1ccccc1] | 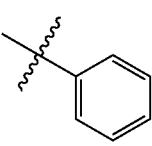 [SMILES: *c1ccccc1] |
| 46A | 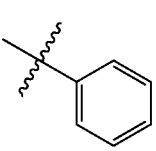 [SMILES: *c1ccccc1] | 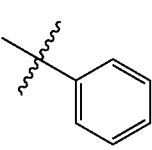 [SMILES: *c1ccccc1] | 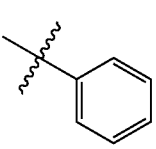 |
| 47A | 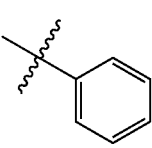 [SMILES: *c1ccccc1] | Cl | 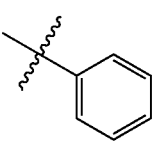 |
| 48A | 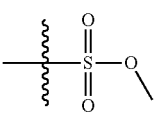 [SMILES: *S(=O)(=O)OC] | CN | 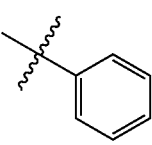 |
| 49A | 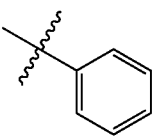 [SMILES: *c1ccccc1] | 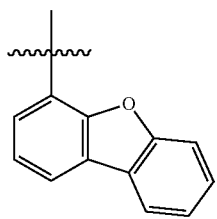 [SMILES: *c1cccc2c1oc1ccccc12] | 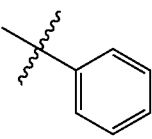 [SMILES: *c1ccccc1] |
| 50A |  |  |  |

TABLE 1-continued
| | | | |
|---|---|---|---|
| 51A | 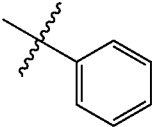 [SMILES: *c1ccccc1] | 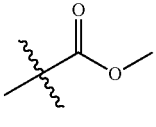 | 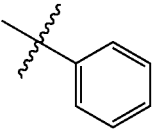 [SMILES: *c1ccccc1] |
| 52A | 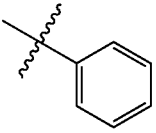 | 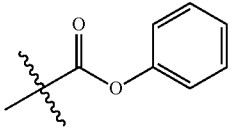 [SMILES: *C(=O)Oc1ccccc1] | 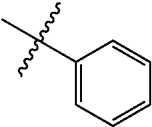 [SMILES: *c1ccccc1] |
| 53A | 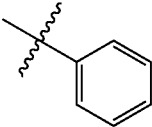 [SMILES: *c1ccccc1] | 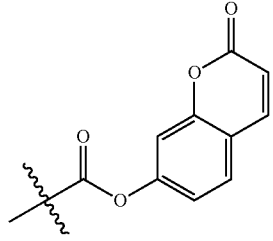 | 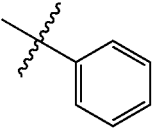 [SMILES: *c1ccccc1] |
| 54A | 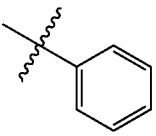 [SMILES: *c1ccccc1] | 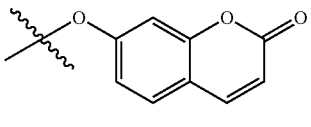 [SMILES: *Oc1ccc2ccc(=O)oc2c1] | 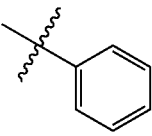 [SMILES: *c1ccccc1] |
| 55A | 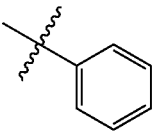 [SMILES: *c1ccccc1] | 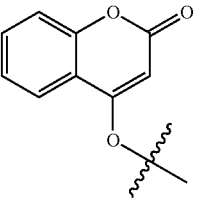 [SMILES: *Oc1cc(=O)oc2ccccc12] | 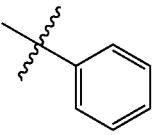 [SMILES: *c1ccccc1] |
| 56A | 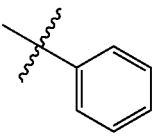 [SMILES: *c1ccccc1] | $CH_3$ | 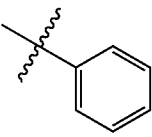 [SMILES: *c1ccccc1] |
| 57A | 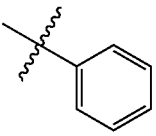 [SMILES: *c1ccccc1] | $CF_3$ | 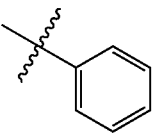 [SMILES: *c1ccccc1] |
| 58A | 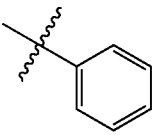 [SMILES: *c1ccccc1] | $CF_3$ | 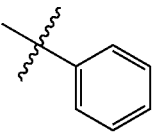 [SMILES: *c1ccccc1] |
| 59A | 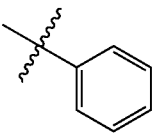 [SMILES: *c1ccccc1] | 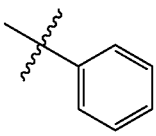 | 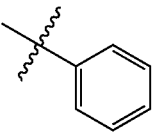 [SMILES: *c1ccccc1] |
| 60A | 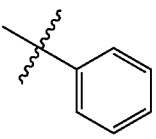 | 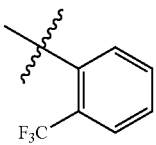 | 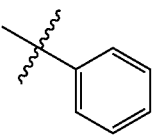 [SMILES: *c1ccccc1] |

TABLE 1-continued
| | | | |
|---|---|---|---|
| 61A | 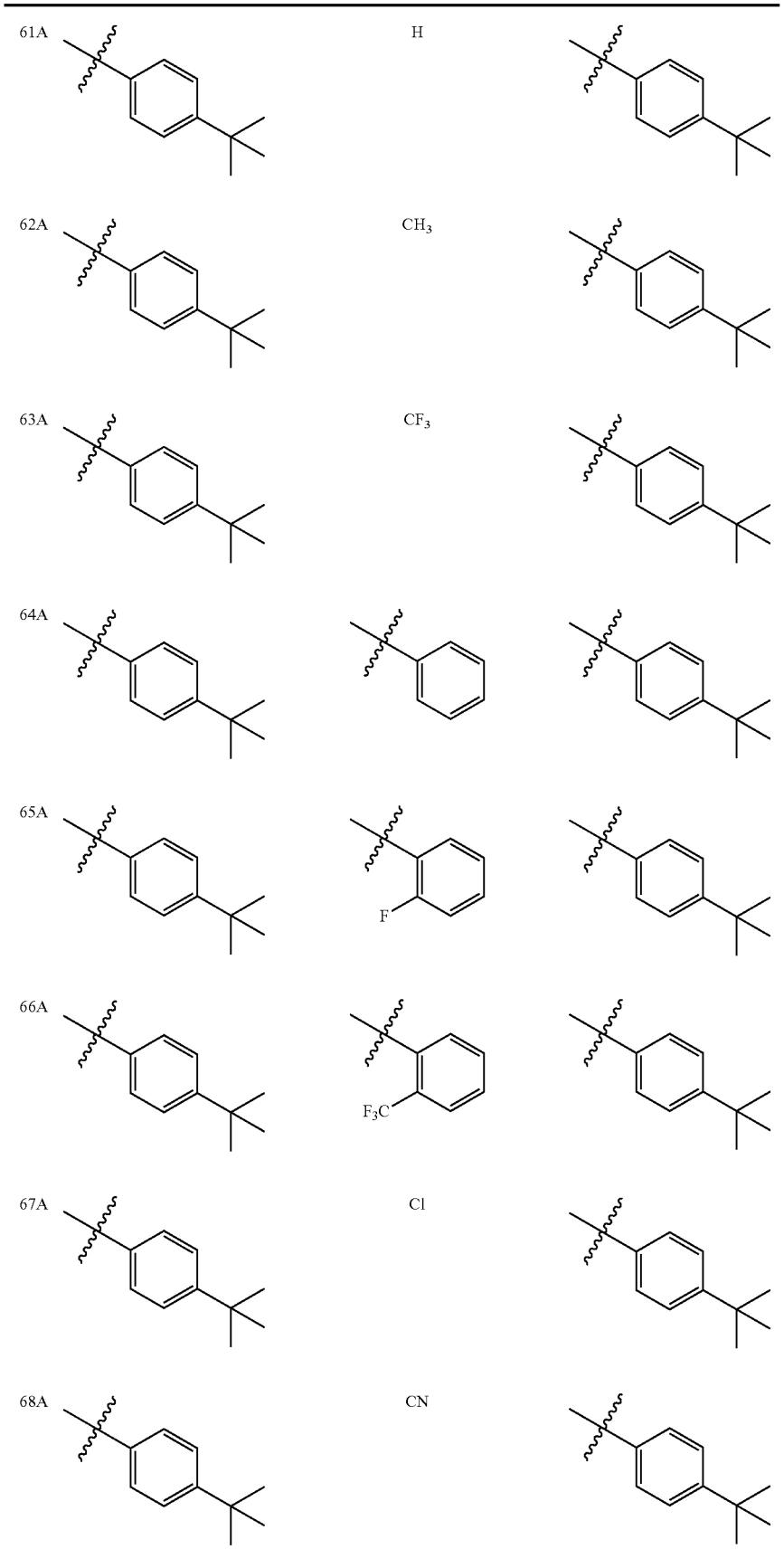 | H | |
| 62A | | CH₃ | |
| 63A | | CF₃ | |
| 64A | | | |
| 65A | | | |
| 66A | | | |
| 67A | | Cl | |
| 68A | | CN | |

TABLE 1-continued
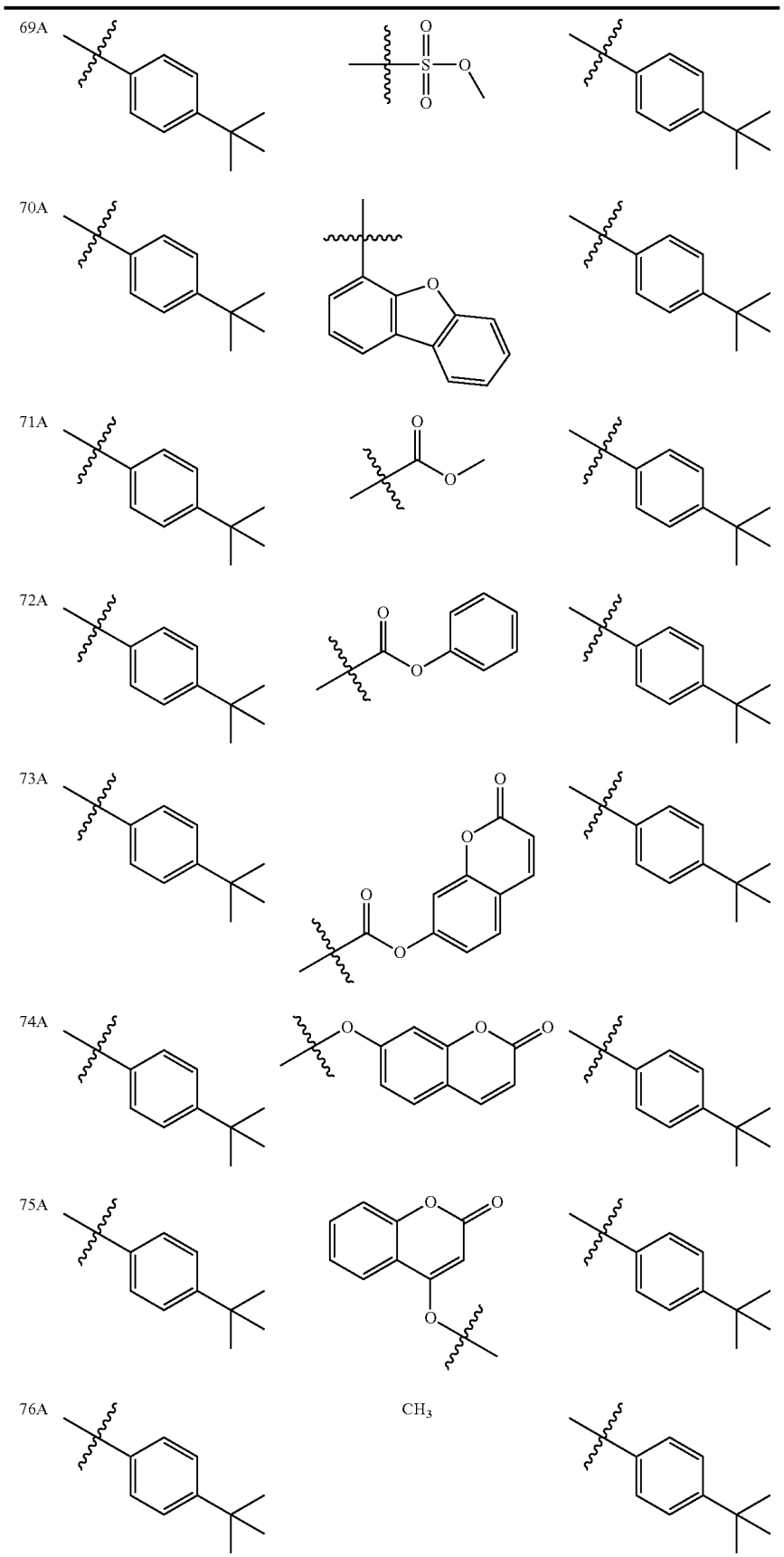

TABLE 1-continued
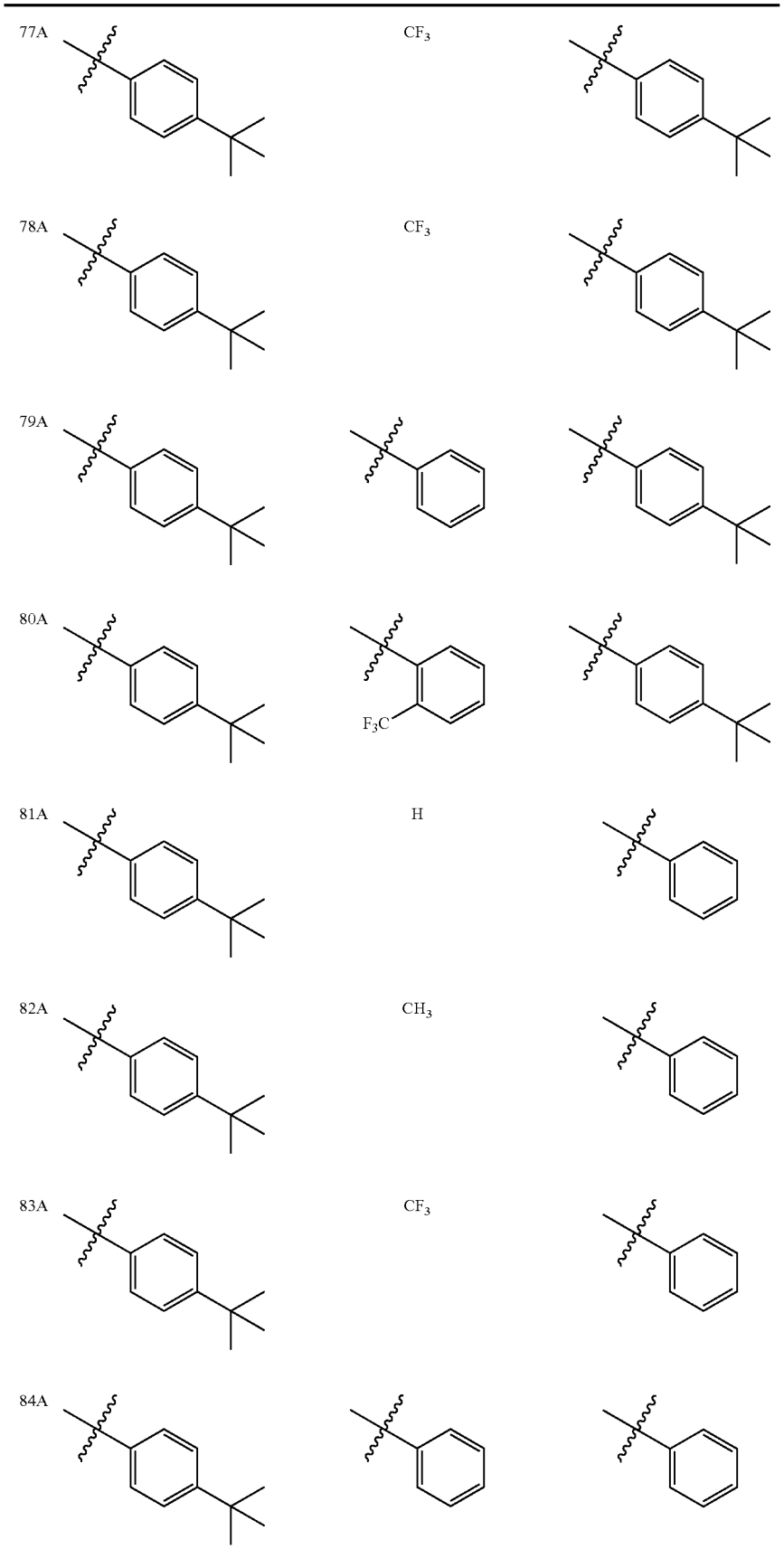

TABLE 1-continued
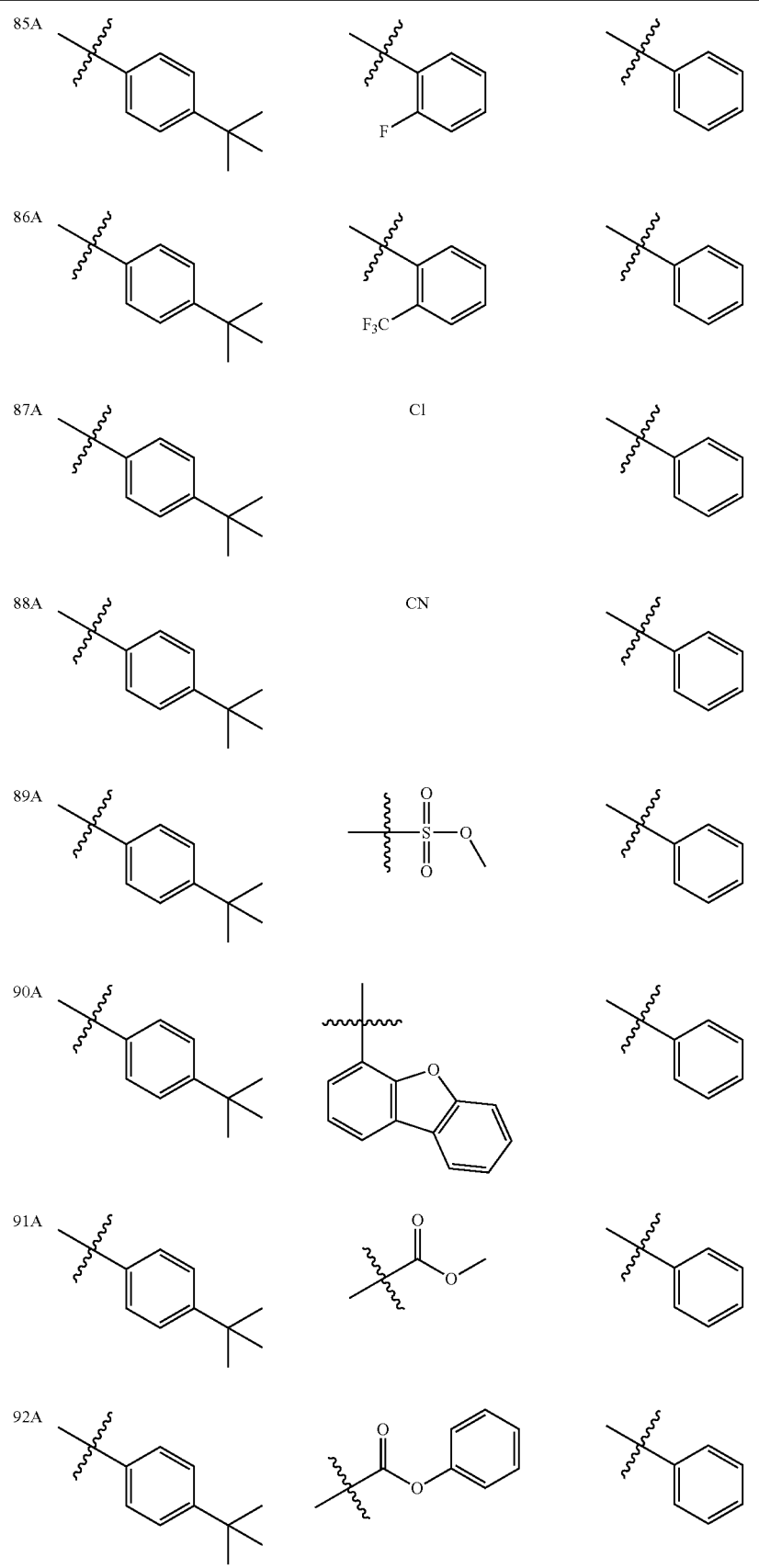

TABLE 1-continued
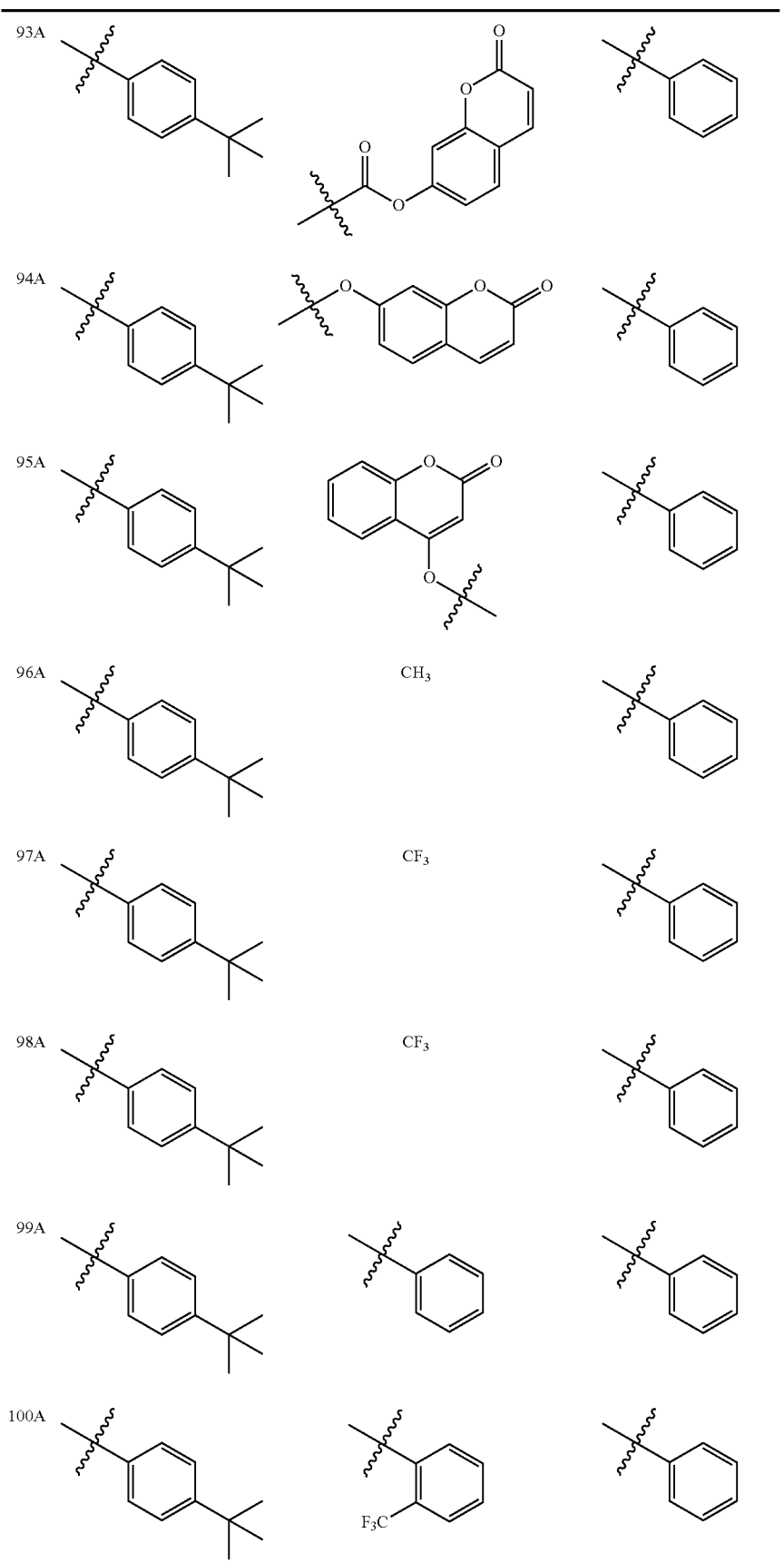

TABLE 1-continued
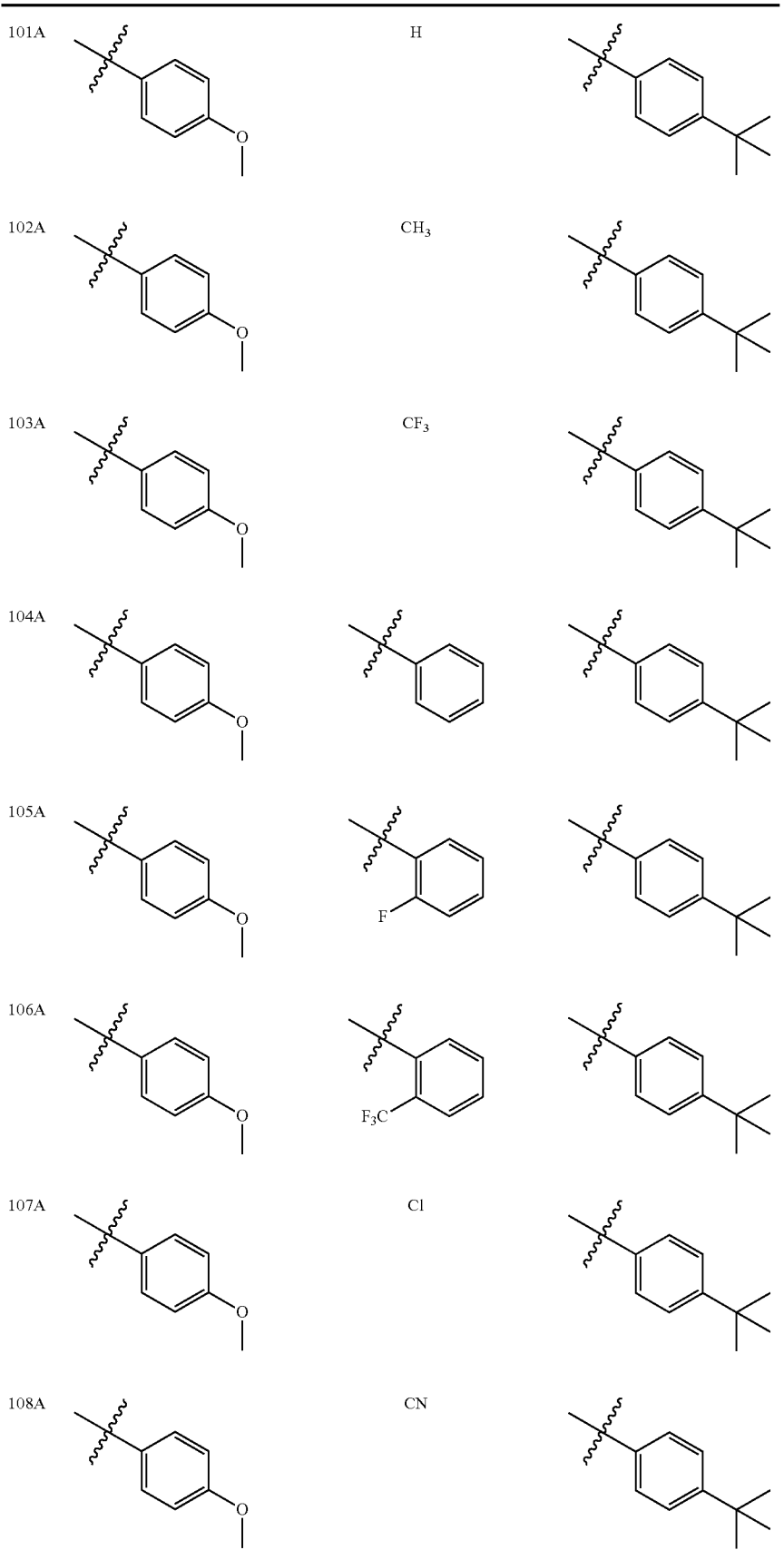

TABLE 1-continued
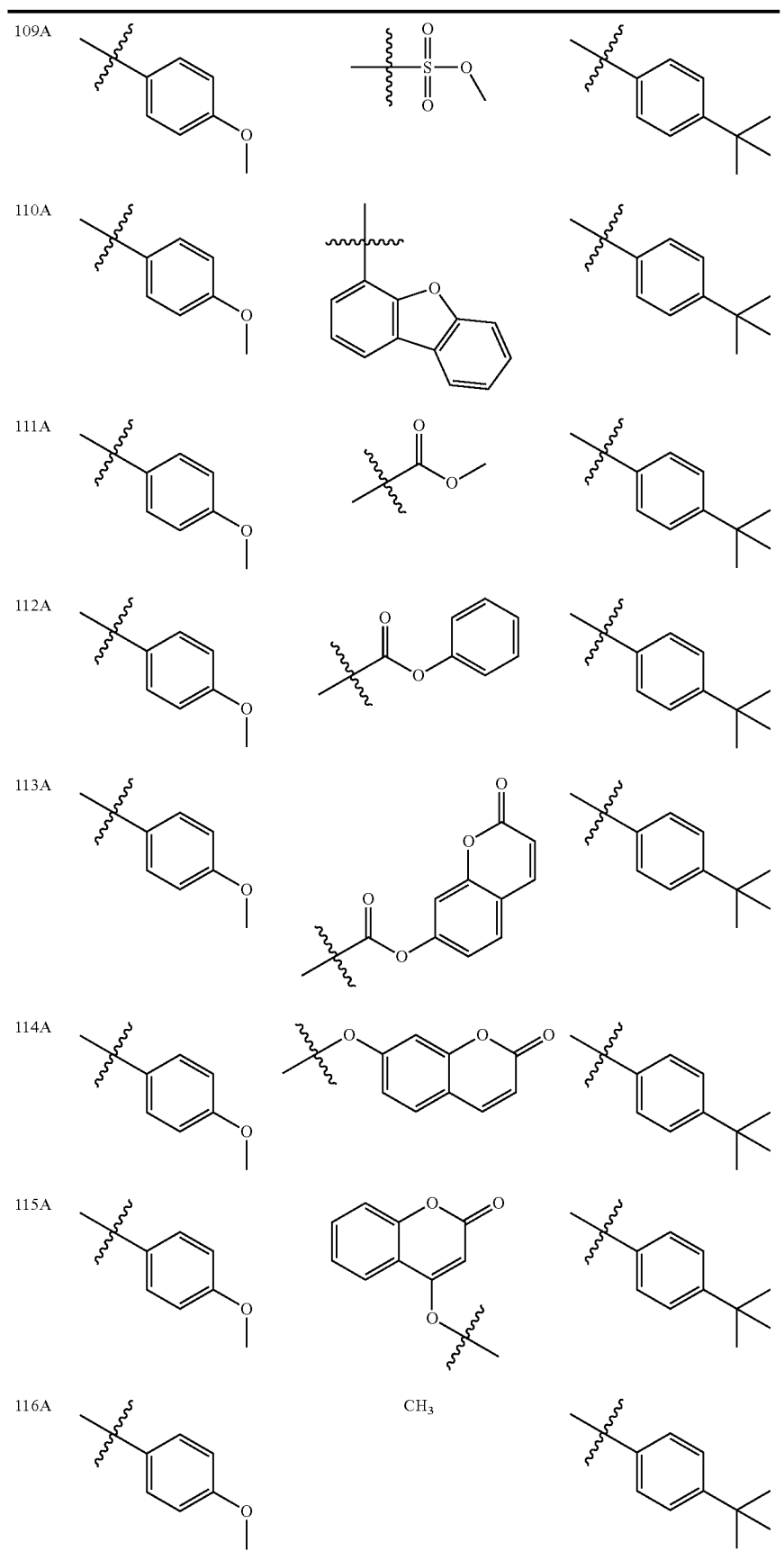

TABLE 1-continued
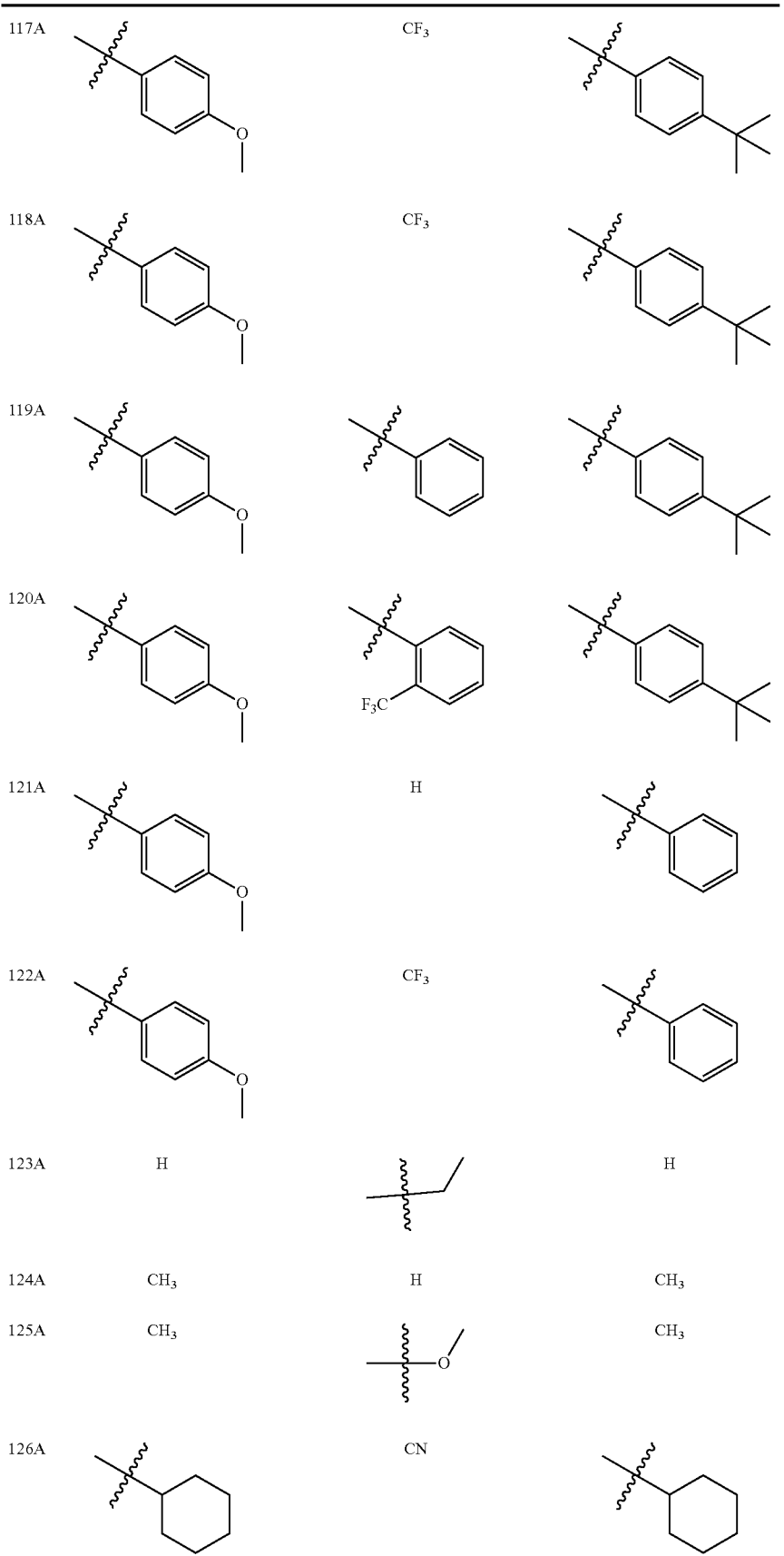

TABLE 1-continued

| # | (col2) | (col3) | (col4) |
|---|---|---|---|
| 127A | 2-methylcyclohexyl | H | 2-methylcyclohexyl |
| 128A | 4-tert-butylphenyl | H | phenyl |
| 129A | 4-methoxyphenyl | H | 4-tert-butylphenyl |
| 130A | CH₃ | 2-(trifluoromethyl)phenyl | CH₃ |
| 131A | H | H | H |
| 132A | cyclohexyl | H | cyclohexyl |

| #A | R4 | R5 | R6 |
|---|---|---|---|
| 1A | H | H | H |
| 2A | H | CH₃ | H |
| 3A | H | CF₃ | H |
| 4A | H | phenyl | H |
| 5A | H | 2-fluorophenyl | H |
| 6A | H | 2-(trifluoromethyl)phenyl | H |
| 7A | H | Cl | H |
| 8A | H | CN | H |
| 9A | H | −S(=O)₂−OCH₃ | H |

TABLE 1-continued

| | | | |
|---|---|---|---|
| 10A | H | (dibenzofuran-4-yl) | H |
| 11A | H | (C(CH₃)₂-C(O)-O-CH₃) | H |
| 12A | H | (C(CH₃)₂-C(O)-O-phenyl) | H |
| 13A | H | (C(CH₃)₂-C(O)-O-(coumarin-7-yl)) | H |
| 14A | H | (C(CH₃)₂-O-(coumarin-7-yl)) | H |
| 15A | H | (C(CH₃)₂-O-(coumarin-4-yl)) | H |
| 16A | H | Cl | H |
| 17A | H | CN | H |
| 18A | H | (C(CH₃)₂-(2-fluorophenyl)) | H |
| 19A | H | (C(CH₃)₂-S(O)₂-O-CH₃) | H |

TABLE 1-continued
| | | | |
|---|---|---|---|
| 20A | H | 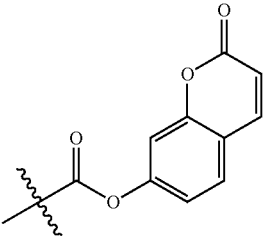 [SMILES: *C(=O)Oc1ccc2ccc(=O)oc2c1] | H |
| 21A | CH₃ | H | CH₃ |
| 22A | CH₃ | CH₃ | CH₃ |
| 23A | CH₃ | CF₃ | CH₃ |
| 24A | CH₃ | 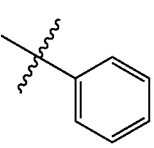 | CH₃ |
| 25A | CH₃ | 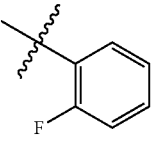 [SMILES: *c1ccccc1F] | CH₃ |
| 26A | CH₃ | 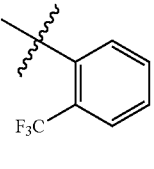 | CH₃ |
| 27A | CH₃ | Cl | CH₃ |
| 28A | CH₃ | CN | CH₃ |
| 29A | CH₃ | 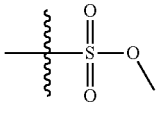 [SMILES: *S(=O)(=O)OC] | CH₃ |
| 30A | CH₃ | 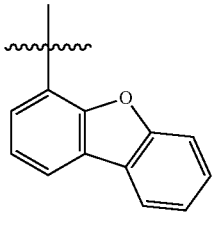 [SMILES: *c1cccc2c1oc1ccccc12] | CH₃ |
| 31A | CH₃ | 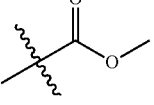 | CH₃ |
| 32A | CH₃ | 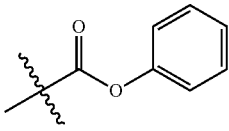 [SMILES: *C(=O)Oc1ccccc1] | CH₃ |

TABLE 1-continued
| 33A | CH₃ | 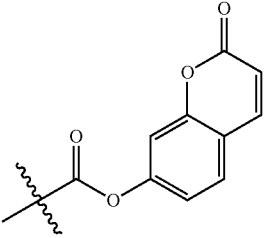 | CH₃ |
| 34A | CH₃ | 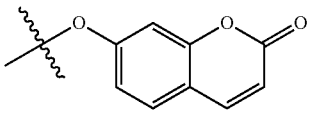 [SMILES: *Oc1ccc2ccc(=O)oc2c1] | CH₃ |
| 35A | CH₃ | 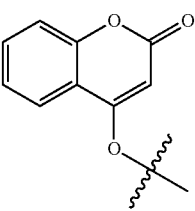 [SMILES: *Oc1cc(=O)oc2ccccc12] | CH₃ |
| 36A | CH₃ | Cl | CH₃ |
| 37A | CH₃ | CN | CH₃ |
| 38A | CH₃ | 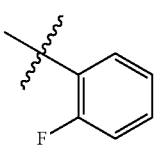 [SMILES: *c1ccccc1F] | CH₃ |
| 39A | CH₃ | 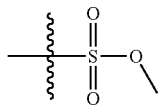 [SMILES: *S(=O)(=O)OC] | CH₃ |
| 40A | CH₃ | 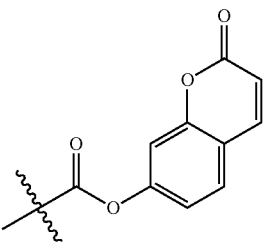 | CH₃ |
| 41A | 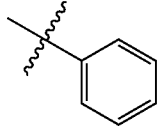 | H | 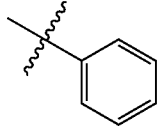 |
| 42A | 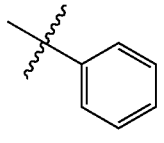 [SMILES: *c1ccccc1] | CH₃ | 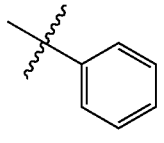 [SMILES: *c1ccccc1] |
| 43A | 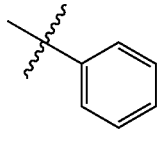 [SMILES: *c1ccccc1] | CF₃ | 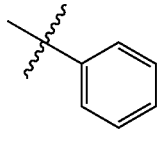 [SMILES: *c1ccccc1] |

TABLE 1-continued
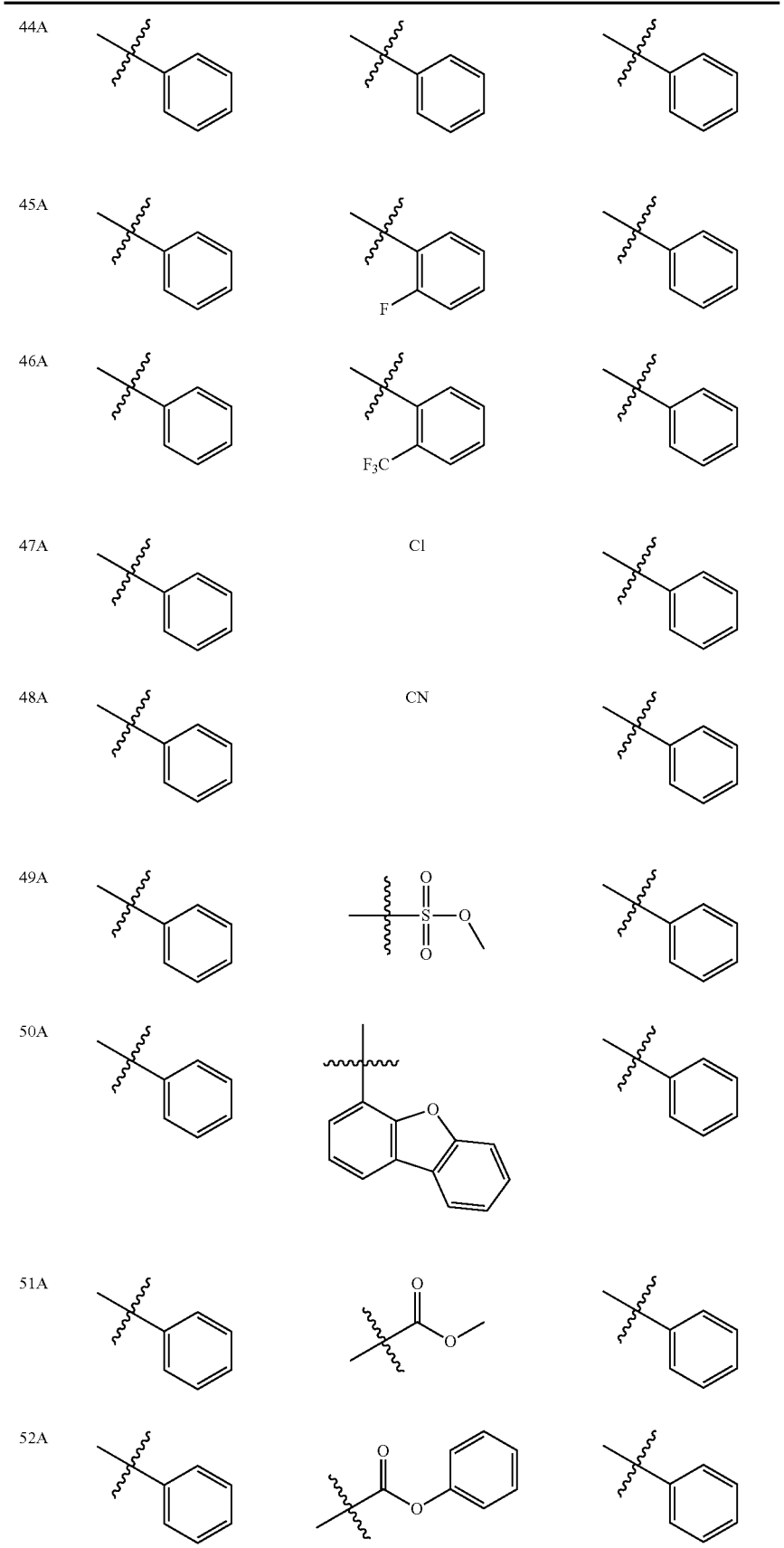

TABLE 1-continued
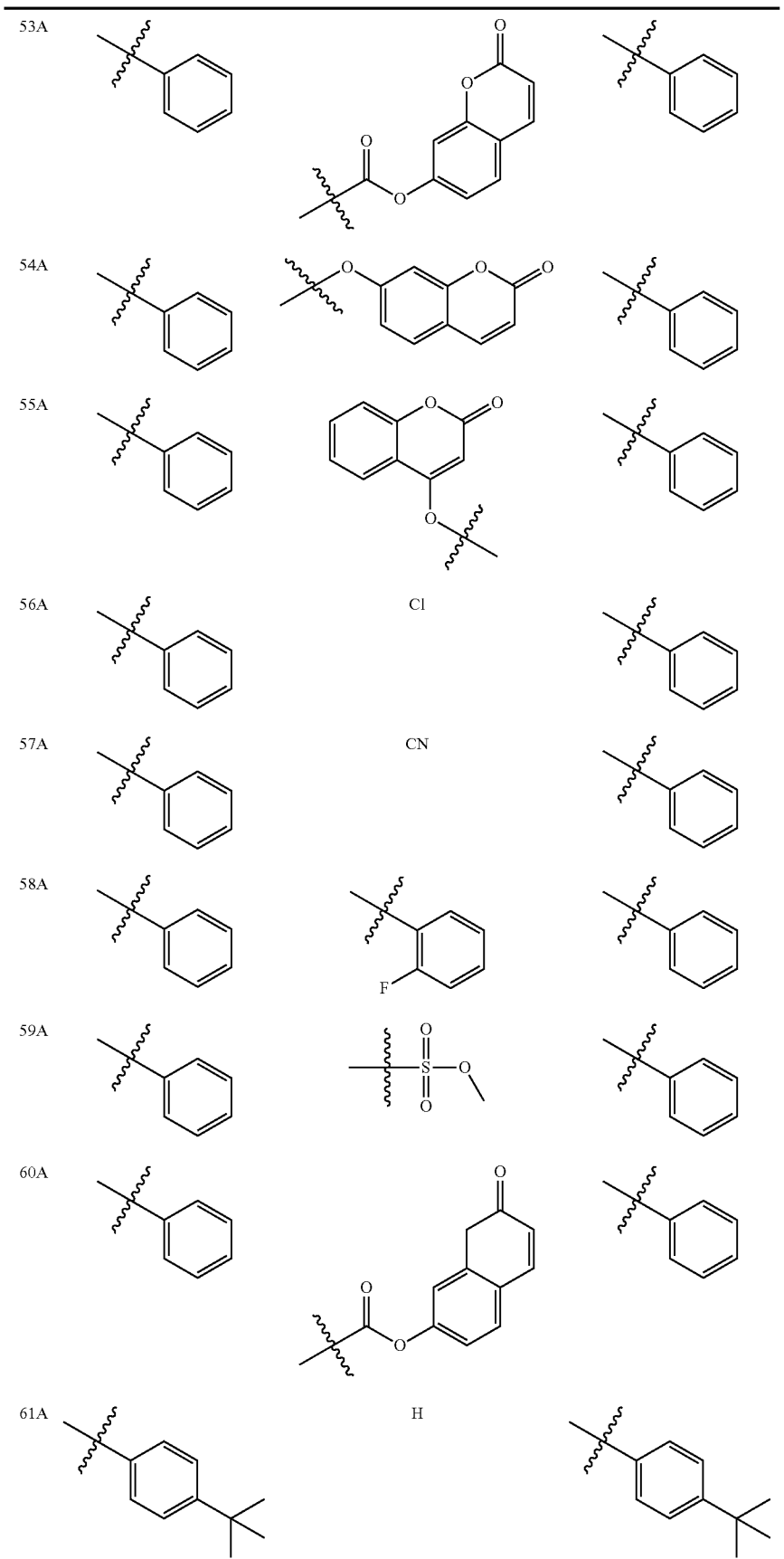

TABLE 1-continued
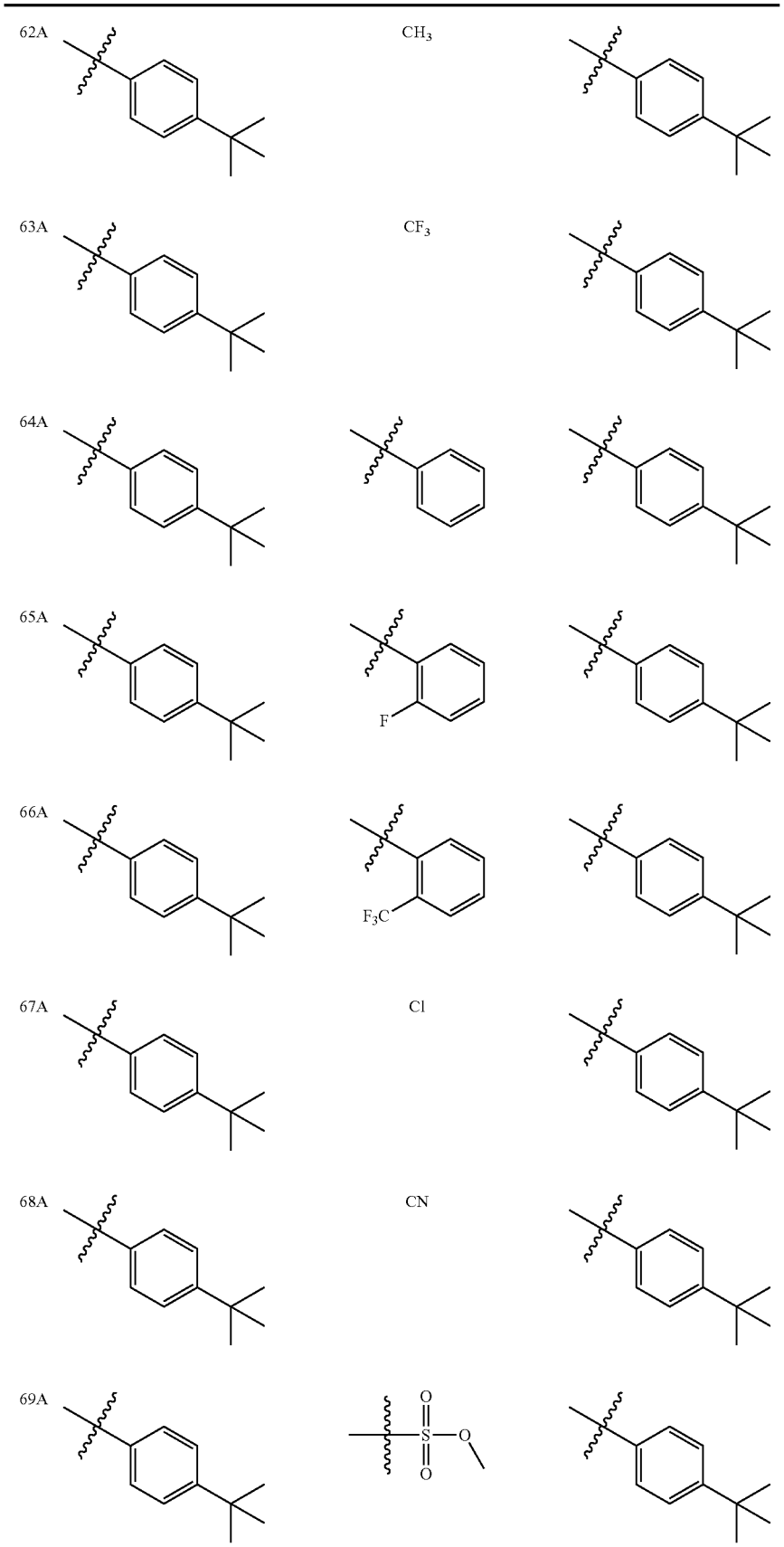

TABLE 1-continued
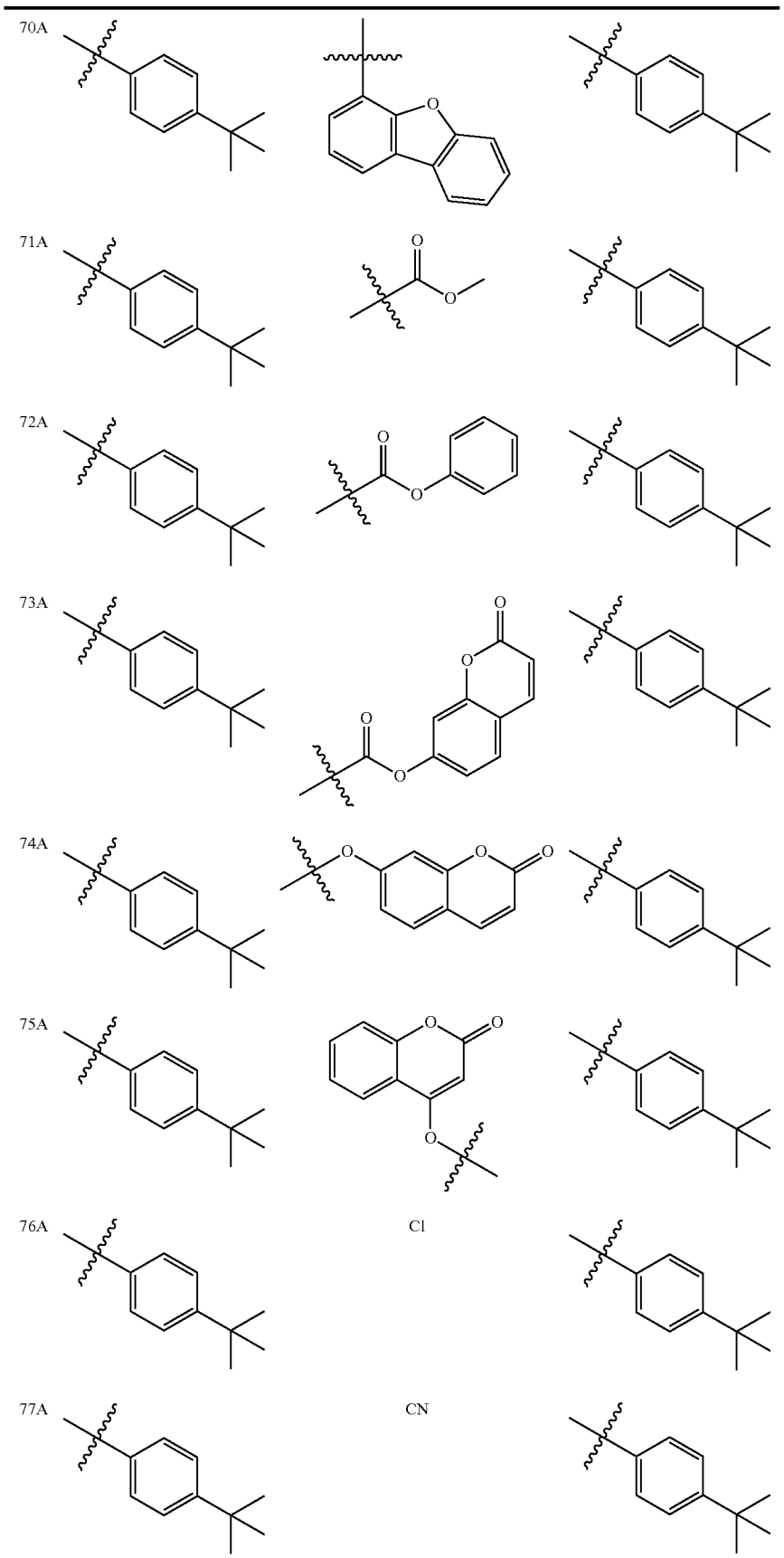

TABLE 1-continued
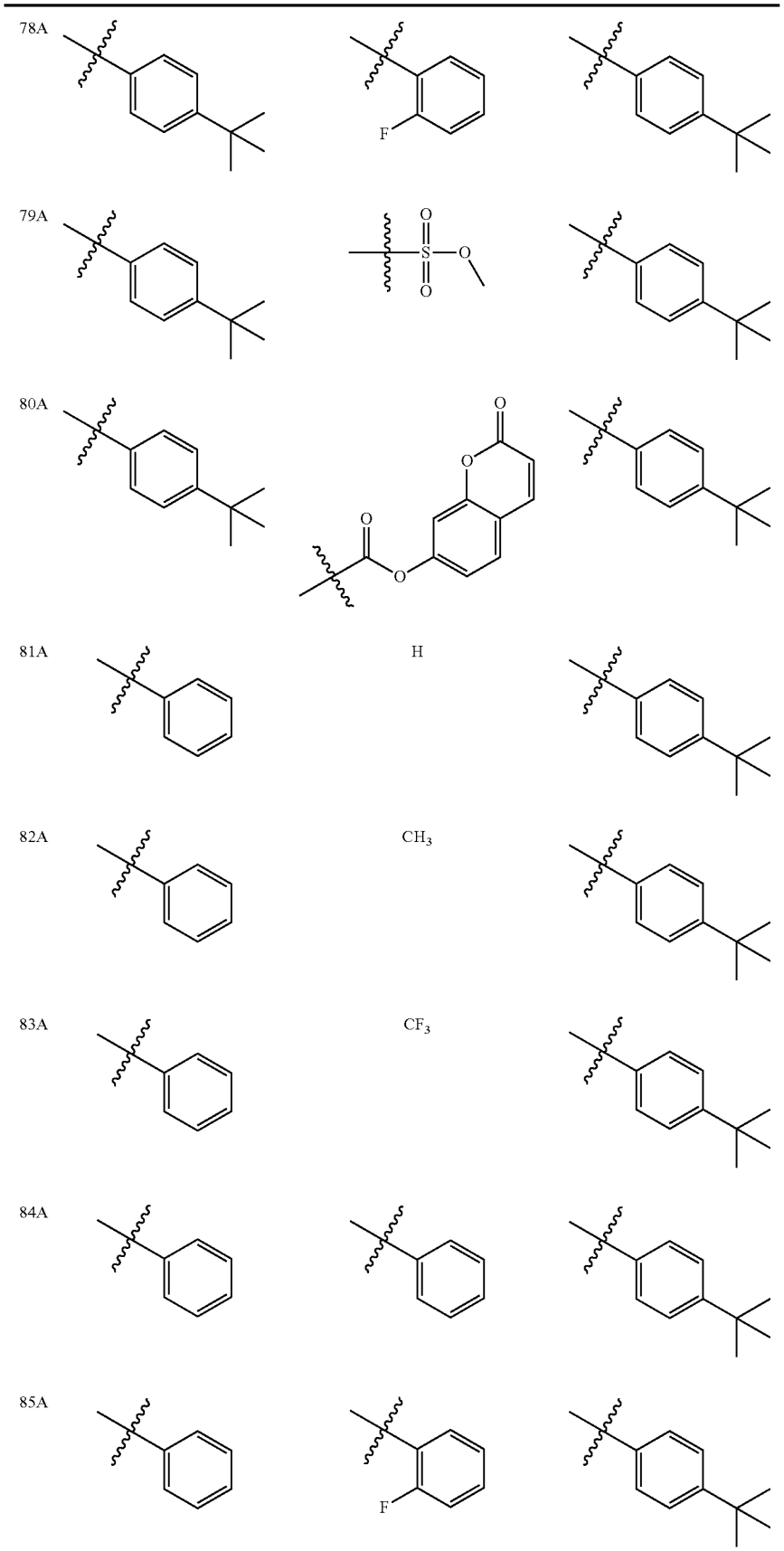

TABLE 1-continued
| | | | |
|---|---|---|---|
| 86A | 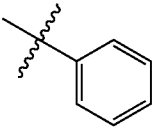 [SMILES: *c1ccccc1] | 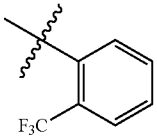 | 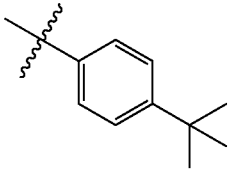 [SMILES: *c1ccc(C(C)(C)C)cc1] |
| 87A | 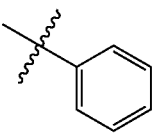 [SMILES: *c1ccccc1] | Cl | 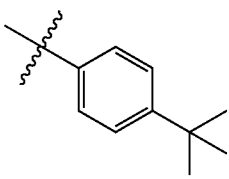 [SMILES: *c1ccc(C(C)(C)C)cc1] |
| 88A | 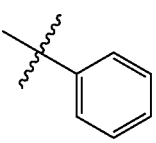 [SMILES: *c1ccccc1] | CN | 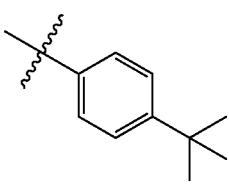 [SMILES: *c1ccc(C(C)(C)C)cc1] |
| 89A | 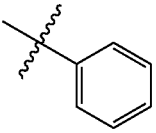 [SMILES: *c1ccccc1] | 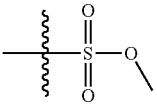 [SMILES: *S(=O)(=O)OC] | 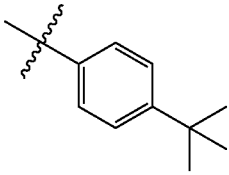 [SMILES: *c1ccc(C(C)(C)C)cc1] |
| 90A | 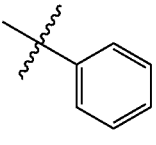 [SMILES: *c1ccccc1] | 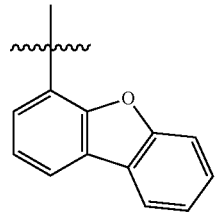 [SMILES: *c1cccc2c1oc1ccccc12] | 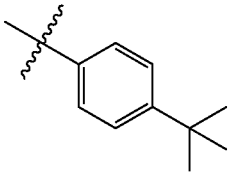 [SMILES: *c1ccc(C(C)(C)C)cc1] |
| 91A | 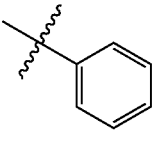 [SMILES: *c1ccccc1] | 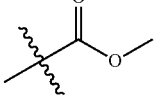 | 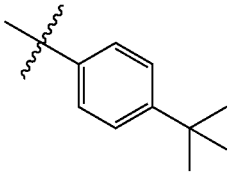 [SMILES: *c1ccc(C(C)(C)C)cc1] |
| 92A | 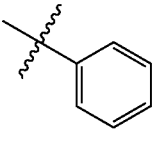 [SMILES: *c1ccccc1] | 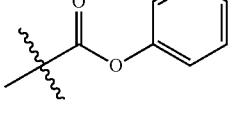 | 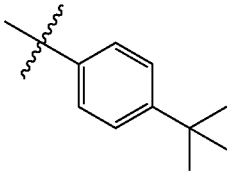 [SMILES: *c1ccc(C(C)(C)C)cc1] |
| 93A | 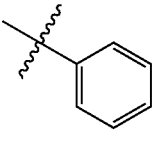 [SMILES: *c1ccccc1] | 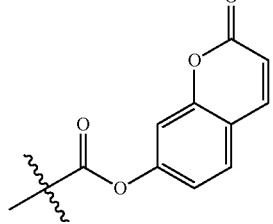 | 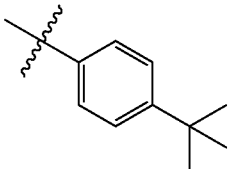 [SMILES: *c1ccc(C(C)(C)C)cc1] |

TABLE 1-continued
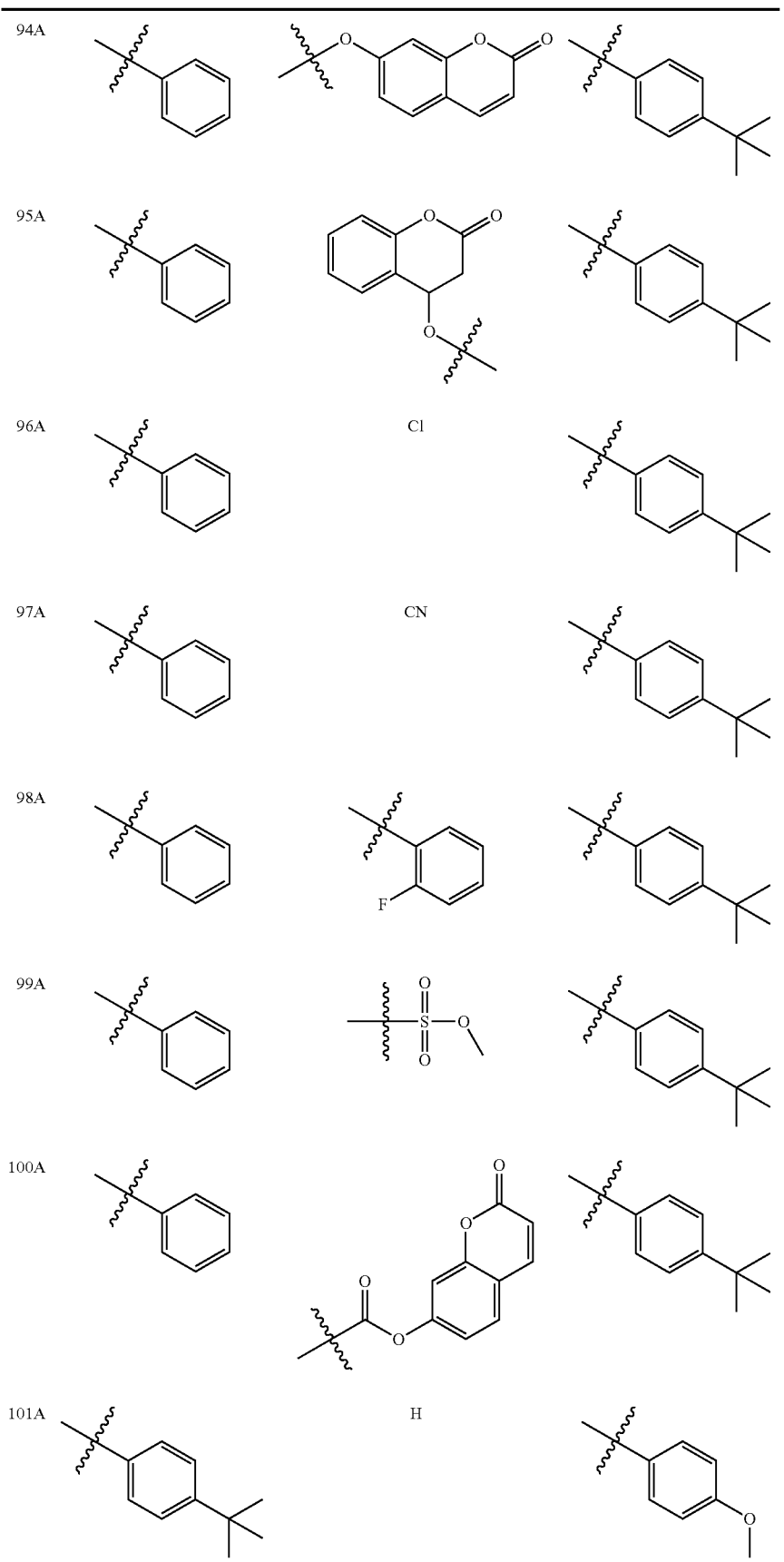

TABLE 1-continued
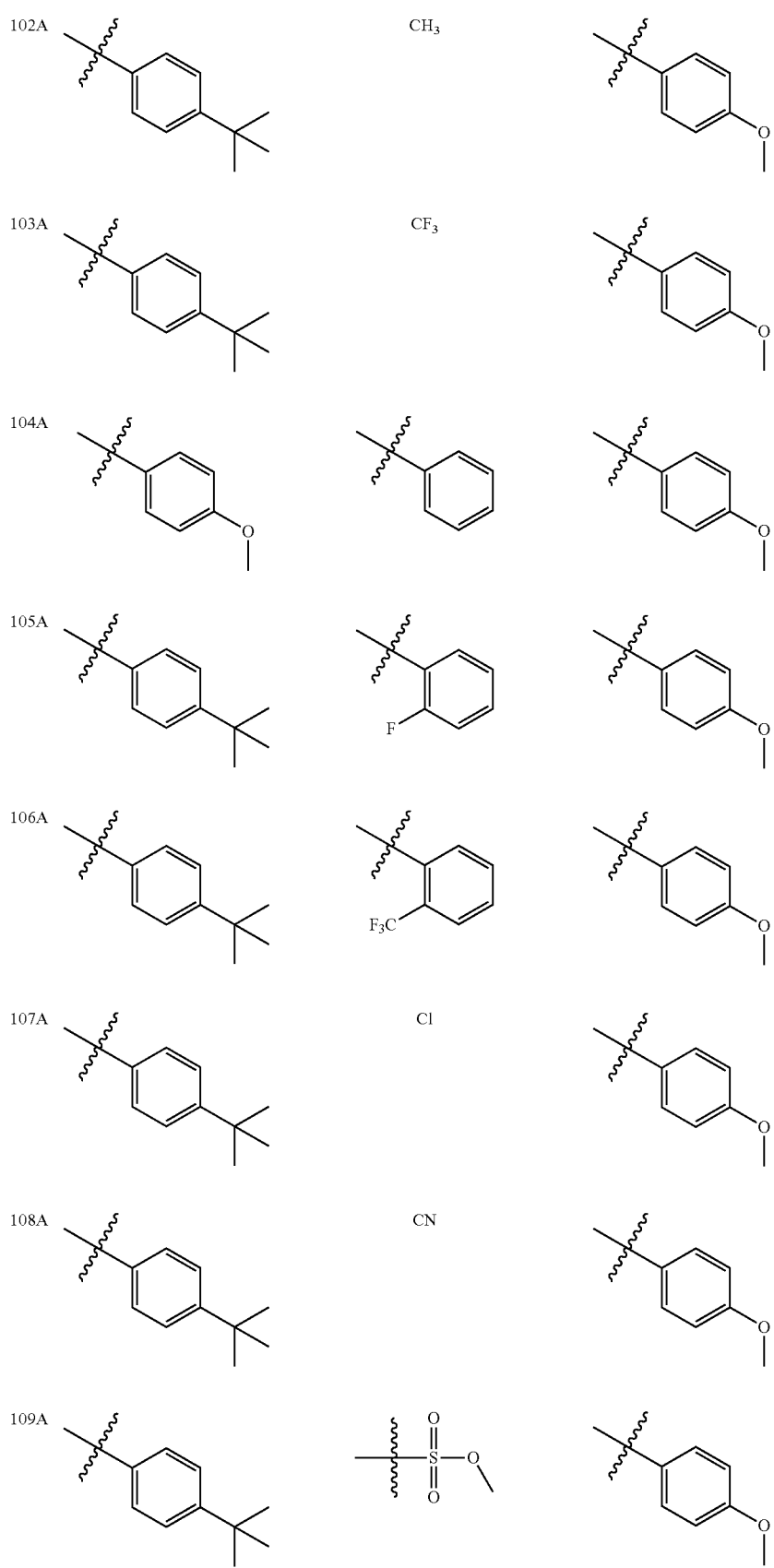

TABLE 1-continued
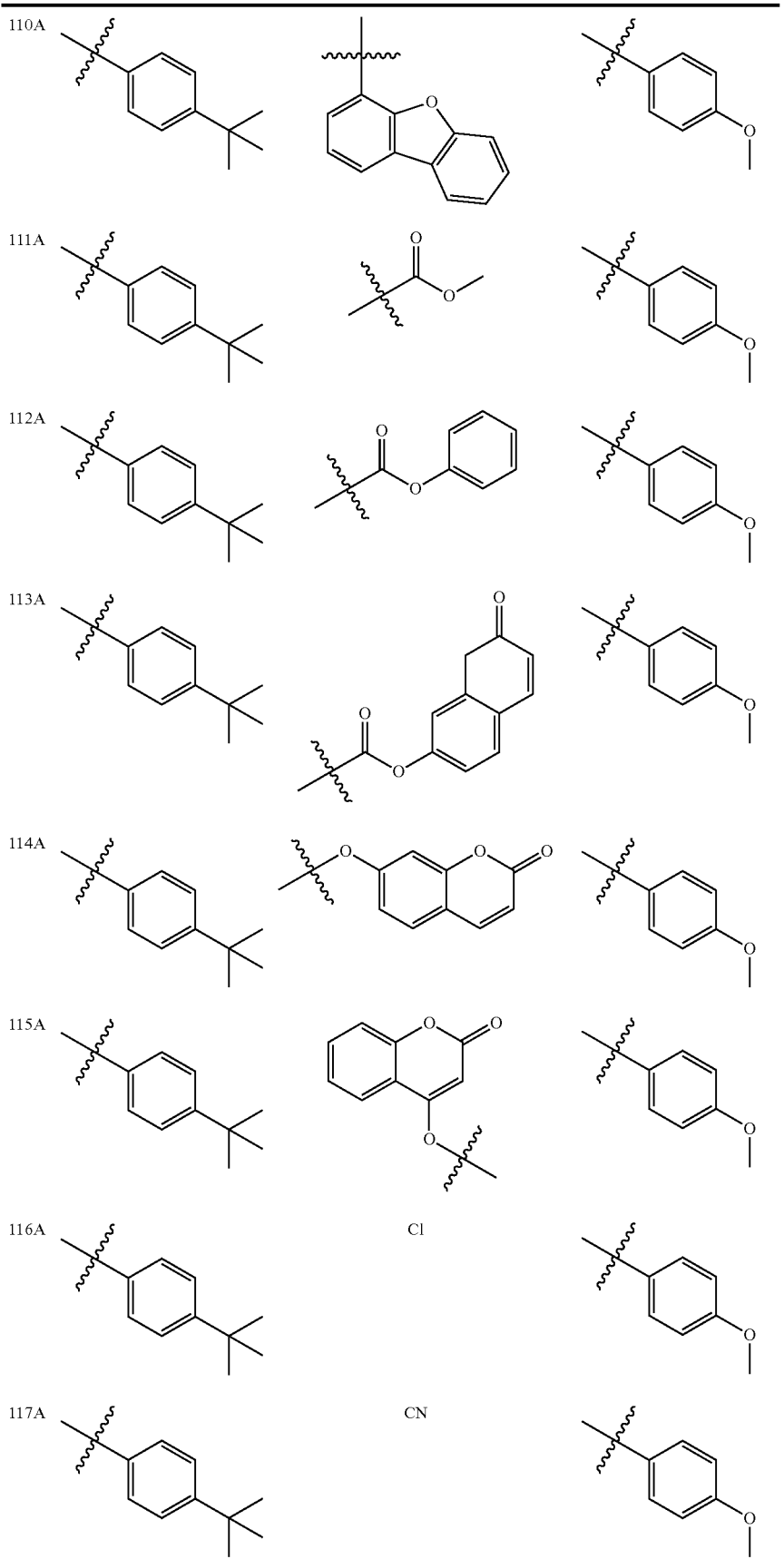

TABLE 1-continued
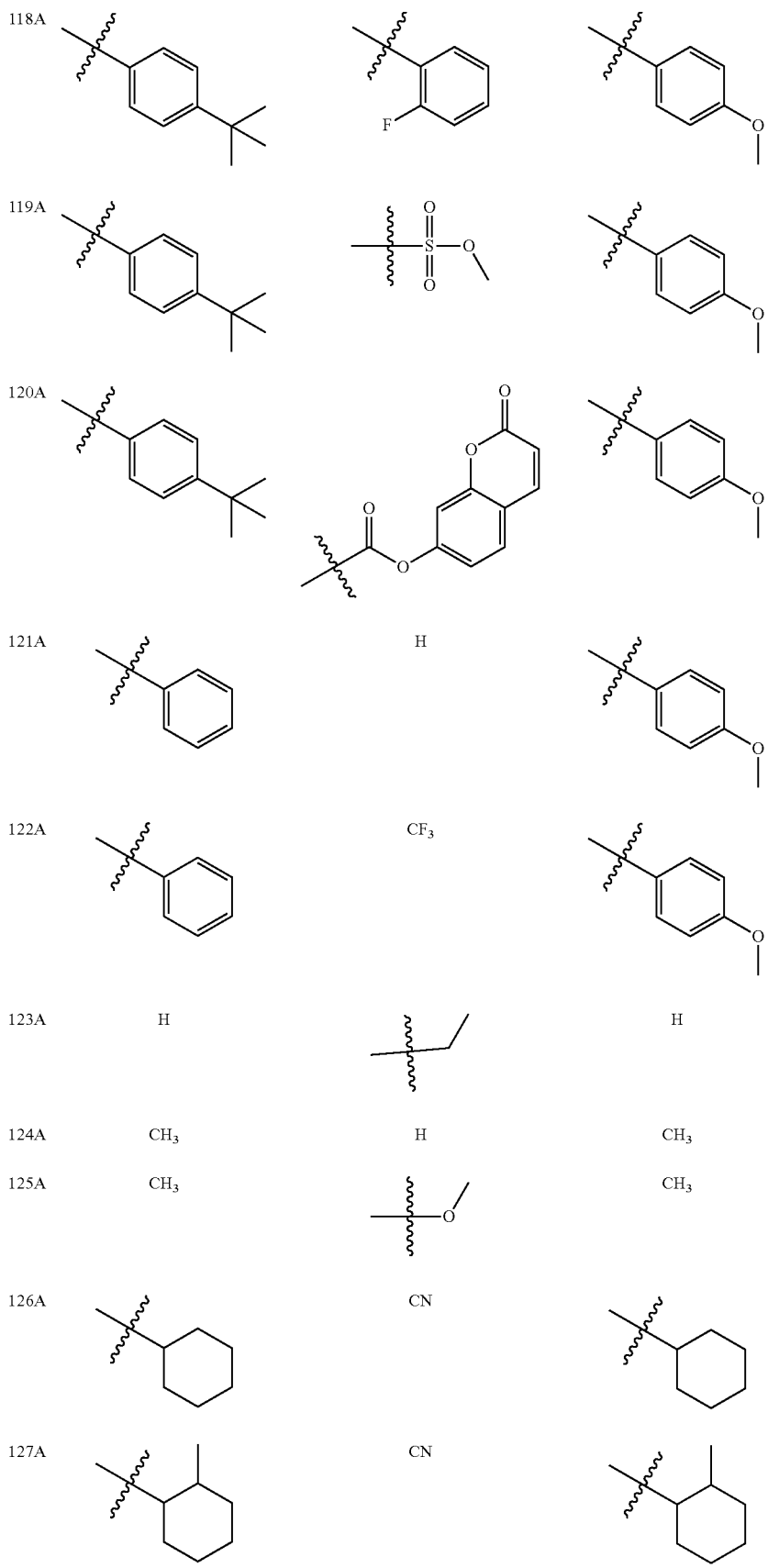

TABLE 1-continued
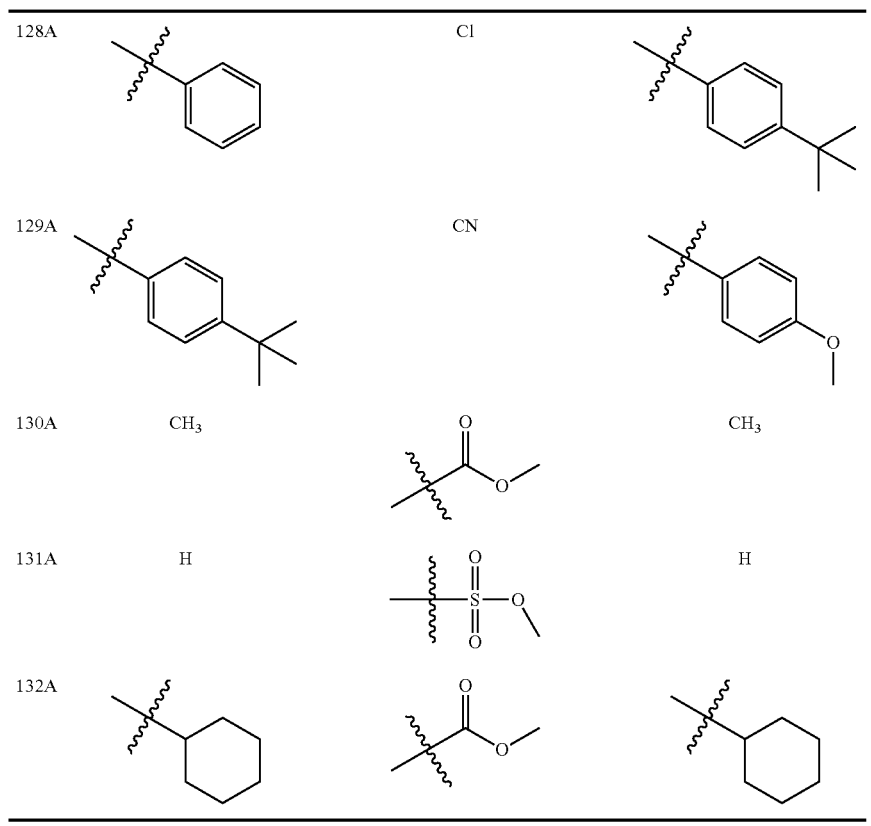
According to an exemplary embodiment of the present specification, a combination of X1 to X3 and R7 is any one from 1B to 101B of the following Table 2.
TABLE 2
| #B | X1 | X2 | X3 | R7 |
|----|----|----|----|----|
| 1B | F | F | O | CH₃ |
| 2B | F | F | O | phenyl |
| 3B | F | F | O | 2-fluorophenyl |
| 4B | F | F | O | 4-(trifluoromethyl)benzyl |
| 5B | F | F | O | coumarin-7-yl |

TABLE 2-continued
| #B | X1 | X2 | X3 | R7 |
|---|---|---|---|---|
| 6B | F | F | O | 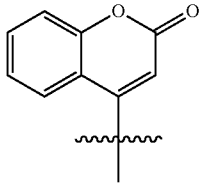 [SMILES: *c1cc(=O)oc2ccccc12] |
| 7B | F | F | O | 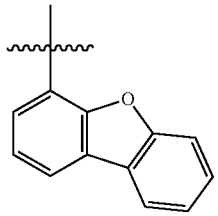 [SMILES: *c1cccc2c1oc1ccccc12] |
| 8B | CN | CN | O | CH₃ |
| 9B | CN | CN | O | 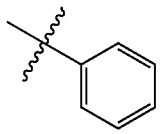 [SMILES: *c1ccccc1] |
| 10B | CN | CN | O | 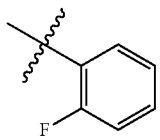 [SMILES: *c1ccccc1F] |
| 11B | CN | CN | O | 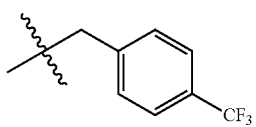 |
| 12B | CN | CN | O | 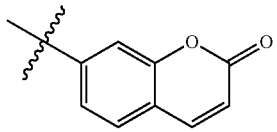 [SMILES: *c1ccc2ccc(=O)oc2c1] |
| 13B | CN | CN | O | 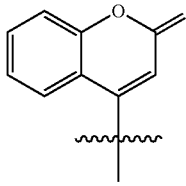 |
| 14B | CN | CN | O | 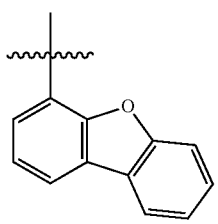 [SMILES: *c1cccc2c1oc1ccccc12] |

TABLE 2-continued

| #B | X1 | X2 | X3 | R7 |
|---|---|---|---|---|
| 15B | 4-tBu-phenyl-C≡C- | 4-tBu-phenyl-C≡C- | O | CH₃ |
| 16B | 4-tBu-phenyl-C≡C- | 4-tBu-phenyl-C≡C- | O | phenyl |
| 17B | 4-tBu-phenyl-C≡C- | 4-tBu-phenyl-C≡C- | O | 2-fluorophenyl |
| 18B | 4-tBu-phenyl-C≡C- | 4-tBu-phenyl-C≡C- | O | 4-(CF₃)benzyl |
| 19B | 4-tBu-phenyl-C≡C- | 4-tBu-phenyl-C≡C- | O | coumarin-7-yl |
| 20B | 4-tBu-phenyl-C≡C- | 4-tBu-phenyl-C≡C- | O | 4-methylcoumarin-4-yl |
| 21B | 4-tBu-phenyl-C≡C- | 4-tBu-phenyl-C≡C- | O | dibenzofuran-4-yl |

TABLE 2-continued

| #B | X1 | X2 | X3 | R7 |
|---|---|---|---|---|
| 22B | -O-C(=O)-CF₃ | -O-C(=O)-CF₃ | O | CH₃ |
| 23B | -O-C(=O)-CF₃ | -O-C(=O)-CF₃ | O | phenyl |
| 24B | -O-C(=O)-CF₃ | -O-C(=O)-CF₃ | O | 2-fluorophenyl |
| 25B | -O-C(=O)-CF₃ | -O-C(=O)-CF₃ | O | 4-(trifluoromethyl)benzyl |
| 26B | -O-C(=O)-CF₃ | -O-C(=O)-CF₃ | O | 2H-chromen-2-one-7-yl |
| 27B | -O-C(=O)-CF₃ | -O-C(=O)-CF₃ | O | 2H-chromen-2-one-4-yl |
| 28B | -O-C(=O)-CF₃ | -O-C(=O)-CF₃ | O | dibenzofuran-4-yl |
| 29B | -O-C₆H₄-NO₂ | -O-C₆H₄-NO₂ | O | CH₃ |
| 30B | -O-C₆H₄-NO₂ | -O-C₆H₄-NO₂ | O | phenyl |
| 31B | -O-C₆H₄-NO₂ | -O-C₆H₄-NO₂ | O | 2-fluorophenyl |

TABLE 2-continued

| #B | X1 | X2 | X3 | R7 |
| --- | --- | --- | --- | --- |
| 32B | 4-nitrophenoxy | 4-nitrophenoxy | O | 4-(trifluoromethyl)benzyl |
| 33B | 4-nitrophenoxy | 4-nitrophenoxy | O | 2H-chromen-2-one-7-yl |
| 34B | 4-nitrophenoxy | 4-nitrophenoxy | O | 4-methyl-2H-chromen-2-one-4-yl |
| 35B | 4-nitrophenoxy | 4-nitrophenoxy | O | dibenzofuran-4-yl |
| 36B | (2,2,3,3,4,4,4-heptafluorobutoxy) | (2,2,3,3,4,4,4-heptafluorobutoxy) | O | $CH_3$ |
| 37B | (2,2,3,3,4,4,4-heptafluorobutoxy) | (2,2,3,3,4,4,4-heptafluorobutoxy) | O | phenyl |
| 38B | (2,2,3,3,4,4,4-heptafluorobutoxy) | (2,2,3,3,4,4,4-heptafluorobutoxy) | O | 2-fluorophenyl |
| 39B | (2,2,3,3,4,4,4-heptafluorobutoxy) | (2,2,3,3,4,4,4-heptafluorobutoxy) | O | 4-(trifluoromethyl)benzyl |
| 40B | (2,2,3,3,4,4,4-heptafluorobutoxy) | (2,2,3,3,4,4,4-heptafluorobutoxy) | O | 2H-chromen-2-one-7-yl |

TABLE 2-continued
| #B | X1 | X2 | X3 | R7 |
|---|---|---|---|---|
| 41B | 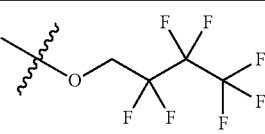 | 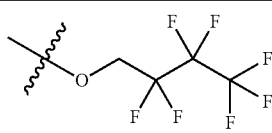 | O | 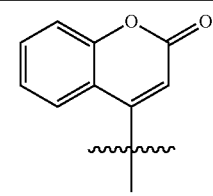 |
| 42B | 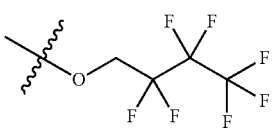 [SMILES: *OCC(F)(F)C(F)(F)C(F)(F)F] | 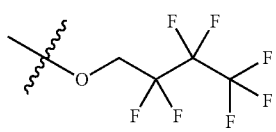 [SMILES: *OCC(F)(F)C(F)(F)C(F)(F)F] | O | 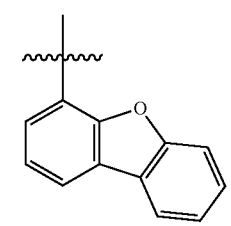 [SMILES: *c1cccc2c1oc1ccccc12] |
| 43B | F | F | S | CH₃ |
| 44B | F | F | S | 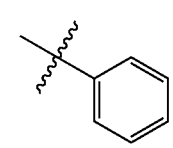 |
| 45B | F | F | S | 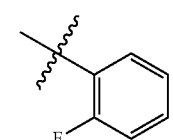 |
| 46B | F | F | S | 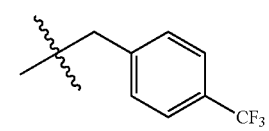 |
| 47B | F | F | S | 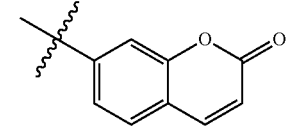 [SMILES: *c1ccc2ccc(=O)oc2c1] |
| 48B | F | F | S | 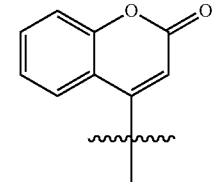 [SMILES: *c1cc(=O)oc2ccccc12] |
| 49B | F | F | S | 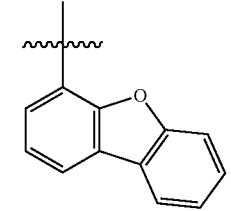 [SMILES: *c1cccc2c1oc1ccccc12] |
| 50B | CN | CN | S | CH₃ |

TABLE 2-continued
| #B | X1 | X2 | X3 | R7 |
|---|---|---|---|---|
| 51B | CN | CN | S | 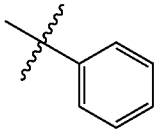 [SMILES: *c1ccccc1] |
| 52B | CN | CN | S | 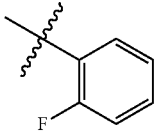 [SMILES: *c1ccccc1F] |
| 53B | CN | CN | S | 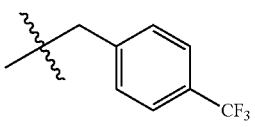 |
| 54B | CN | CN | S | 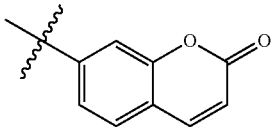 [SMILES: *c1ccc2ccc(=O)oc2c1] |
| 55B | CN | CN | S | 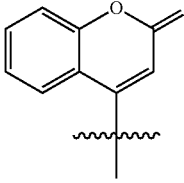 |
| 56B | CN | CN | S | 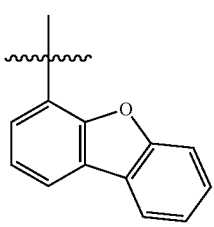 [SMILES: *c1cccc2c1oc1ccccc12] |
| 57B |  |  | S | CH3 |
| 58B | 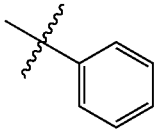 [SMILES: *c1ccccc1] | 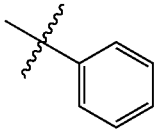 [SMILES: *c1ccccc1] | S | 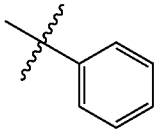 [SMILES: *c1ccccc1] |

TABLE 2-continued

| #B | X1 | X2 | X3 | R7 |
|---|---|---|---|---|
| 59B | 4-tBu-C6H4-C≡C- | 4-tBu-C6H4-C≡C- | S | 2-F-C6H4- |
| 60B | 4-tBu-C6H4-C≡C- | 4-tBu-C6H4-C≡C- | S | 4-CF3-C6H4-CH2- |
| 61B | 4-tBu-C6H4-C≡C- | 4-tBu-C6H4-C≡C- | S | coumarin-7-yl |
| 62B | 4-tBu-C6H4-C≡C- | 4-tBu-C6H4-C≡C- | S | coumarin-4-yl |
| 63B | 4-tBu-C6H4-C≡C- | 4-tBu-C6H4-C≡C- | S | dibenzofuran-4-yl |
| 64B | CF3C(O)O- | CF3C(O)O- | S | CH3 |
| 65B | CF3C(O)O- | CF3C(O)O- | S | C6H5- |
| 66B | CF3C(O)O- | CF3C(O)O- | S | 2-F-C6H4- |

TABLE 2-continued

| #B | X1 | X2 | X3 | R7 |
|---|---|---|---|---|
| 67B | -O-C(O)-CF₃ | -O-C(O)-CF₃ | S | -CH₂-C₆H₄-CF₃ (4-) |
| 68B | -O-C(O)-CF₃ | -O-C(O)-CF₃ | S | coumarin-7-yl |
| 69B | -O-C(O)-CF₃ | -O-C(O)-CF₃ | S | coumarin-4-yl (with methyl) |
| 70B | -O-C(O)-CF₃ | -O-C(O)-CF₃ | S | dibenzofuran-4-yl |
| 71B | -O-C₆H₄-NO₂ (4-) | -O-C₆H₄-NO₂ (4-) | S | CH₃ |
| 72B | -O-C₆H₄-NO₂ (4-) | -O-C₆H₄-NO₂ (4-) | S | phenyl |
| 73B | -O-C₆H₄-NO₂ (4-) | -O-C₆H₄-NO₂ (4-) | S | 2-fluorophenyl |
| 74B | -O-C₆H₄-NO₂ (4-) | -O-C₆H₄-NO₂ (4-) | S | -CH₂-C₆H₄-CF₃ (4-) |
| 75B | -O-C₆H₄-NO₂ (4-) | -O-C₆H₄-NO₂ (4-) | S | coumarin-7-yl |

TABLE 2-continued

| #B | X1 | X2 | X3 | R7 |
|---|---|---|---|---|
| 76B | -O-C6H4-NO2 (para) | -O-C6H4-NO2 (para) | S | 4-coumarinyl |
| 77B | -O-C6H4-NO2 (para) | -O-C6H4-NO2 (para) | S | dibenzofuran-4-yl |
| 78B | -O-CH2-C(F)2-C(F)2-CF3 | -O-CH2-C(F)2-C(F)2-CF3 | S | CH3 |
| 79B | -O-CH2-C(F)2-C(F)2-CF3 | -O-CH2-C(F)2-C(F)2-CF3 | S | phenyl |
| 80B | -O-CH2-C(F)2-C(F)2-CF3 | -O-CH2-C(F)2-C(F)2-CF3 | S | 2-fluorophenyl |
| 81B | -O-CH2-C(F)2-C(F)2-CF3 | -O-CH2-C(F)2-C(F)2-CF3 | S | 4-(trifluoromethyl)benzyl |
| 82B | -O-CH2-C(F)2-C(F)2-CF3 | -O-CH2-C(F)2-C(F)2-CF3 | S | 7-coumarinyl |
| 83B | -O-CH2-C(F)2-C(F)2-CF3 | -O-CH2-C(F)2-C(F)2-CF3 | S | 4-coumarinyl |
| 84B | -O-CH2-C(F)2-C(F)2-CF3 | -O-CH2-C(F)2-C(F)2-CF3 | S | dibenzofuran-4-yl |

TABLE 2-continued

| #B | X1 | X2 | X3 | R7 |
|---|---|---|---|---|
| 85B | 4-nitrobenzyl | 4-nitrobenzyl | O | CH₃ |
| 86B | 4-nitrobenzyl | 4-nitrobenzyl | O | phenyl |
| 87B | 4-nitrobenzyl | 4-nitrobenzyl | O | 2-fluorophenyl |
| 88B | 4-nitrobenzyl | 4-nitrobenzyl | O | 4-(trifluoromethyl)benzyl |
| 89B | 4-nitrobenzyl | 4-nitrobenzyl | O | coumarin-7-yl |
| 90B | 4-nitrobenzyl | 4-nitrobenzyl | S | CH₃ |
| 91B | 4-nitrobenzyl | 4-nitrobenzyl | S | phenyl |
| 92B | 4-nitrobenzyl | 4-nitrobenzyl | S | 2-fluorophenyl |
| 93B | 4-nitrobenzyl | 4-nitrobenzyl | S | 4-(trifluoromethyl)benzyl |
| 94B | 4-nitrobenzyl | 4-nitrobenzyl | S | coumarin-7-yl |
| 95B | 4-nitrobenzyl | 4-nitrobenzyl | S | coumarin-4-yl methyl |

TABLE 2-continued
| #B | X1 | X2 | X3 | R7 |
|---|---|---|---|---|
| 96B | 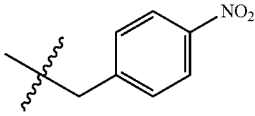 [SMILES: *Cc1ccc([N+](=O)[O-])cc1] | 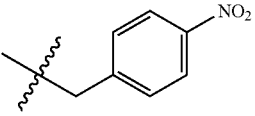 | S | 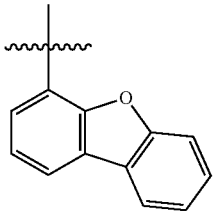 [SMILES: *c1cccc2c1oc1ccccc12] |
| 97B | F | F | O | 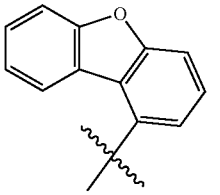 [SMILES: *c1cccc2oc3ccccc3c12] |
| 98B | CN | CN | O | 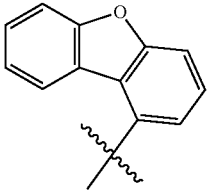 [SMILES: *c1cccc2oc3ccccc3c12] |
| 99B | 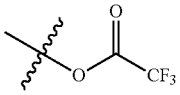 | 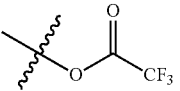 [SMILES: *OC(=O)C(F)(F)F] | S | 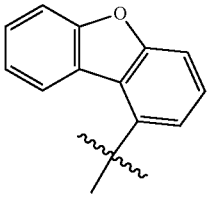 [SMILES: *c1cccc2oc3ccccc3c12] |
| 100B | 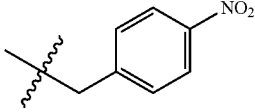 [SMILES: *Cc1ccc([N+](=O)[O-])cc1] | 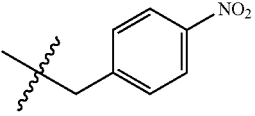 [SMILES: *Cc1ccc([N+](=O)[O-])cc1] | S | 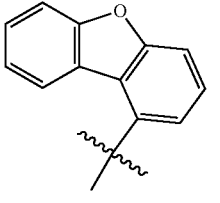 [SMILES: *c1cccc2oc3ccccc3c12] |
| 101B | F | F | O | 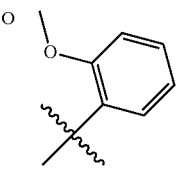 |

In Tables 1 and 2,

is a moiety bonded to Chemical Formula 1.

In an exemplary embodiment of the present specification, the compound of Chemical Formula 1 may be a combination of any one selected from Table 1 with any one selected from Table 2. For example, when 13A and 23B are selected from Table 1 and Table 2, respectively, the compound represented by Chemical Formula 1 has the following structure.

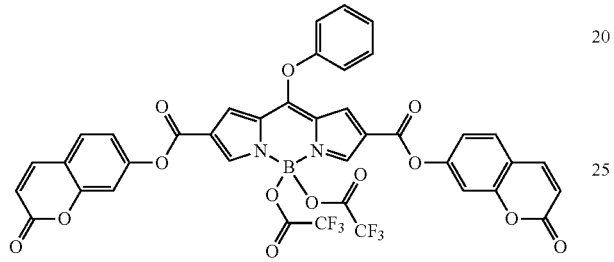

Specifically, Chemical Formula 1 may be any one selected from the following compounds.

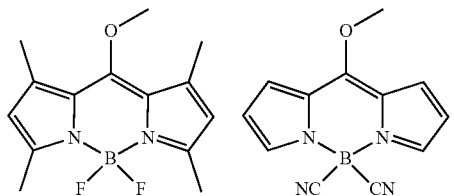

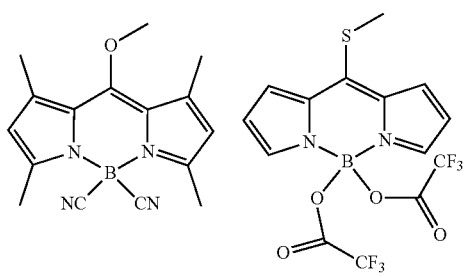

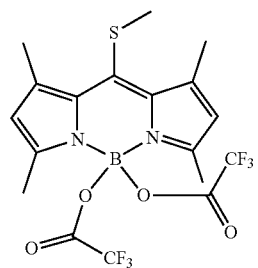

-continued

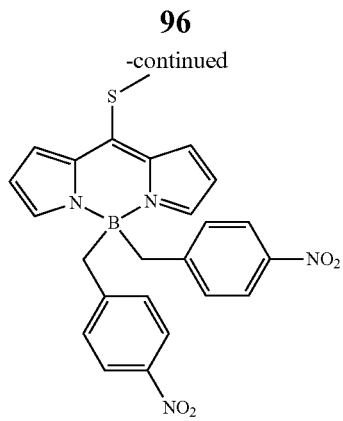

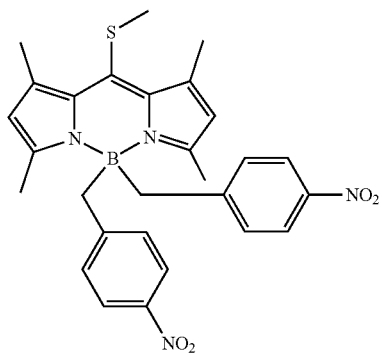

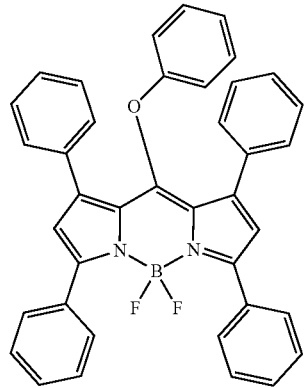

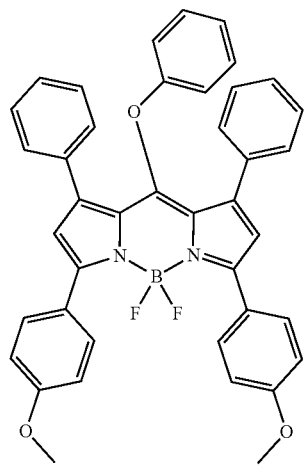

97
-continued
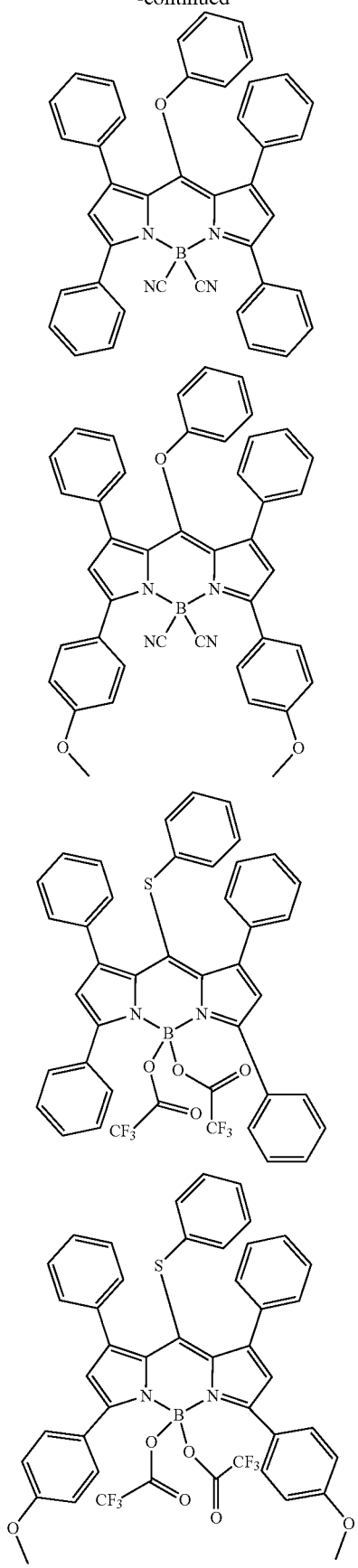
98
-continued
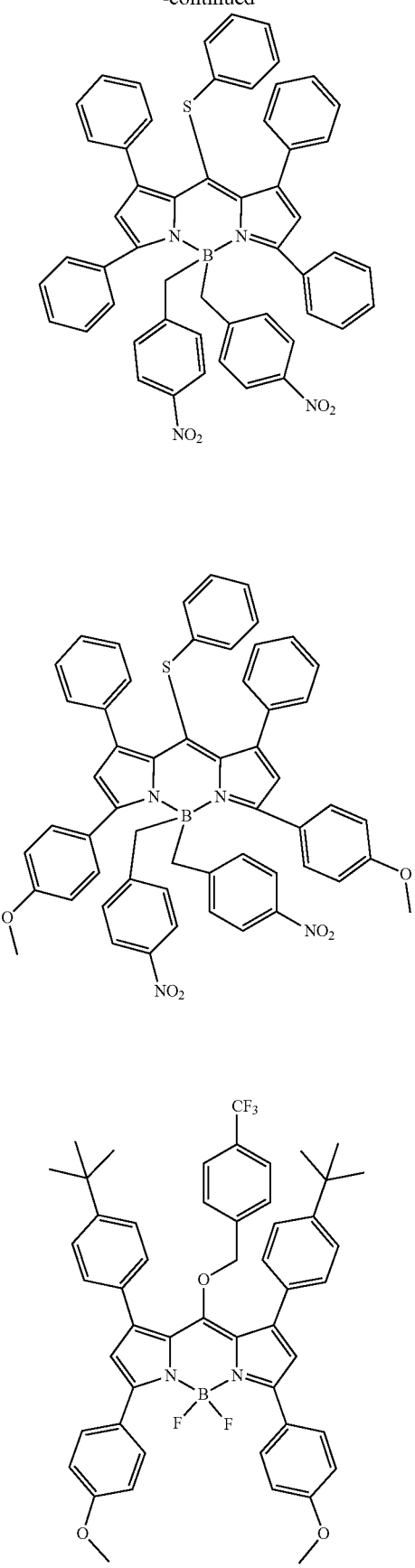

99
-continued
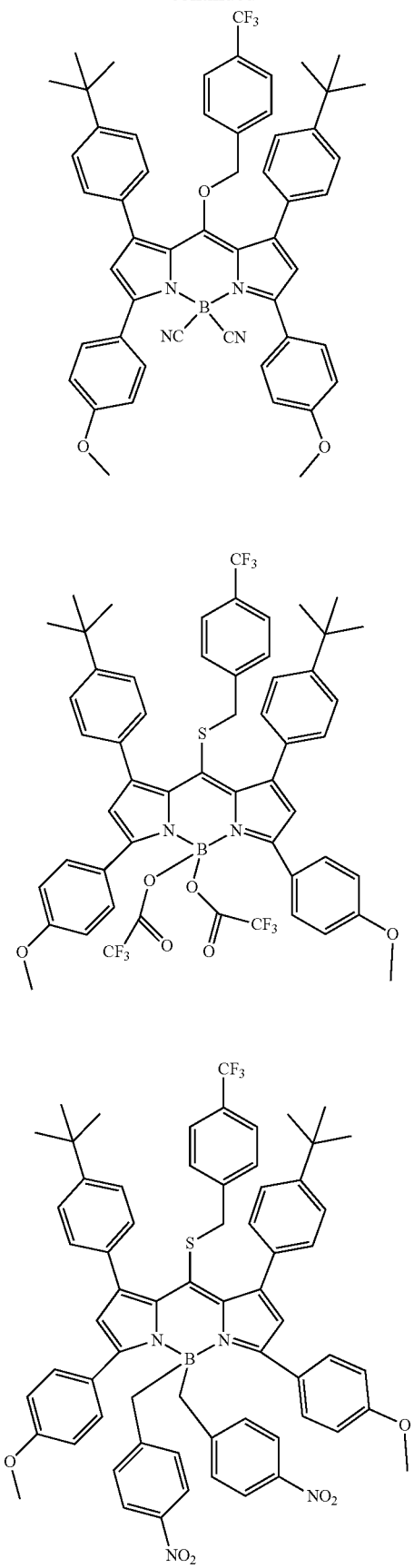
100
-continued
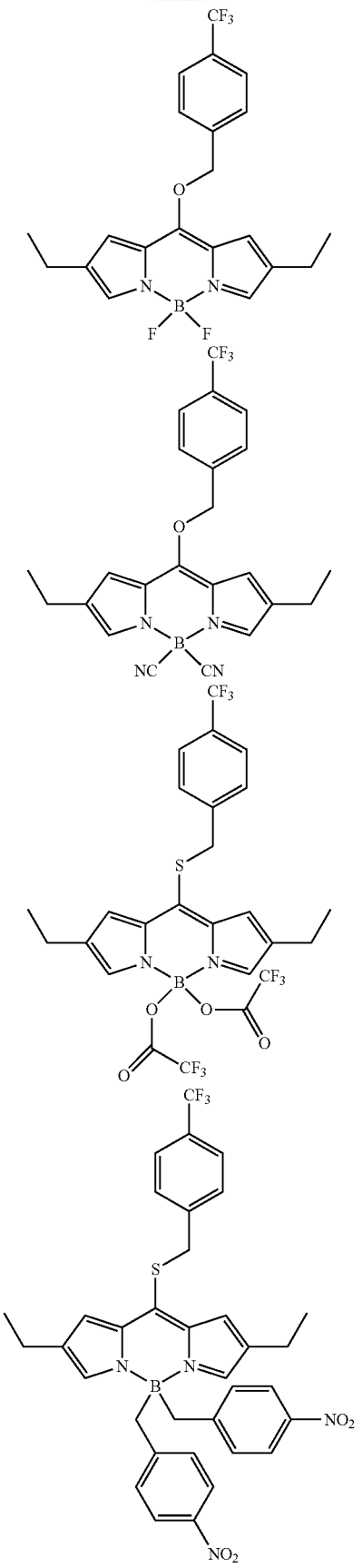

101
-continued
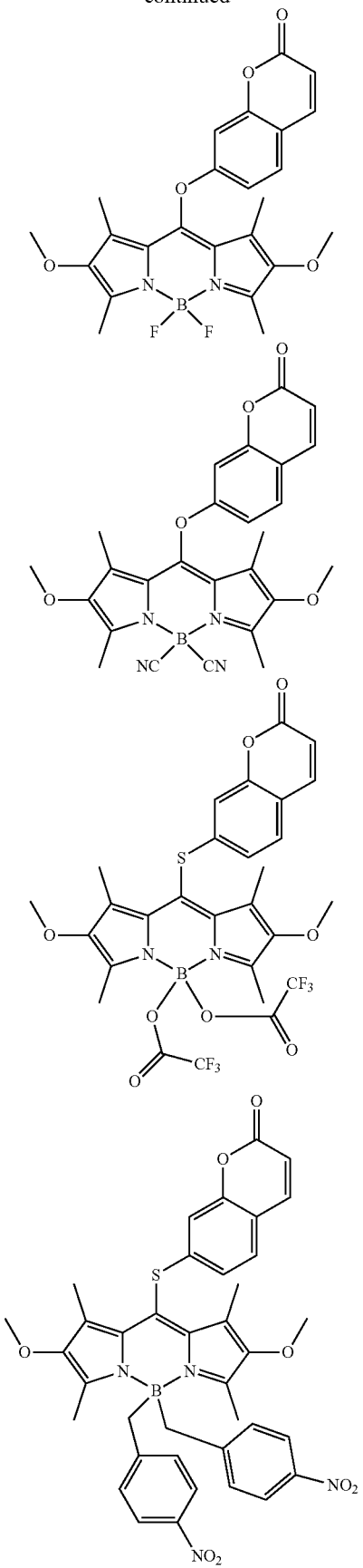
102
-continued
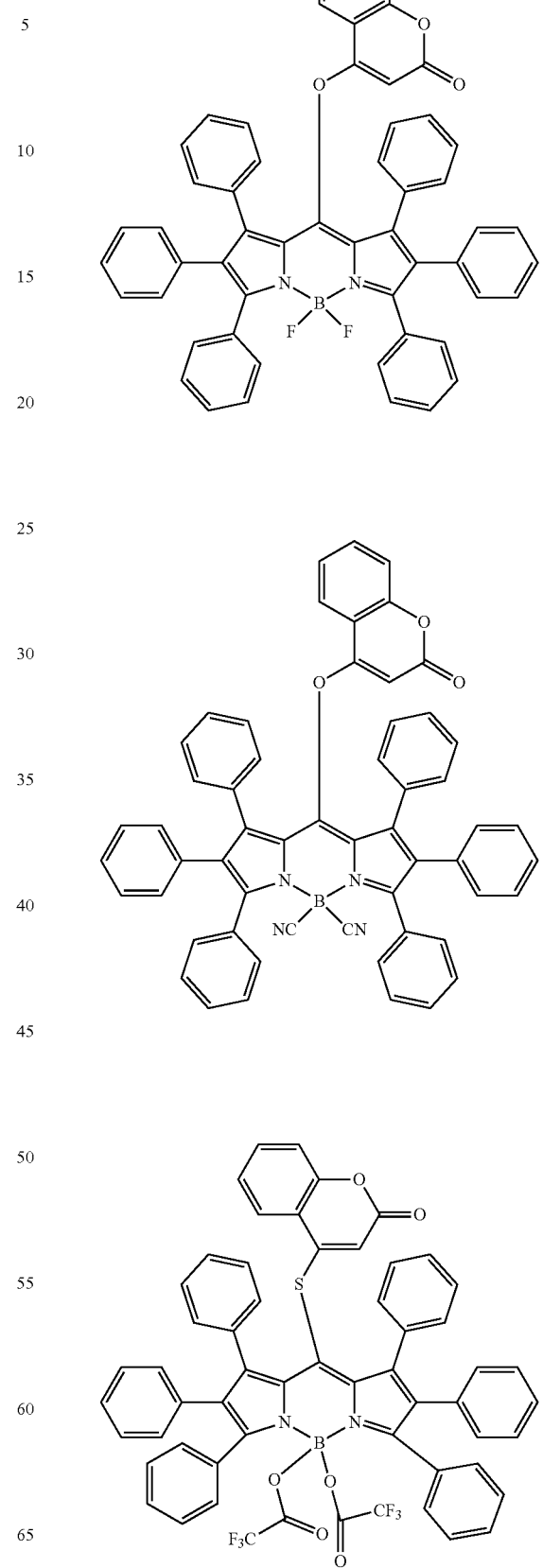

103
-continued
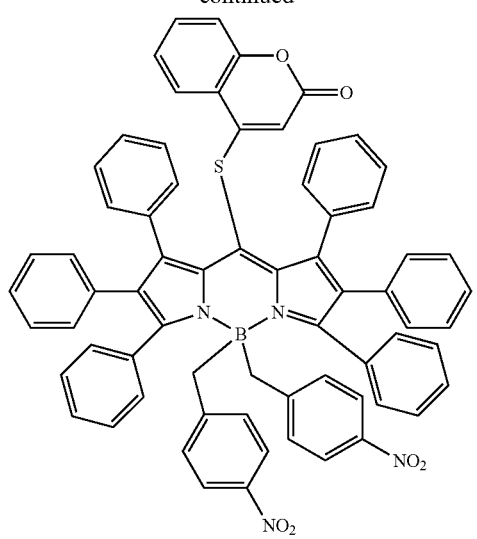
104
-continued
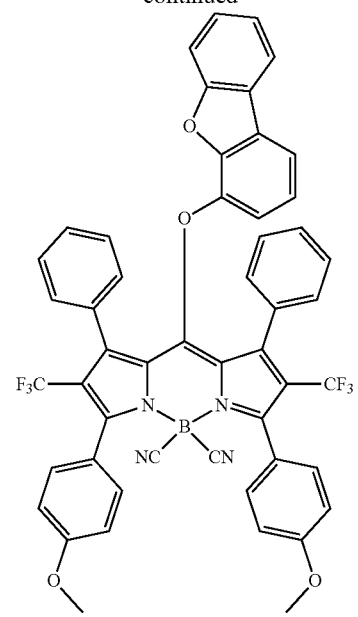
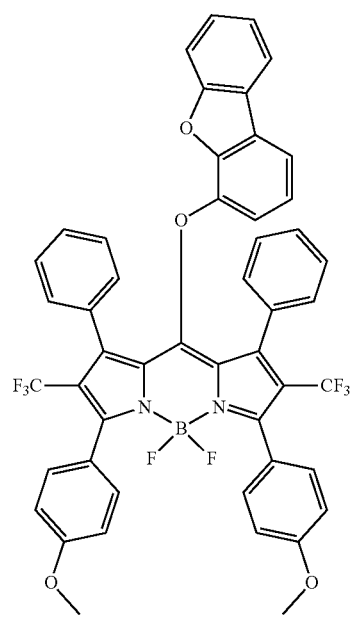
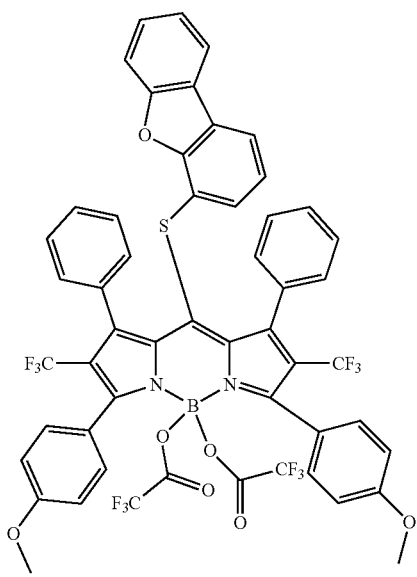

105
-continued
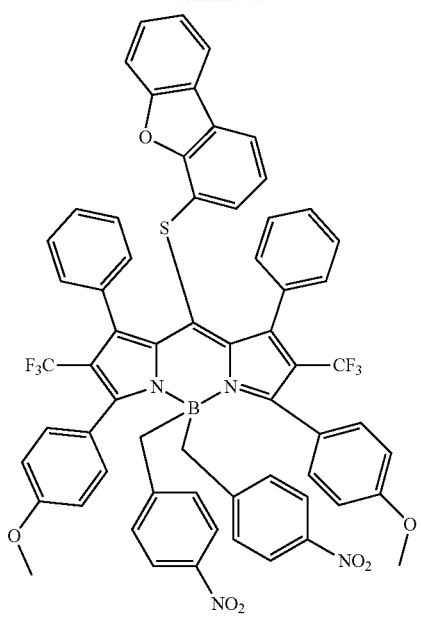
106
-continued
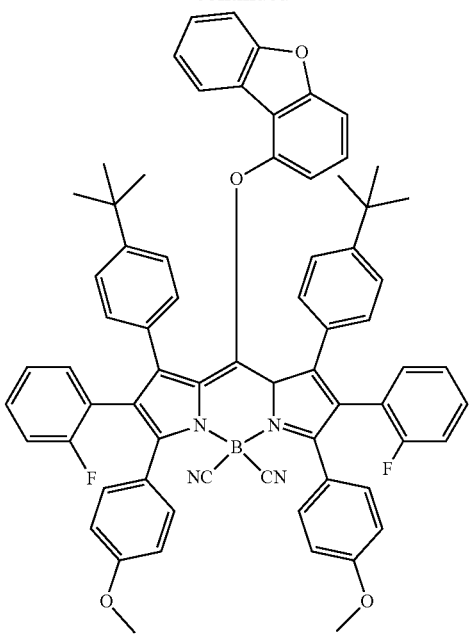
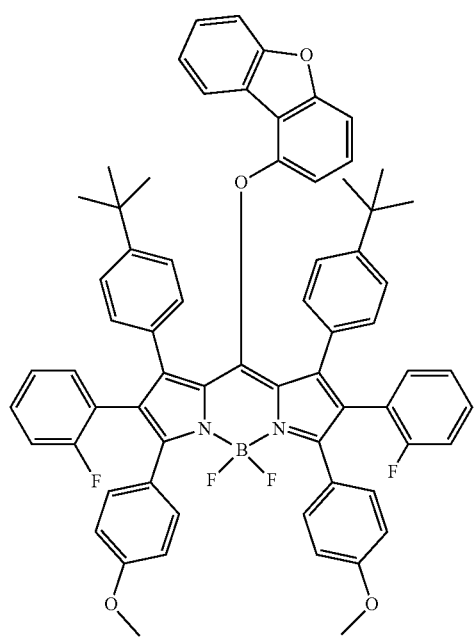
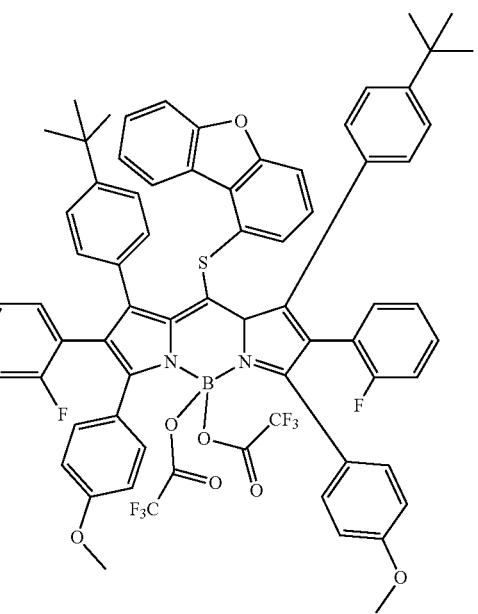

107
-continued
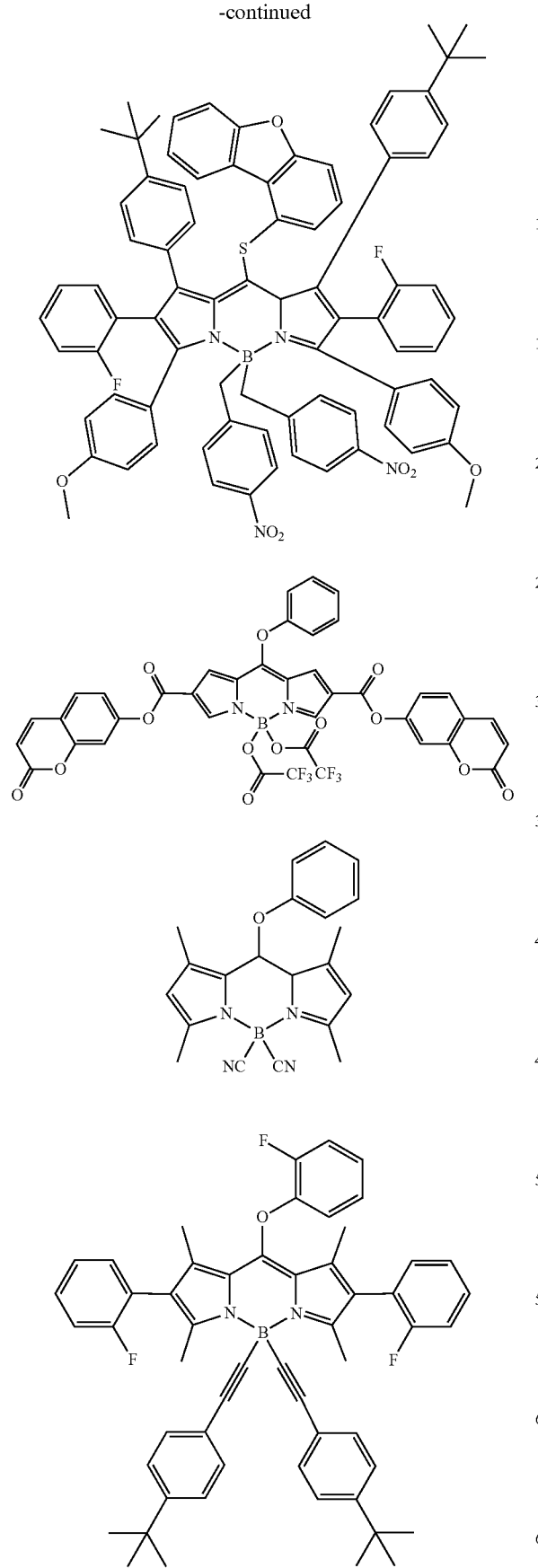
108
-continued
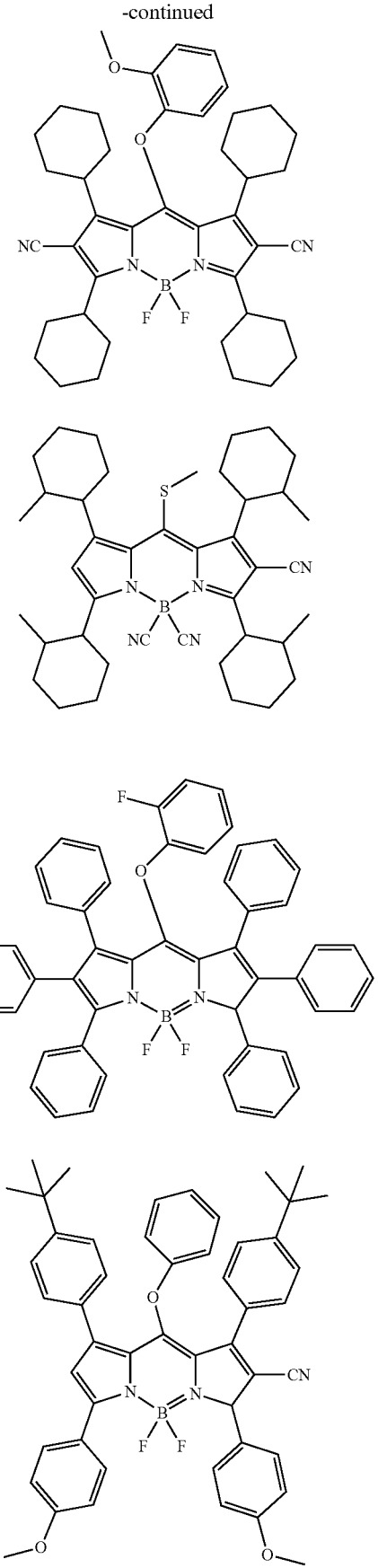

109
-continued
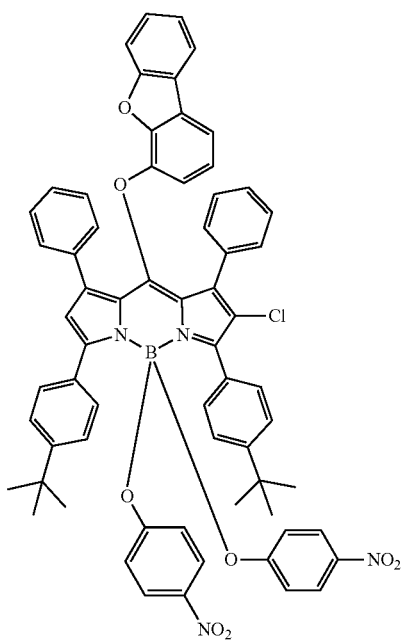
110
-continued
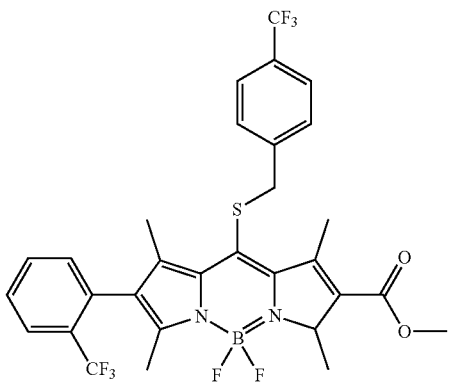
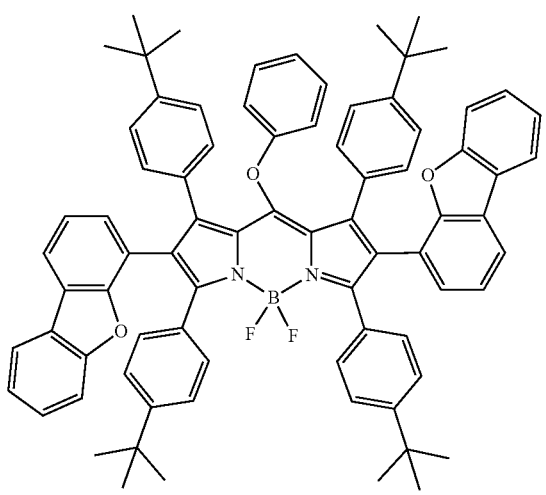
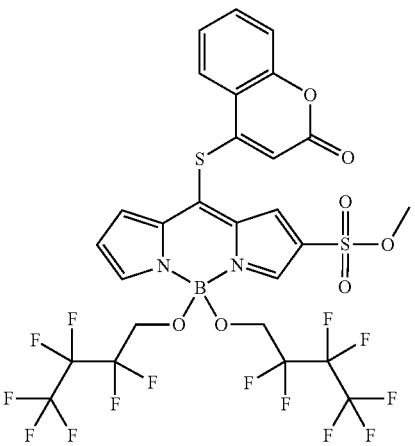
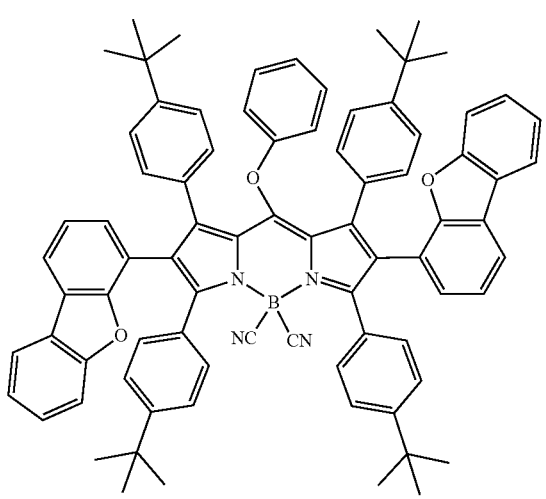
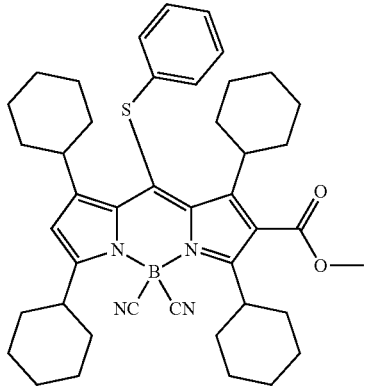

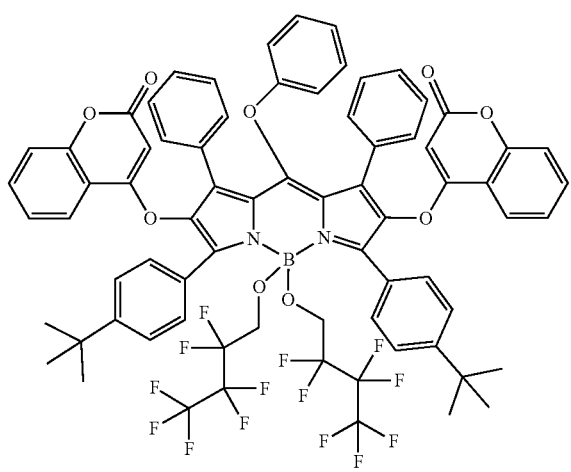

According to an exemplary embodiment of the present specification, a core of the compound represented by Chemical Formula 1 may be prepared by a general preparation method of the following reaction formula, but the method is not limited thereto.

[Reaction Formula]

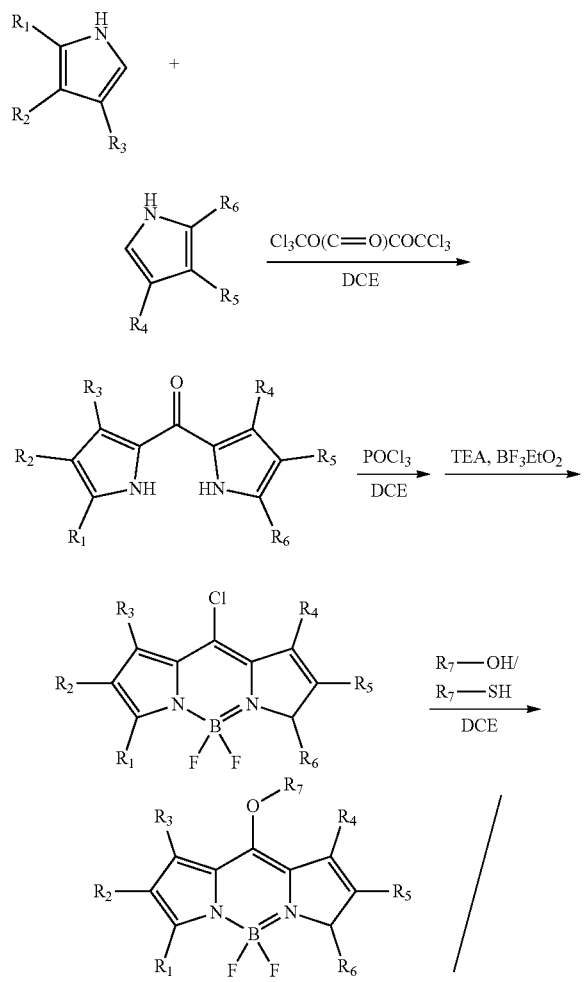

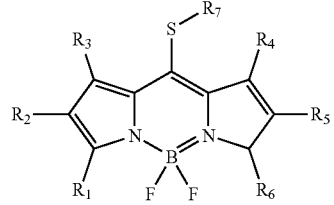

An exemplary embodiment of the present specification provides a color conversion film including: a resin matrix; and the compound which is dispersed in the resin matrix.

The content of the compound in the color conversion film may be within a range of 0.001 to 10 wt %.

The color conversion film may also include one or two or more of the compounds. For example, the color conversion film may include one compound which emits green light among the compounds represented by Chemical Formula 1. As another example, the color conversion film may include one compound which emits red light among the compounds represented by Chemical Formula 1. As still another example, the color conversion film may include one compound which emits green light and one compound which emits red light among the compounds represented by Chemical Formula 1.

The color conversion film may further include an additional fluorescent material in addition to the compound represented by Chemical Formula 1. When a light source which emits blue light is used, it is preferred that the color conversion film includes both a fluorescent material which emits green light and a fluorescent material which emits red light. Further, when a light source which emits blue light and green light is used, the color conversion film may include only a fluorescent material which emits red light. However, the color conversion film is not limited thereto, and even when a light source which emits blue light is used, the color conversion film may include only a compound, which emits red light, in the case where a separate film including a fluorescent material which emits green light is stacked. Conversely, even when a light source which emits blue light is used, the color conversion film may include only a compound, which emits green light, in the case where a separate film including a fluorescent material which emits red light is stacked.

The color conversion film may further include an additional layer including a compound which is dispersed in the resin matrix and emits light having a wavelength different from that of the compound represented by Chemical Formula 1; and a resin matrix. The compound which emits light having a wavelength different from that of the compound represented by Chemical Formula 1 may also be the compound expressed as Chemical Formula 1, and may also be another publicly-known fluorescent material.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (PU)-based material, a styrene-acrylonitrile (SAN)-based material, a polyvinylidenefluoride (PVDF)-based material, a modified-polyvinylidenefluoride (modified-PVDF)-based material, and the like.

According to an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a resin matrix and a particle having a high refractive index may be used, and it is possible to use, for example, $TiO_2$, silica, borosilicate, alumina, sapphire, air- or another gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin; or any suitable combination thereof.

The particle diameter of the light diffusion particles may be within a range of 0.1 μm to 5 μm, for example, within a range of 0.3 μm to 1 μm. The content of the light diffusion particles may be determined, if necessary, and may be, for example, within a range of about 1 part by weight to about 30 parts by weight based on 100 parts by weight of the resin matrix.

The color conversion film according to the above-described exemplary embodiment may have a thickness of 2 μm to 200 μm. In particular, the color conversion film may exhibit high brightness even in a small thickness of 2 μm to 20 μm. This is because the content of the fluorescent material molecule included in a unit volume is higher than that of a quantum dot.

A base material may be provided on one surface of the color conversion film according to the above-described exemplary embodiment. The base material may function as a support when preparing the color conversion film. The kind of base material is not particularly limited, and the material or thickness of the base material is not limited as long as the base material is transparent and may function as the support. Here, transparency means that the transmittance of visible light is 70% or more. For example, as the base material, a PET film may be used.

The above-described color conversion film may be prepared by coating a resin solution, in which the above-described compound represented by Chemical Formula 1 is dissolved, on a base material and drying the resin solution, or extruding the above-described compound represented by Chemical Formula 1 together with the resin to produce a film.

Since the above-described compound represented by Chemical Formula 1 is dissolved in the resin solution, the compound represented by Chemical Formula 1 is uniformly distributed in the solution. This is different from a process of preparing a quantum dot film, which requires a separate dispersing process.

The preparation method of the resin solution in which the compound represented by Chemical Formula 1 is dissolved is not particularly limited as long as the above-described compound represented by Chemical Formula 1 is in a state where the resin is dissolved in the solution.

According to an example, the resin solution in which the compound represented by Chemical Formula 1 is dissolved may be prepared by a method including: dissolving the compound represented by Chemical Formula 1 in a solvent to prepare a first solution, dissolving a resin in a solvent to prepare a second solution, and mixing the first solution with the second solution. When the first solution and the second solution are mixed, it is preferred to uniformly mix the solutions. However, the method is not limited thereto, and it is possible to use a method of simultaneously adding a compound represented by Chemical Formula 1 and a resin to a solvent to dissolve the compound and the resin, a method of dissolving the compound represented by Chemical Formula 1 in a solvent, and subsequently adding the resin thereto to dissolve the resin, a method of dissolving the resin in a solvent, and subsequently adding the compound represented by Chemical Formula 1 thereto to dissolve the compound, and the like.

As the resin included in the solution, it is possible to use the above-described resin matrix material, a monomer which is curable as the resin matrix material, or a mixture thereof. Examples of the monomer which is curable as the resin matrix material include a (meth)acrylic monomer, and the monomer may be formed of a resin matrix material by UV curing. When a curable monomer is used as described above, an initiator required for curing may be further added, if necessary.

The solvent is not particularly limited, and is not particularly limited as long as the solvent may be removed by a subsequent drying while not adversely affecting the coating process. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more thereof may be used. When the first solution and the second solution are used, the solvents included in each of the solutions may also be the same as or different from each other. Even when different solvents are used in the first solution and the second solution, it is preferred that these solvents have compatibility so as to be mixed with each other.

For the process of coating the resin solution, in which the compound represented by Chemical Formula 1 is dissolved, on a base material, a roll-to-roll process may be used. For example, the roll-to-roll process may be performed by a process of unwinding a base material from a roll on which the base material is wound, coating a resin solution, in which the compound represented by Chemical Formula 1 is dissolved, on one surface of the base material, drying the resin solution, and then winding the base material again on the roll. When the roll-to-roll process is used, it is preferred that the viscosity of the resin solution is determined within a range in which the process may be implemented, and the viscosity may be determined within a range of, for example, 200 cps to 2,000 cps.

As the coating method, various publicly-known methods may be used, and for example, a die coater may also be used, and various bar-coating methods such as a comma coater and a reverse comma coater may also be used.

After the coating, a drying process is performed. The drying process may be performed under conditions required for removing the solvent. For example, it is possible to obtain a color conversion film including a fluorescent material including the compound represented by Chemical Formula 1, which has desired thickness and concentration, on a base material by carrying out the drying in an oven located close to a coater under a condition to sufficiently evaporate a solvent, in a direction in which the base material progresses during the coating process.

When the monomer which is curable as the resin matrix material is used as a resin included in the solution, curing, for example, UV curing may be performed before the drying or simultaneously with the drying.

When the compound represented by Chemical Formula 1 is extruded with a resin to produce a film, an extrusion method known in the art may be used, and for example, a color conversion film may be prepared by extruding the compound represented by Chemical Formula 1 with a resin such as a polycarbonate (PC)-based resin, a poly(meth)acrylic resin, and a styrene-acrylonitrile (SAN)-based resin.

According to an exemplary embodiment of the present specification, a protective film or a barrier film may be provided on at least one surface of the color conversion film. As the protective film and the barrier film, films known in the art may be used.

An exemplary embodiment of the present specification provides a backlight unit including the above-described color conversion film. The backlight unit may have a backlight unit configuration known in the art, except that the backlight unit includes the color conversion film. FIG. 1 illustrates a schematic view of a backlight unit structure according to an example. The backlight unit according to FIG. 1 includes a side chain-type light source 101, a reflective plate 102 which surrounds the light source, a light guide plate 103 which guides light directly emitted from the light source, or reflected from the reflective plate, a reflective layer 104 which is provided on one surface of the light guide plate, and a color conversion film 105 which is provided on a surface opposite to a surface facing the reflective layer of the light guide plate. A part indicated as grey in FIG. 1 is a light dispersion pattern 106 of the light guide plate. The light incident inside the light guide plate has an irregular light distribution due to the repetition of an optical process such as reflection, total reflection, refraction, and transmission, and a 2-dimensional light dispersion pattern may be used in order to guide the irregular light distribution to have a uniform luminance. However, the scope of the present invention is not limited by FIG. 1, and not only a side chain-type light source but also a direct-type light source may also be used as the light source, and the reflective plate or the reflective layer may be omitted or may also be replaced with another configuration, if necessary, and an additional film, for example, a light diffusion film, a light collecting film, a brightness enhancement film, and the like may be further provided, if necessary.

An exemplary embodiment of the present specification provides a display device including the backlight unit. The display device is not particularly limited as long as the display device is a display device including a backlight unit, and may be included in a TV, a monitor of a computer, a laptop computer, a mobile phone, and the like.

MODE FOR INVENTION

Hereinafter, the present specification will be described in detail with reference to Examples for specifically describing the present specification. However, the Examples according to the present specification may be modified in various forms, and it is not interpreted that the scope of the present specification is limited to the Examples described below. The Examples of the present specification are provided to more completely explain the present specification to a person with ordinary skill in the art.

Preparation Example 1. Synthesis of Compound 1

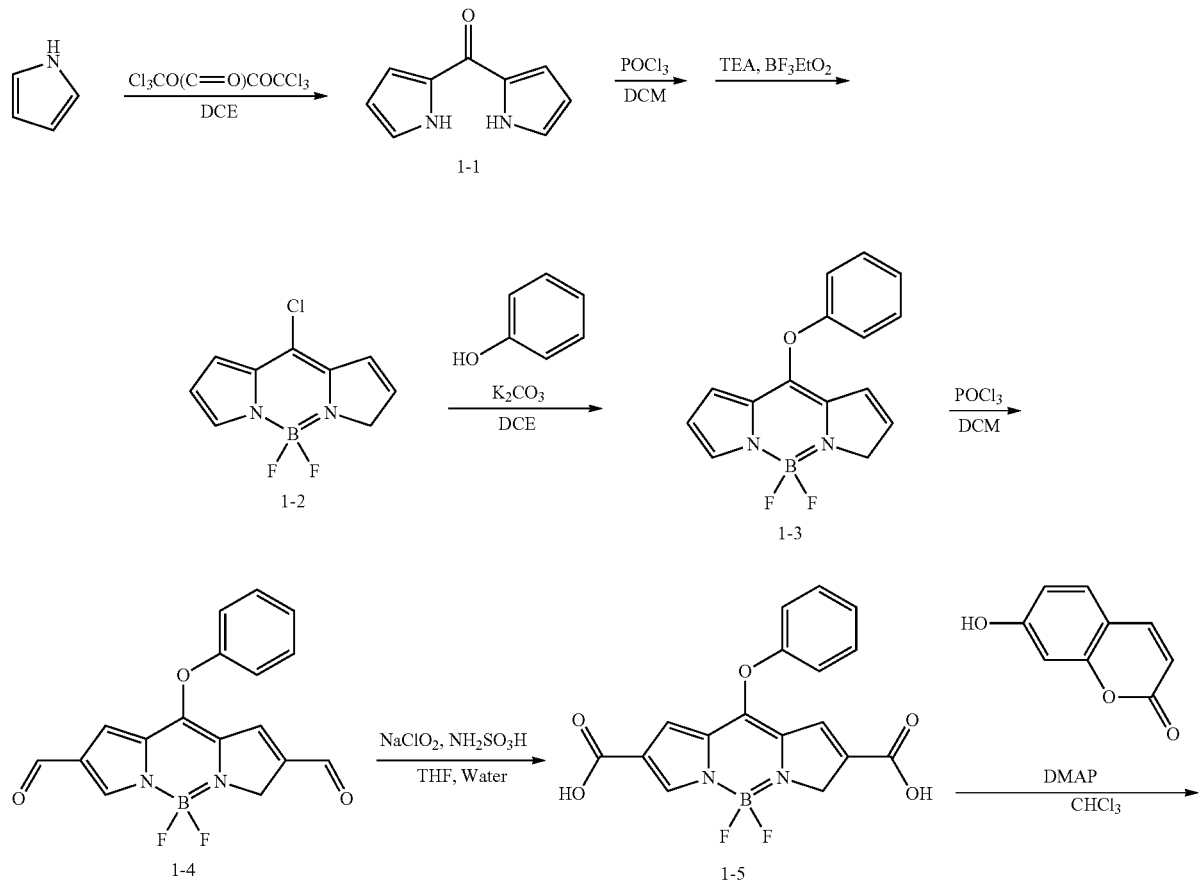

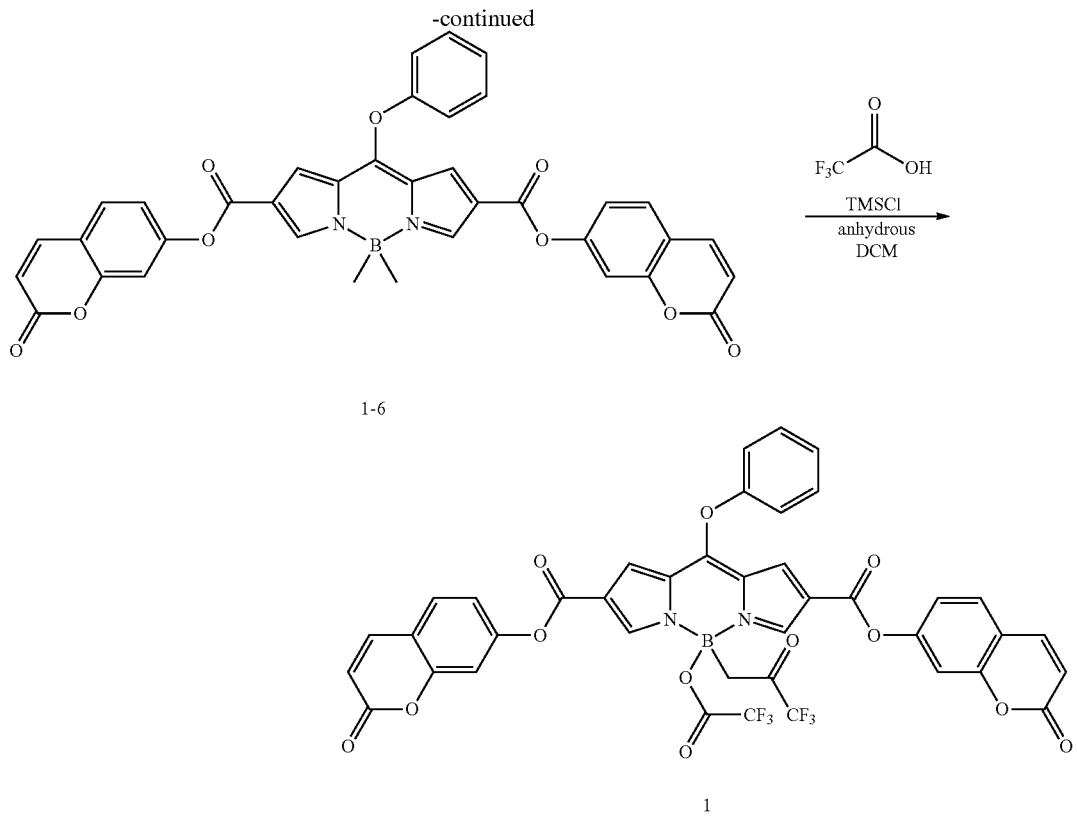

(1) Synthesis of Compound 1-1

After 0.3 equivalent of triphosgene was dissolved in dichloroethane (DCE), the resulting solution was put into 5 g of pyrrole (1 equivalent, 72 mmol), a solution in which 0.1 equivalent of triethylamine was dissolved in dichloroethane was additionally put thereinto at 0° C. and under a nitrogen atmosphere, and then the resulting mixture was maintained for 2 hours. Thereafter, 1 equivalent of pyrrole was additionally put thereinto, and the resulting mixture was heated at about 80° C. for 30 minutes. After the reaction was terminated, the reactant was put into diethyl ether, and the organic layer was separated by using water. The organic layer was dried over sodium sulfate, and then column-separated by using silica gel to obtain 4 g of Compound 1-1. (Yield: 35%)

(2) Synthesis of Compound 1-2

4 g of Compound 1-1 was dissolved in dichloromethane, and then 2 equivalents of phosphoryl chloride (POCl₃) were put thereinto, and the resulting mixture was heated for 3 hours. After the reaction was terminated, the product was cooled to room temperature, 10 equivalents of triethylamine (TEA) were put thereinto, and the resulting mixture was maintained at 0° C. Thereafter, 11 equivalents of boron trifluoride diethyl etherate (BF₃OEt₂) were slowly put thereinto, and the resulting mixture was stirred at room temperature for about 2 hours. After the reaction was terminated, the organic layer was extracted from the mixture by using diethyl ether and water. The extracted organic layer was dried over sodium sulfate, and then filtered by using a silica pad to obtain 3.3 g of Compound 1-2. (Yield: 58%)

(3) Synthesis of Compound 1-3

After 3.3 g of Compound 1-2 was dissolved in dichloromethane, 1 equivalent of phenol and 1 equivalent of potassium carbonate (K₂CO₃) were put thereinto. After the mixture was stirred at room temperature under a nitrogen atmosphere for 10 minutes, the organic layer was extracted by using a solution of diethyl ether and sodium carbonate. The extracted organic layer was dried over sodium sulfate to obtain 3.4 g of Compound 1-3. 82%) (Yield: 82%)

(4) Synthesis of Compound 1-4

30 mL of each of POCl₃ and dimethylformamide (DMF) were put into a dichloroethane solvent at 0° C. under a nitrogen atmosphere, and the resulting mixture was stirred. After 1 hour, Compound 1-3 was put into the mixed solution, and the resulting mixture was heated and stirred. After the reaction was terminated, the temperature was lowered to 0° C., and a sodium bicarbonate solution was put thereinto until the pH became neutral. The organic layer was extracted by using water and chloroform. The extracted organic layer was dried by using sodium sulfate to obtain 3.2 g of Compound 1-4. (Yield: 80%)

(5) Synthesis of Compound 1-5

After 3.2 g of Compound 1-4 was dissolved in a tetrahydrofuran (THF) solvent, 3 equivalents of amidosulfonic acid (NH₂SO₃H) dissolved in water were put thereinto, and the resulting mixture was stirred at room temperature. The temperature was lowered to 0° C., sodium chloride (NaClO₂) dissolved in water was slowly put thereinto, and then the reaction was confirmed. When the reaction was terminated, the organic material was washed by using a sodium thiosulfate solution, and then dried by using sodium sulfate. Thereafter, the solvent was evaporated to obtain 3 g of Compound 1-5. (Yield: 88%)

(6) Synthesis of Compound 1-6

3 g of Compound 1-5, 1.05 equivalents of coumarin, 1.1 equivalents of dimethylaminopyridine (DMAP), and 1.1 equivalents of dimethylaminopropyl ethylcarbodiimide hydrochloride (EDC-HCL) were put into chloroform (CHCl$_3$), and the resulting mixture was heated and stirred. After the reaction was terminated, the product was cooled to room temperature, water was put thereinto, and an extraction was performed. The organic layer was dried by using sodium sulfate, and the solvent was evaporated. Thereafter, the resulting solution was stirred by using an ethanol solvent to obtain 4.1 g of Compound 1-6. (Yield: 78%)

(7) Synthesis of Compound 1

20 equivalents of trifluoroacetic acid and 24 equivalents of trimethylsilyl chloride (TMS-Cl) were put into anhydrous dichloromethane (DCM) at room temperature under a nitrogen atmosphere, and the resulting mixture was stirred. Thereafter, a reaction was performed for 16 hours by heating the mixture to 90° C., and then the reactant was put into a flask in which 4 g of Compound 1-6 was dissolved in anhydrous dichloromethane through a cannula. The resulting mixture was continuously stirred at 90° C., and when the reaction was terminated, the organic layer was extracted by using water and dichloromethane. The extracted organic layer was dried by using sodium sulfate and purified through a silica gel column to obtain 2 g of Compound 1. (Yield: 38%)

HR LC/MS/MS m/z calcd for C$_{39}$H$_{19}$BF$_6$N$_2$O$_{13}$ (M+): 848.0884; found: 848.0879

Preparation Example 2. Synthesis of Compound 2

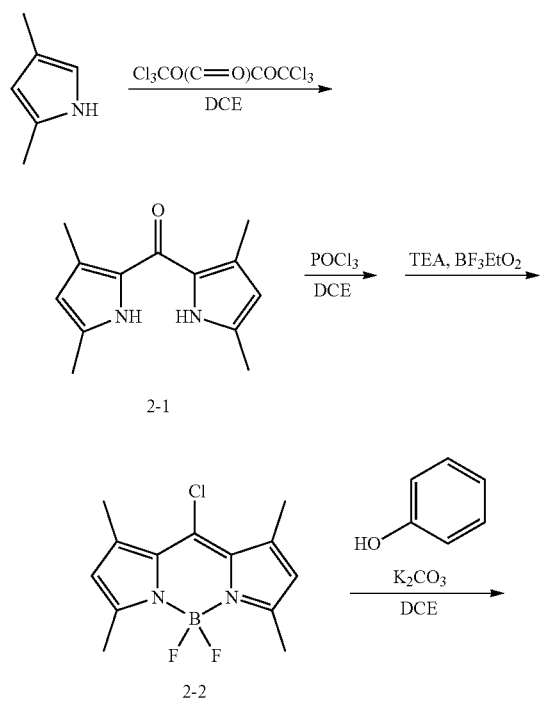

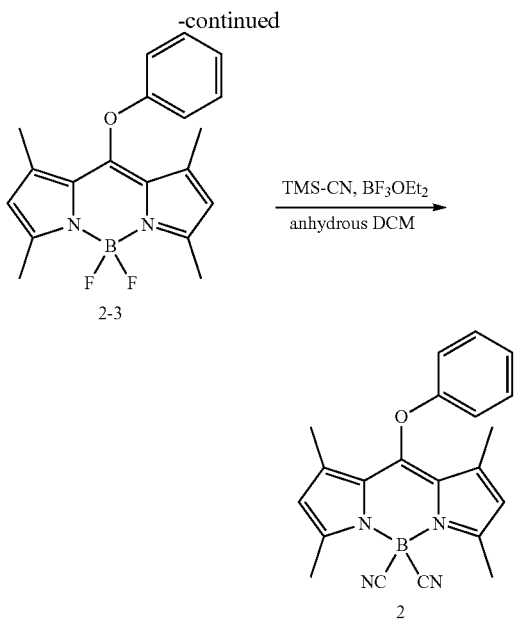

(1) Synthesis of Compound 2-1

5.9 g of Compound 2-1 was obtained by performing synthesis in the same manner as in the synthesis of Compound 1-1, except that 5 g of dimethylpyrrole was used instead of pyrrole. (Yield: 52%)

(2) Synthesis of Compound 2-2

6.1 g of Compound 2-2 was obtained by performing synthesis in the same manner as in the synthesis of Compound 1-2, except that Compound 2-1 was used instead of Compound 1-1. (Yield: 79%)

(3) Synthesis of Compound 2-3

6.1 g of Compound 2-3 was obtained by performing synthesis in the same manner as in the synthesis of Compound 1-3, except that Compound 2-2 was used instead of Compound 1-2. (Yield: 83%)

(4) Synthesis of Compound 2

6.1 g of Compound 2-3 was dissolved in anhydrous dichloromethane, and then the resulting solution was maintained at 0° C. 15 equivalents of trimethylsilyl cyanide (TMS-CN) and 5 equivalents of BF$_3$OEt$_2$ were sequentially and slowly put thereinto, and the reaction was confirmed. After the reaction was terminated, an extraction was performed by using water and chloroform, and the extracted organic layer was dried by using sodium sulfate. The organic layer was purified into a solid by using methanol to obtain 3.7 g of Compound 2. (Yield: 59%)

LC/MS/MS m/z calcd for C$_{21}$H$_{19}$BN$_4$O (M+): 354.1652; found: 354.1655

Preparation Example 3. Synthesis of Compound 3

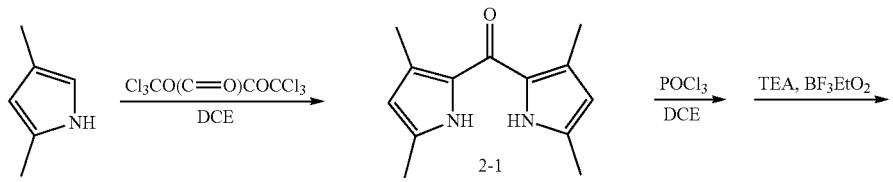

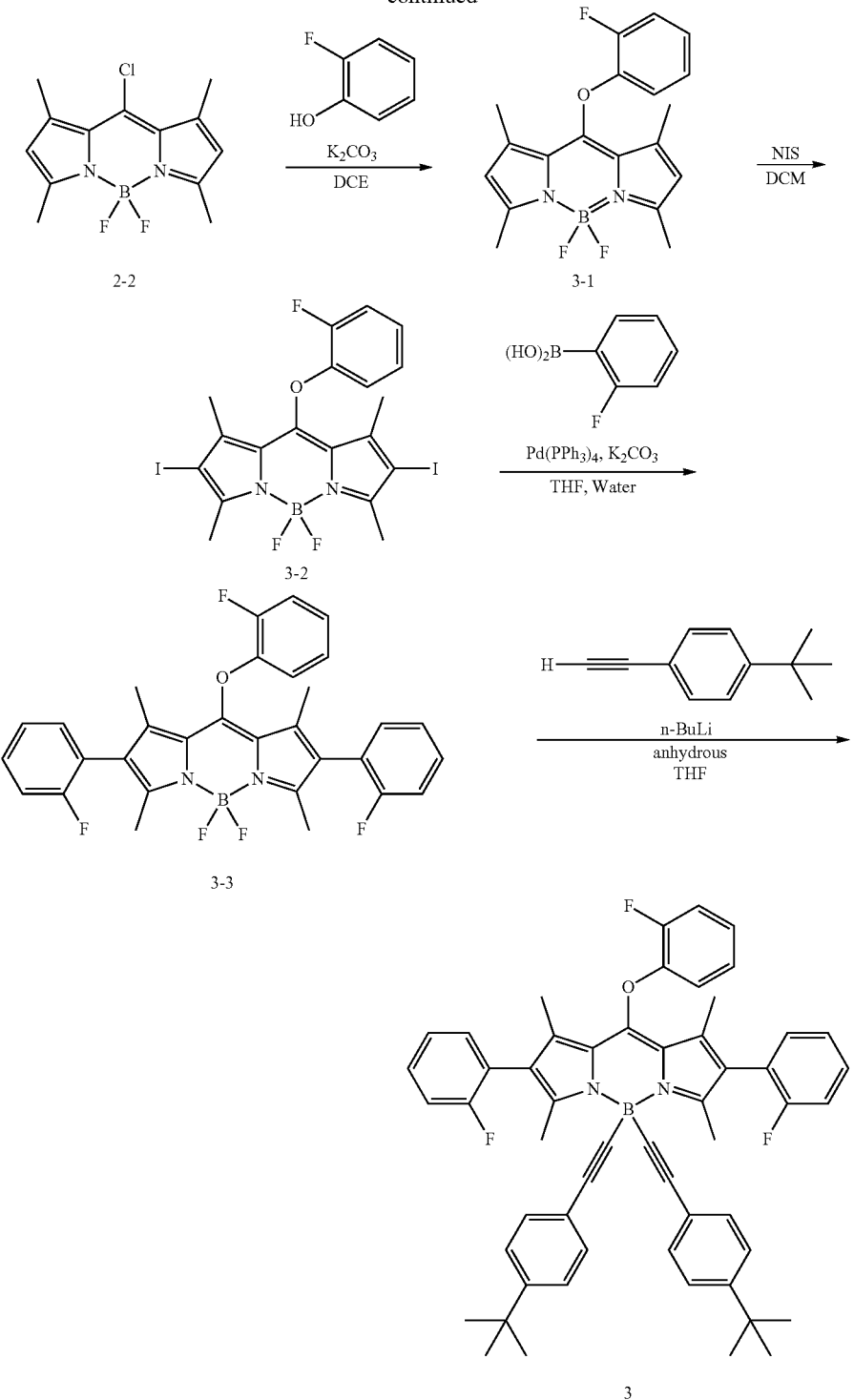

(1) Synthesis of Compound 3-1

3 g of Compound 3-1 was obtained by performing synthesis in the same manner as in the synthesis of Compound 1-3, except that Compound 2-2 and fluorophenol were used instead of Compound 1-2 and phenol, respectively. (Yield: 79%)

(2) Synthesis of Compound 3-2

After 3 g of Compound 3-1 was dissolved in dichloromethane, 3 equivalents of N-iodosuccinimide (NIS) were slowly put thereinto at room temperature, and then a reaction was performed by heating and stirring the resulting mixture at 50° C. After the reaction was terminated, the organic layer was extracted by using a sodium thiosulfate solution and dichloromethane. The extracted organic layer was dried by using sodium sulfate, and then purified into a solid by using methanol to obtain 4.4 g of Compound 3-2. (Yield: 86%)

(3) Synthesis of Compound 3-3

4.4 g of Compound 3-2 and 2.1 equivalents of fluorophenylboronic acid were dissolved in a THF solvent, 5 equivalents of potassium carbonate was dissolved in water, and the two solutions were stirred together. After the combined solution was heated to 80° C., 0.5 equivalent of tetrakis triphenylphosphine palladium (Pd(PPh₃)₄) was put thereinto, and when the reaction was terminated, the organic layer was extracted by using water and chloroform. The extracted organic layer was dried by using sodium sulfate, and purified into a solid by using methanol. 3.2 g of Compound 3-3 was obtained. (Yield: 82%)

(4) Synthesis of Compound 3

After Compound 3-3 and 2.1 equivalents of t-butyl ethynylbenzene were dissolved in an anhydrous THF solvent in a flask, the flask was maintained at −78° C. under a nitrogen atmosphere for about 1 hour. Thereafter, 2.05 equivalents of n-butyllithium (n-BuLi) were slowly put thereinto, and then the temperature was slowly increased to room temperature. After the reaction was terminated, the organic layer was extracted by using water and chloroform. The extracted organic layer was dried by using sodium sulfate and purified into a solid by using methanol to obtain 2.7 g of Compound 3. (Yield: 56%)

HR LC/MS/MS m/z calcd for $C_{55}H_{50}BF_3N_2O$ (M+): 822.3968; found: 822.3965

Preparation Example 4. Synthesis of Compound 4

(1) Synthesis of Compound 4-1

4.2 g of Compound 4-1 was obtained by performing synthesis in the same manner as in the synthesis of Compound 1-3, except that methoxy phenol was used instead of phenol. (Yield: 76%)

(2) Synthesis of Compound 4-2

4.2 g of Compound 4-1, 5 equivalents of cyclohexyl trifluoroborate potassium salt, and 10 equivalents of manganese(III) acetate hydrate (Mn(OAc)₃) were put into a DMF solvent, and the resulting mixture was heated to 80° C. or less. When the reaction was terminated, the product was cooled to room temperature, and then water was put thereinto, and the resulting mixture was filtered with a celite pad. The celite pad was dissolved in THF again, and then sodium sulfate was put thereinto, the resulting mixture was dried and filtered. Thereafter, the solvent was removed by reducing pressure, and the residue was purified into a solid by using methanol to obtain 5.3 g of Compound 4-2. (Yield: 62%)

(3) Synthesis of Compound 4

5.3 g of Compound 4-2 was dissolved in a dichloromethane solvent, 3 equivalents of chlorosulfonyl isocyanate (CSI) was put thereinto, and then the resulting mixture was heated to 60° C. or less. When the reaction was terminated, 10 equivalents of DMF were put thereinto, and the resulting mixture was stirred for about 1 hour. The organic layer was extracted by using water and chloroform. The extracted

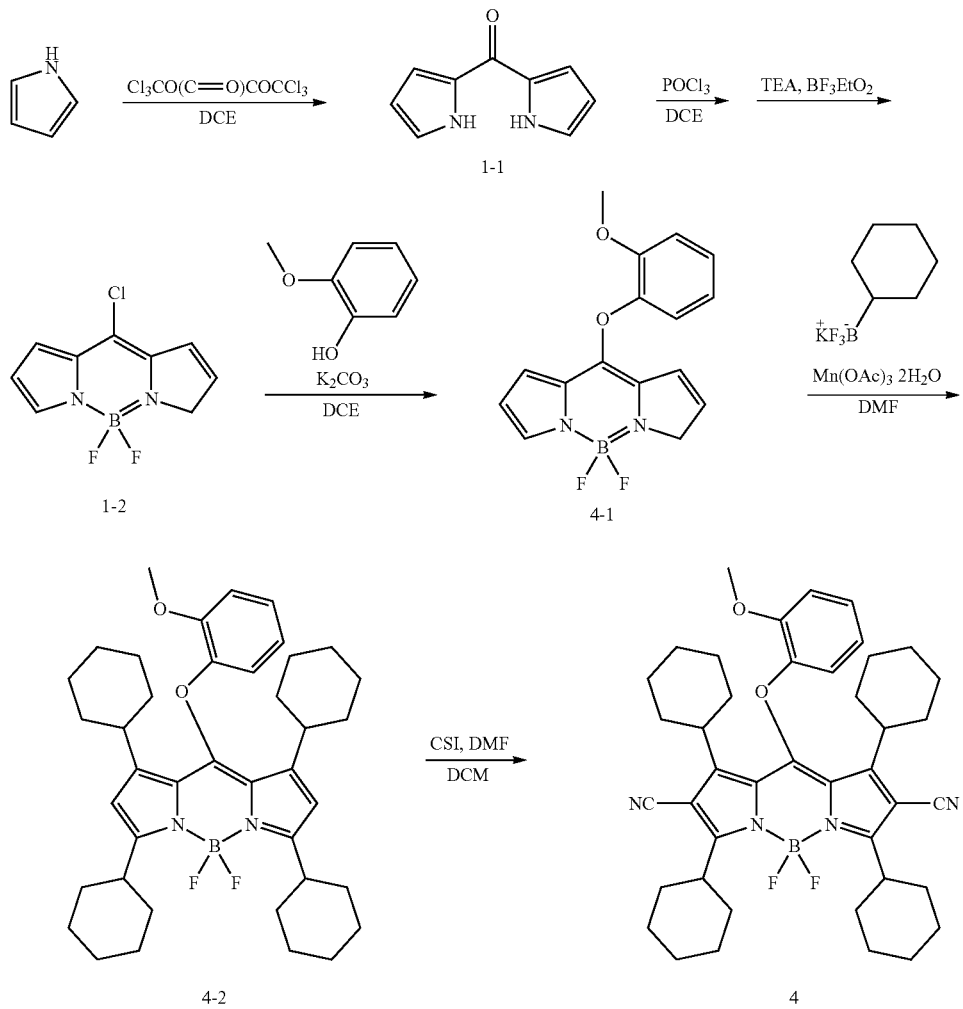

organic layer was dried by using sodium sulfate and purified into a solid by using methanol to obtain 3.8 g of Compound 4. (Yield: 68%)

HR LC/MS/MS m/z calcd for $C_{42}H_{51}BF_2N_4O_2$ (M+): 692.4073; found: 692.4069

Preparation Example 5. Synthesis of Compound 5 pound 4-2, except that Compound 5-1 and methylcyclohexyl trifluoroborate potassium salt were used instead of Compound 4-1 and cyclohexyl trifluoroborate potassium salt, respectively. (Yield: 65%)

(3) Synthesis of Compound 5-3

4.2 g of Compound 5-3 was obtained by performing synthesis in the same manner as in the synthesis of Com-

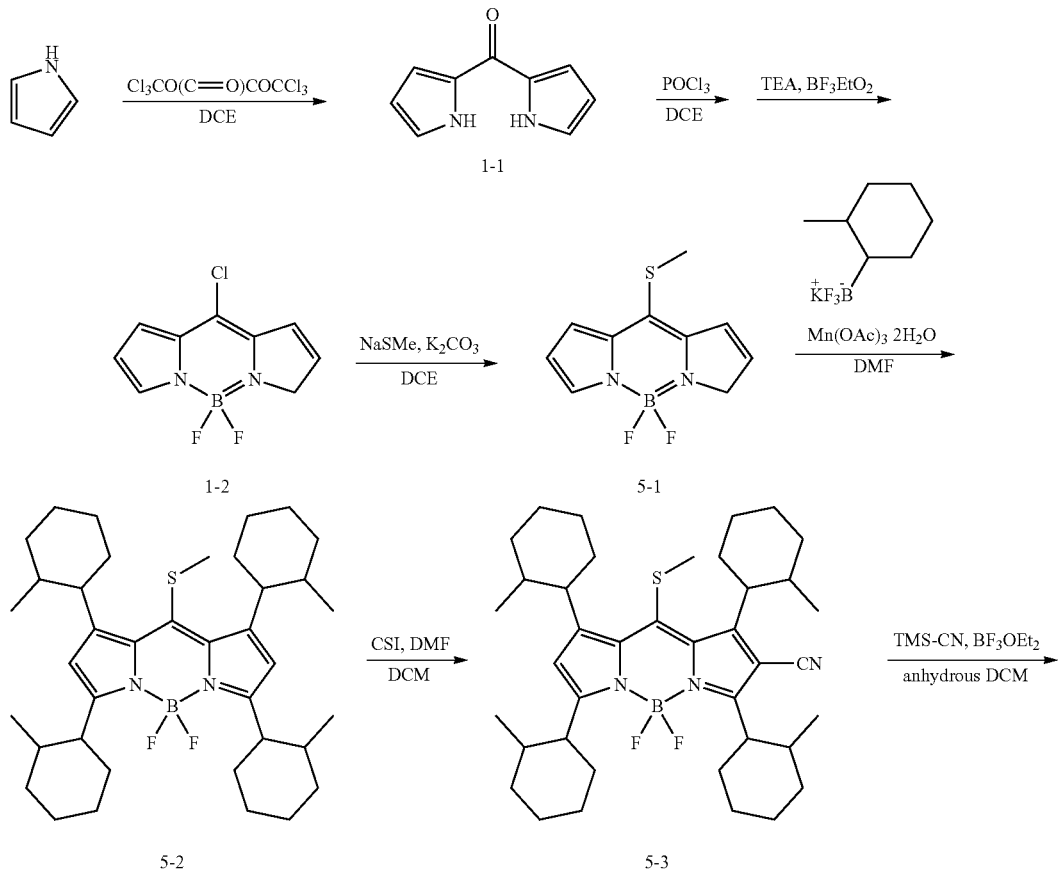

(1) Synthesis of Compound 5-1

3.3 g of Compound 5-1 was obtained by performing synthesis in the same manner as in the synthesis of Compound 1-3, except that sodium methylthiolate (NaSMe) was used instead of phenol. (Yield: 79%)

(2) Synthesis of Compound 5-2

5.6 g of Compound 5-2 was obtained by performing synthesis in the same manner as in the synthesis of Compound 4, except that Compound 5-2 was used instead of Compound 4-2, and 1.2 equivalents of CSI were used. (Yield: 72%)

(4) Synthesis of Compound 5

2.7 g of Compound 5 was obtained by performing synthesis in the same manner as in the synthesis of Compound 2, except that Compound 5-3 was used instead of Compound 2-3. (Yield: 64%)

HR LC/MS/MS m/z calcd for $C_{41}H_{56}BN_5S$ (M+): 661.4349; found: 661.4343

Preparation Example 6. Synthesis of Compound 6

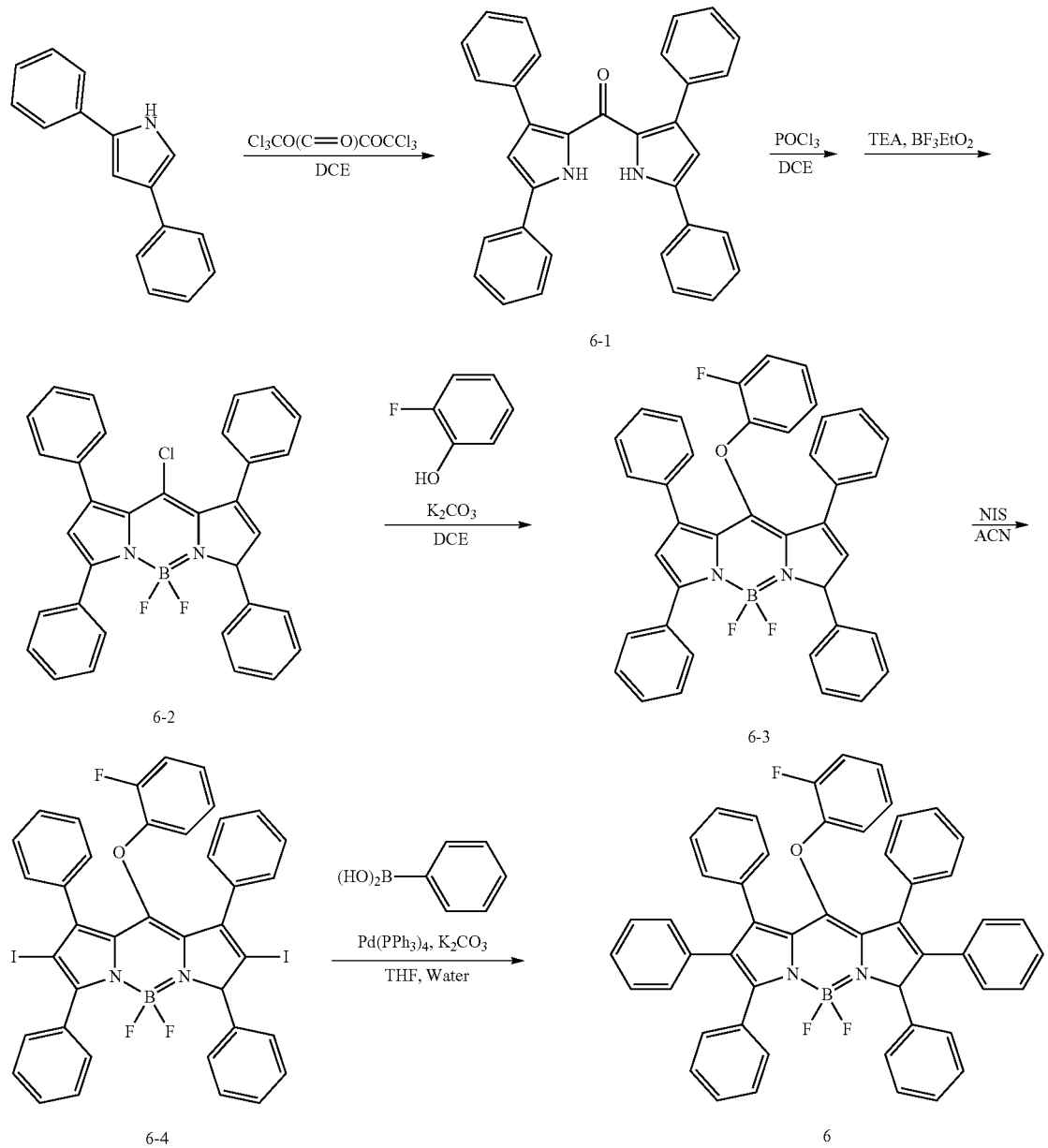

(1) Synthesis of Compound 6-1

3.8 g of Compound 6-1 was obtained by performing synthesis in the same manner as in the synthesis of Compound 1-1, except that diphenylpyrrole was used instead of pyrrole. (Yield: 36%)

(2) Synthesis of Compound 6-2

3.6 g of Compound 6-2 was obtained by performing synthesis in the same manner as in the synthesis of Compound 1-2, except that Compound 6-1 was used instead of Compound 1-1. (Yield: 83%)

(3) Synthesis of Compound 6-3

3.2 g of Compound 6-3 was obtained by performing synthesis in the same manner as in the synthesis of Compound 1-3, except that Compound 6-2 and fluorophenol were used instead of Compound 1-2 and phenol, respectively. (Yield: 80%)

(4) Synthesis of Compound 6-4

3.4 g of Compound 6-4 was obtained by performing synthesis in the same manner as in the synthesis of Compound 3-2, except that Compound 6-3 and acetonitrile (ACN) were used instead of Compound 3-1 and DCM, respectively. (Yield: 75%)

(5) Synthesis of Compound 6
2.1 g of Compound 6 was obtained by performing synthesis in the same manner as in the synthesis of Compound 3-3, except that Compound 6-4 and phenylboronic acid were used instead of Compound 3-2 and fluorophenylboronic acid, respectively. (Yield: 72%)
HR LC/MS/MS m/z calcd for $C_{51}H_{34}BF_3N_2O$ (M+): 758.2716; found: 758.2712
Preparation Example 7. Synthesis of Compound 7
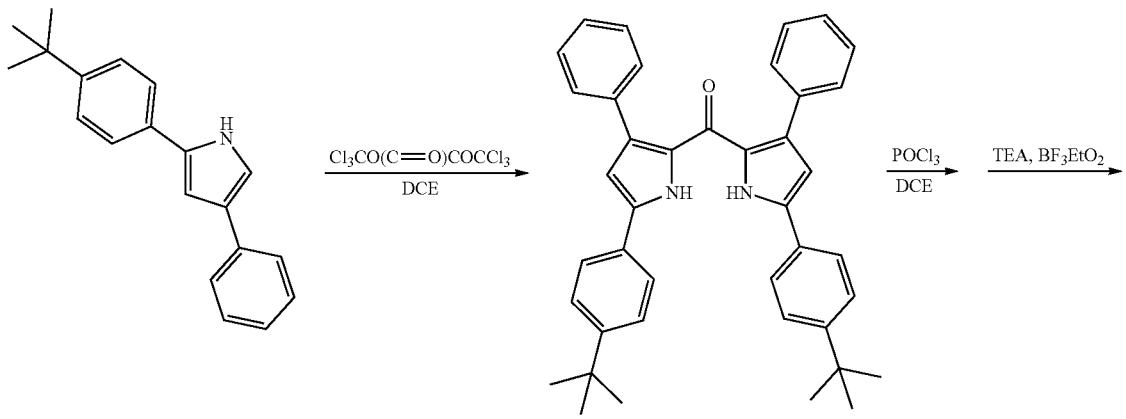
7-1
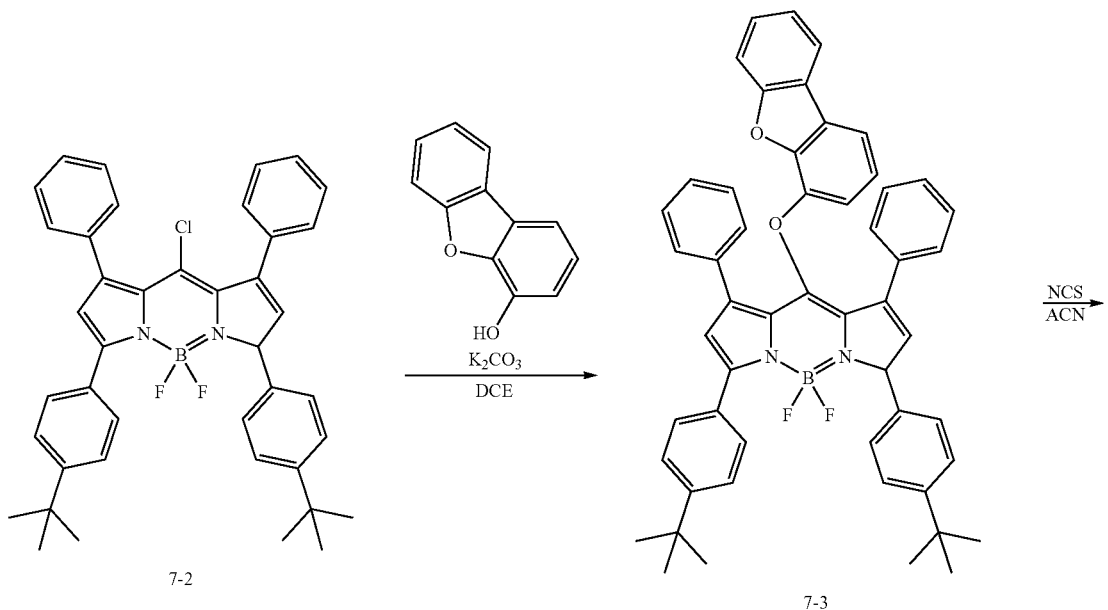
7-2
7-3

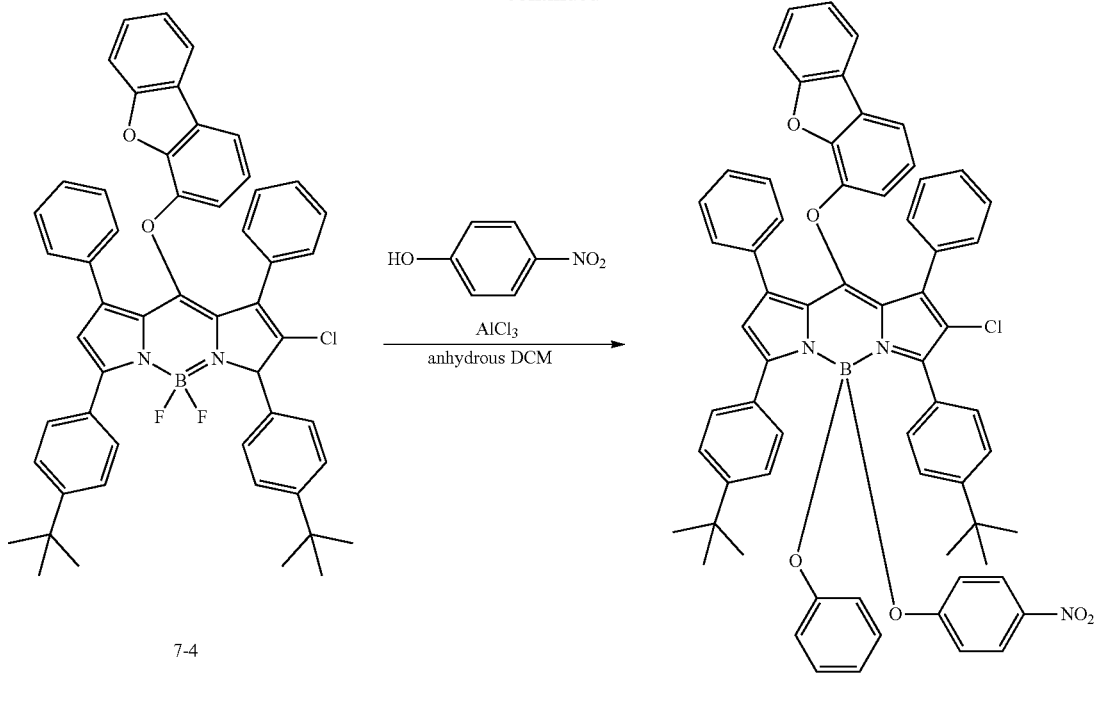

7-4

7

(1) Synthesis of Compound 7-1

3.3 g of Compound 7-1 was obtained by performing synthesis in the same manner as in the synthesis of Compound 1-1, except that 2-(t-butylphenyl)-4-phenyl-pyrrole was used instead of pyrrole. (Yield: 32%)

(2) Synthesis of Compound 7-2

2.9 g of Compound 7-2 was obtained by performing synthesis in the same manner as in the synthesis of Compound 1-2, except that Compound 7-1 was used instead of Compound 1-1. (Yield: 79%)

(3) Synthesis of Compound 7-3

2.9 g of Compound 7-3 was obtained by performing synthesis in the same manner as in the synthesis of Compound 1-3, except that Compound 7-2 and hydroxydibenzofuran were used instead of Compound 1-2 and phenol, respectively. (Yield: 84%)

(4) Synthesis of Compound 7-4

1.9 g of Compound 7-4 was obtained by performing synthesis in the same manner as in the synthesis of Compound 3-2, except that Compound 7-3, N-chlorosuccinimide (NCS), and ACN were used instead of Compound 3-1, NIS, and DCM, respectively. (Yield: 62%)

(5) Synthesis of Compound 7

1.9 g of Compound 7-4 was put into a dichloromethane solvent in which aluminum chloride ($AlCl_3$) was dissolved, and the resulting mixture was heated and stirred at 55° C. under a nitrogen atmosphere for about 10 minutes. Nitrophenol dissolved in a dichloromethane solvent was slowly added dropwise thereto by using a syringe, and the resulting mixture was heated and stirred. After the reaction was terminated, alumina was removed through a silica gel column and the residue was purified to obtain 1.5 g of Compound 7. (Yield: 48%)

HR LC/MS/MS m/z calcd for $C_{65}H_{52}BClN_4O_8$ (M+): 1062.3567; found: 1062.3571

Preparation Example 8. Synthesis of Compound 8
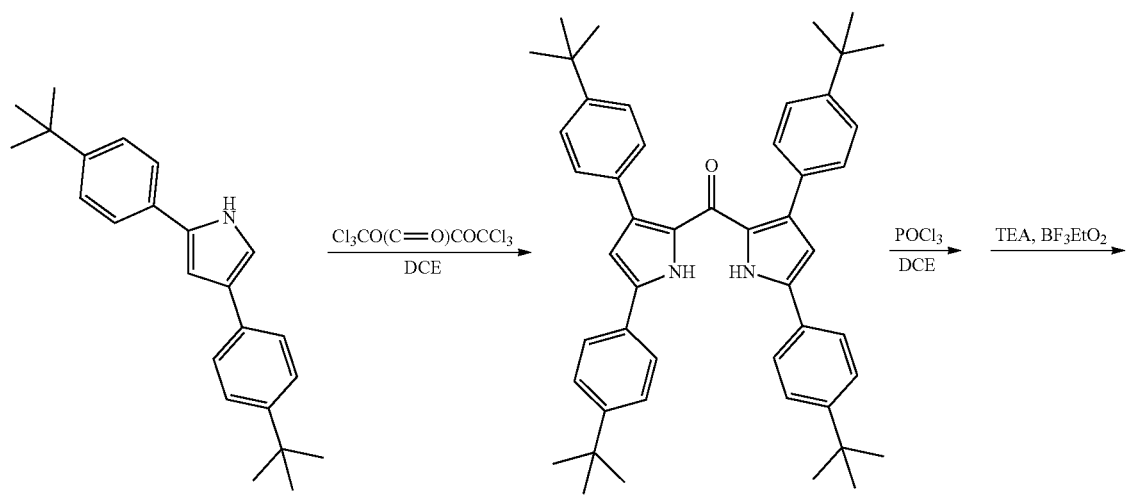
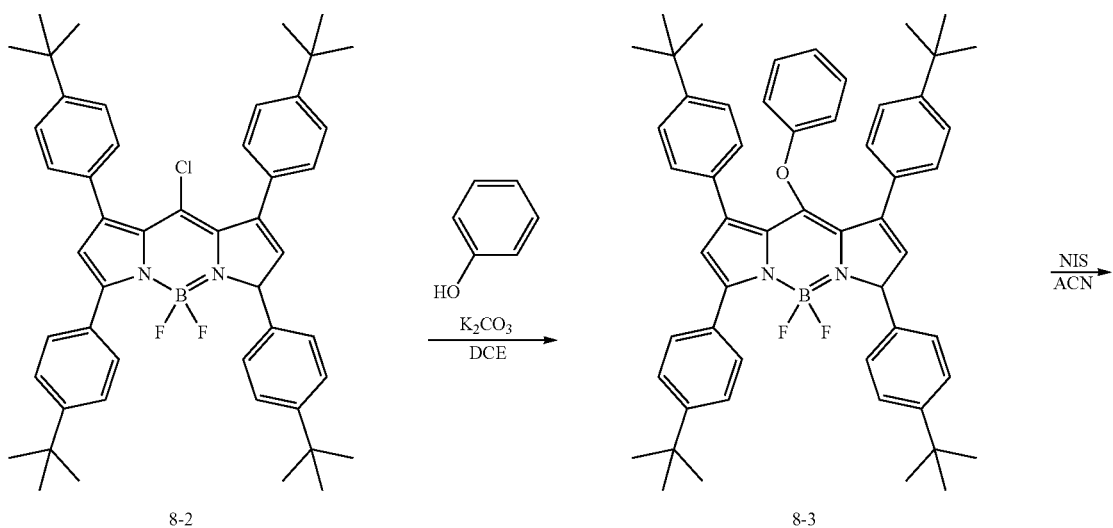
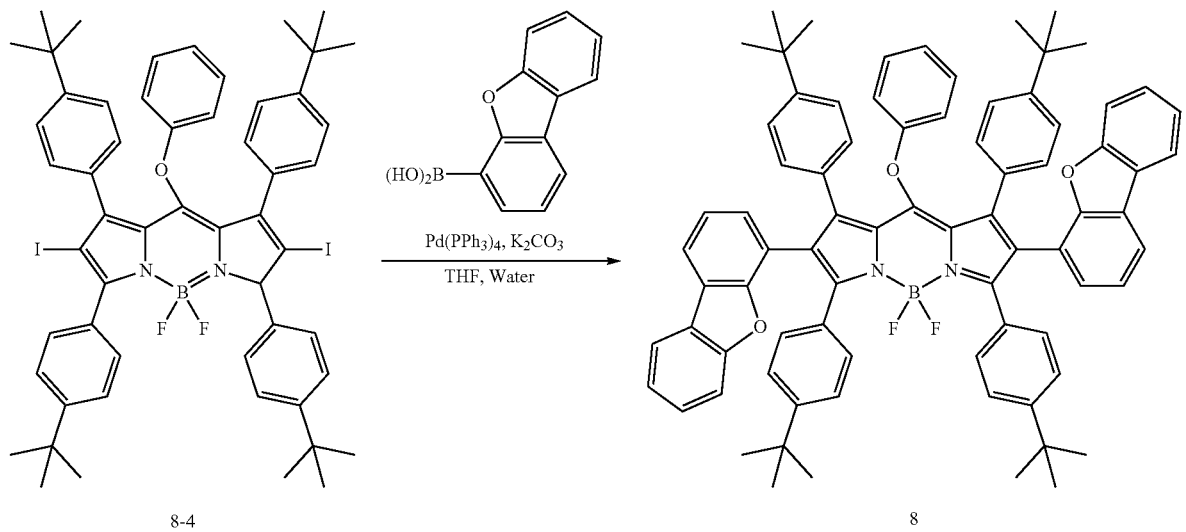

(1) Synthesis of Compound 8-1

3.7 g of Compound 8-1 was obtained by performing synthesis in the same manner as in the synthesis of Compound 1-1, except that bis(t-butylphenyl)pyrrole was used instead of pyrrole. (Yield: 36%)

(2) Synthesis of Compound 8-2

2.5 g of Compound 8-2 was obtained by performing synthesis in the same manner as in the synthesis of Compound 1-2, except that Compound 8-1 was used instead of Compound 1-1. (Yield: 62%)

(3) Synthesis of Compound 8-3

2.2 g of Compound 8-3 was obtained by performing synthesis in the same manner as in the synthesis of Compound 1-3, except that Compound 8-2 was used instead of Compound 1-2. (Yield: 83%)

(4) Synthesis of Compound 8-4

2.2 g of Compound 8-4 was obtained by performing synthesis in the same manner as in the synthesis of Compound 3-2, except that Compound 8-3 and CAN were used instead of Compound 3-1 and DCM, respectively. (Yield: 76%)

(5) Synthesis of Compound 8

2 g of Compound 8 was obtained by performing synthesis in the same manner as in the synthesis of Compound 3-3, except that Compound 8-4 and dibenzofuran boronic acid were used instead of Compound 3-2 and fluorophenylboronic acid, respectively. (Yield: 87%)

HR LC/MS/MS m/z calcd for $C_{79}H_{71}BF_2N_2O_3$ (M+): 1144.5526; found: 1144.5531

Preparation Example 9. Synthesis of Compound 9

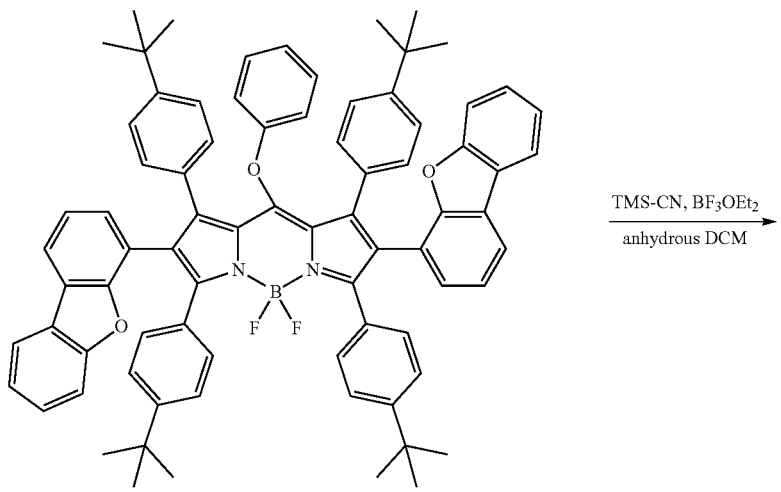

8

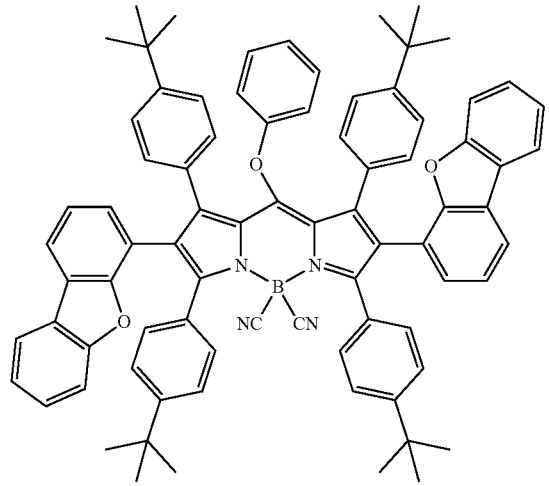

9

1.1 g of Compound 9 was obtained by performing synthesis in the same manner as in the synthesis of Compound 5, except that Compound 8 was used instead of Compound 5-3. (Yield: 73%)
HR LC/MS/MS m/z calcd for $C_{81}H_{71}BN_4O_3$ (M+): 1158.5619; found: 1158.5622
Preparation Example 10. Synthesis of Compound 10
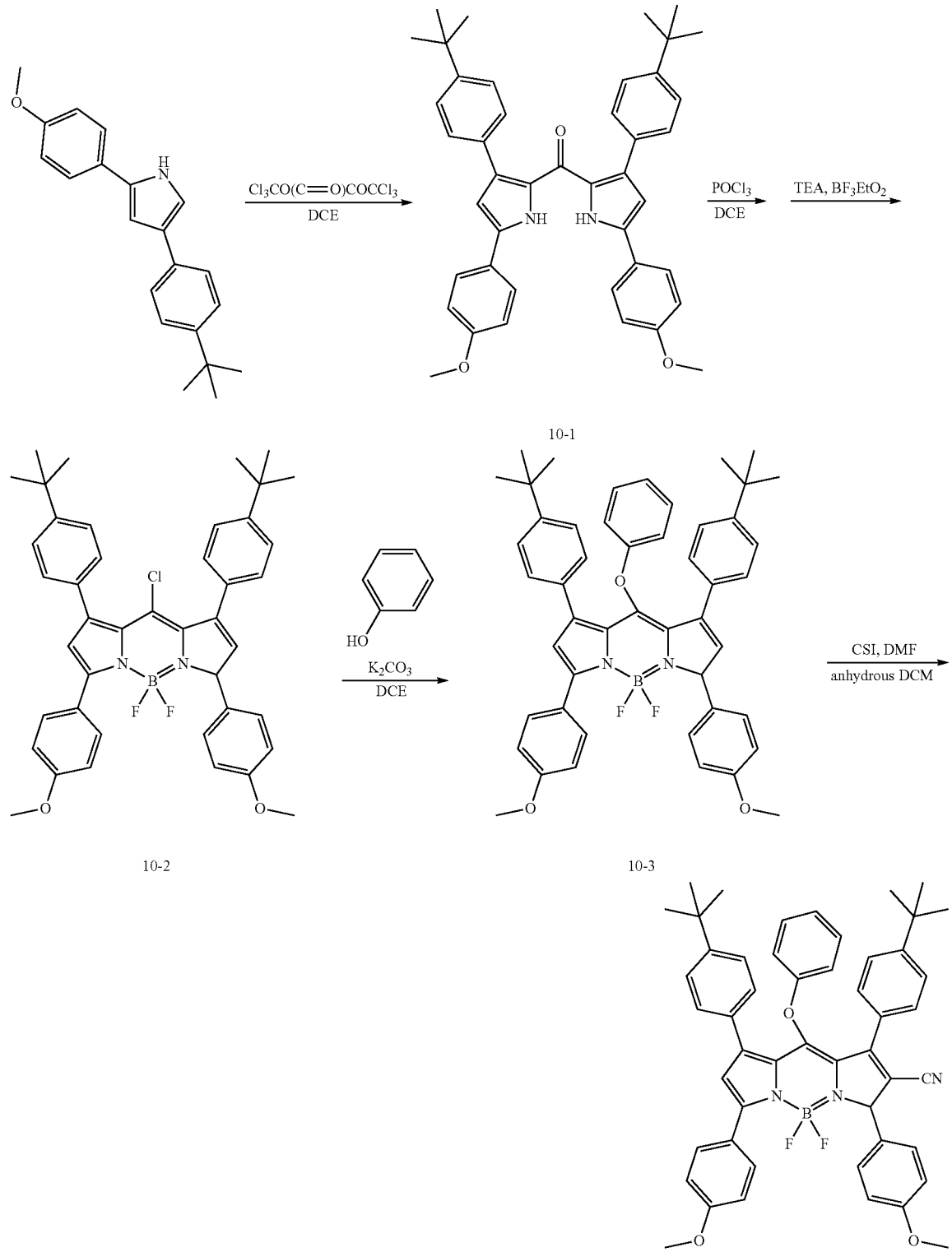

(1) Synthesis of Compound 10-1

3.5 g of Compound 10-1 was obtained by performing synthesis in the same manner as in the synthesis of Compound 1-1, except that 2-methoxyphenyl-4-(t-butylphenyl) pyrrole was used instead of pyrrole. (Yield: 34%)

(2) Synthesis of Compound 10-2

2.1 g of Compound 10-2 was obtained by performing synthesis in the same manner as in the synthesis of Compound 1-2, except that Compound 10-1 was used instead of Compound 1-1. (Yield: 56%)

(3) Synthesis of Compound 10-3

1.8 g of Compound 10-3 was obtained by performing synthesis in the same manner as in the synthesis of Compound 1-3, except that Compound 10-2 was used instead of Compound 1-2. (Yield: 79%)

(4) Synthesis of Compound 10

1.3 g of Compound 10 was obtained by performing synthesis in the same manner as in the synthesis of Compound 4, except that Compound 10-3 was used instead of Compound 4-2 and 1.5 equivalents of CSI were used. (Yield: 69%)

HR LC/MS/MS m/z calcd for $C_{50}H_{46}BF_2N_3O_3$ (M+): 785.3600; found: 785.3602

Preparation Example 11. Synthesis of Compound 11

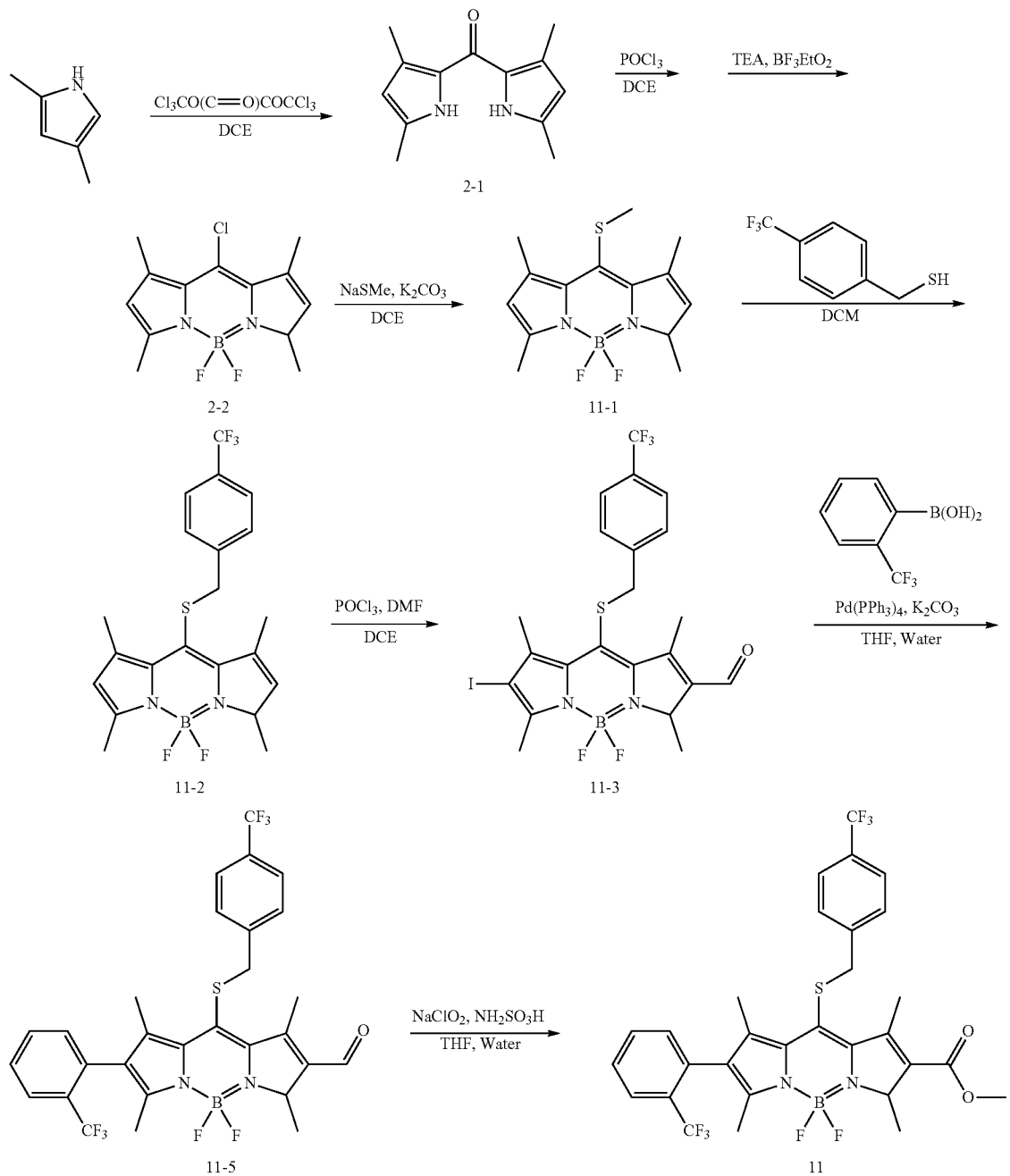

(1) Synthesis of Compound 11-1

4 g of Compound 11-1 was obtained by performing synthesis in the same manner as in the synthesis of Compound 5-1, except that Compound 2-2 was used instead of Compound 1-2. (Yield: 77%)

(2) Synthesis of Compound 11-2

4 g of Compound 11-1 was dissolved in dichloromethane, and then 2 equivalents of trifluoromethyl phenyl methanethiol were put thereinto, and the resulting mixture was heated and stirred for 3 hours. After the reaction was terminated, the organic layer was extracted by using an aqueous sodium thiosulfate solution and chloroform, and the extracted organic layer was dried by using anhydrous magnesium sulfate. Thereafter, the solvent was removed by distillation under reduced pressure, and the residue was recrystallized by using methanol to obtain 4.6 g of Compound 11-2. (Yield: 78%)

(3) Synthesis of Compound 11-3

3.9 g of Compound 11-3 was obtained by performing synthesis in the same manner as in the synthesis of Compound 1-4, except that Compound 11-2 was used instead of Compound 1-3, and 5 equivalents of each of POCl3 and DMF were used. (Yield: 81%)

(4) Synthesis of Compound 11-4

4.1 g of Compound 11-4 was obtained by performing synthesis in the same manner as in the synthesis of Compound 3-2, except that Compound 11-2 was used instead of Compound 3-1, and 1.1 equivalents of NIS were used. (Yield: 83%)

(5) Synthesis of Compound 11-5

3.3 g of Compound 11-5 was obtained by performing synthesis in the same manner as in the synthesis of Compound 3-3, except that Compound 11-4 was used instead of Compound 3-2, and 1.2 equivalents of trifluoromethylphenyl boronic acid were used instead of fluorophenylboronic acid. (Yield: 80%)

(6) Synthesis of Compound 11

3 g of Compound 11 was obtained by performing synthesis in the same manner as in the synthesis of Compound 1-5, except that Compound 11-5 was used instead of Compound 1-4. (Yield: 86%)

HR LC/MS/MS m/z calcd for $C_{30}H_{25}BF_8N_2O_2S$ (M+): 640.1602; found: 640.1605

Preparation Example 12. Synthesis of Compound 12

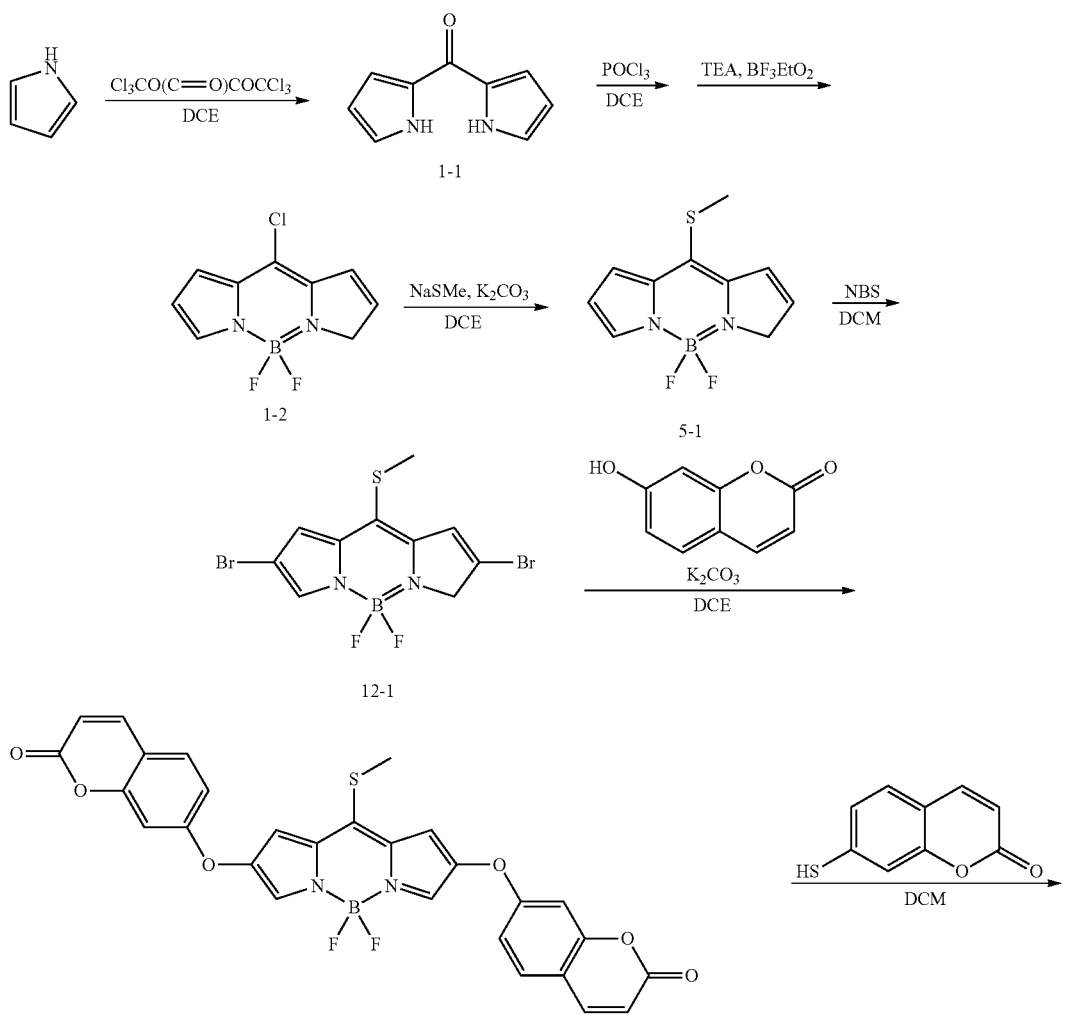

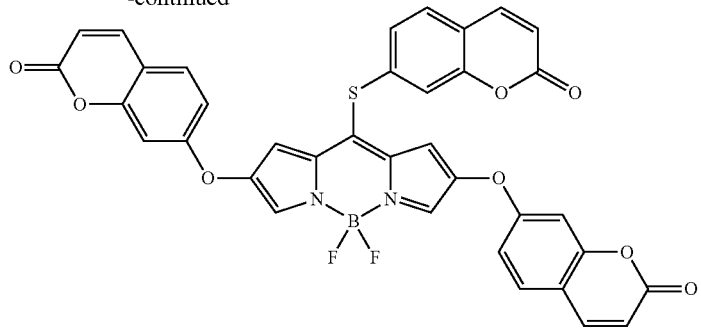

12

(1) Synthesis of Compound 12-1

4.1 g of Compound 12-1 was obtained by performing synthesis in the same manner as in the synthesis of Compound 3-2, except that Compound 5-1 and N-bromosuccinimide (NBS) were used instead of Compound 3-1 and NIS, respectively. (Yield: 84%)

(2) Synthesis of Compound 12-2

4.1 g of Compound 12-1 was dissolved in dichloroethane, 2.1 equivalents of 7-hydroxycoumarin and 4 equivalents of potassium carbonate were put thereinto, and the resulting mixture was heated and stirred. After the reaction was terminated, an extraction was performed by using water and chloroform, and the organic layer was dried by using anhydrous magnesium sulfate. Thereafter, the solvent was removed by distillation under reduced pressure, and the residue was recrystallized by using methanol to obtain 4.6 g of Compound 12-2. (Yield: 82%)

(3) Synthesis of Compound 12

4.3 g of Compound 12 was obtained by performing synthesis in the same manner as in the synthesis of Compound 11-2, except that 7-thiol coumarin and Compound 12-2 were used instead of trifluoromethyl phenyl methanethiol and Compound 11-1, respectively. (Yield: 76%)

HR LC/MS/MS m/z calcd for $C_{36}H_{19}BF_2N_2O_8S$ (M+): 688.0923; found: 688.0920

Preparation Example 13. Synthesis of Compound 13

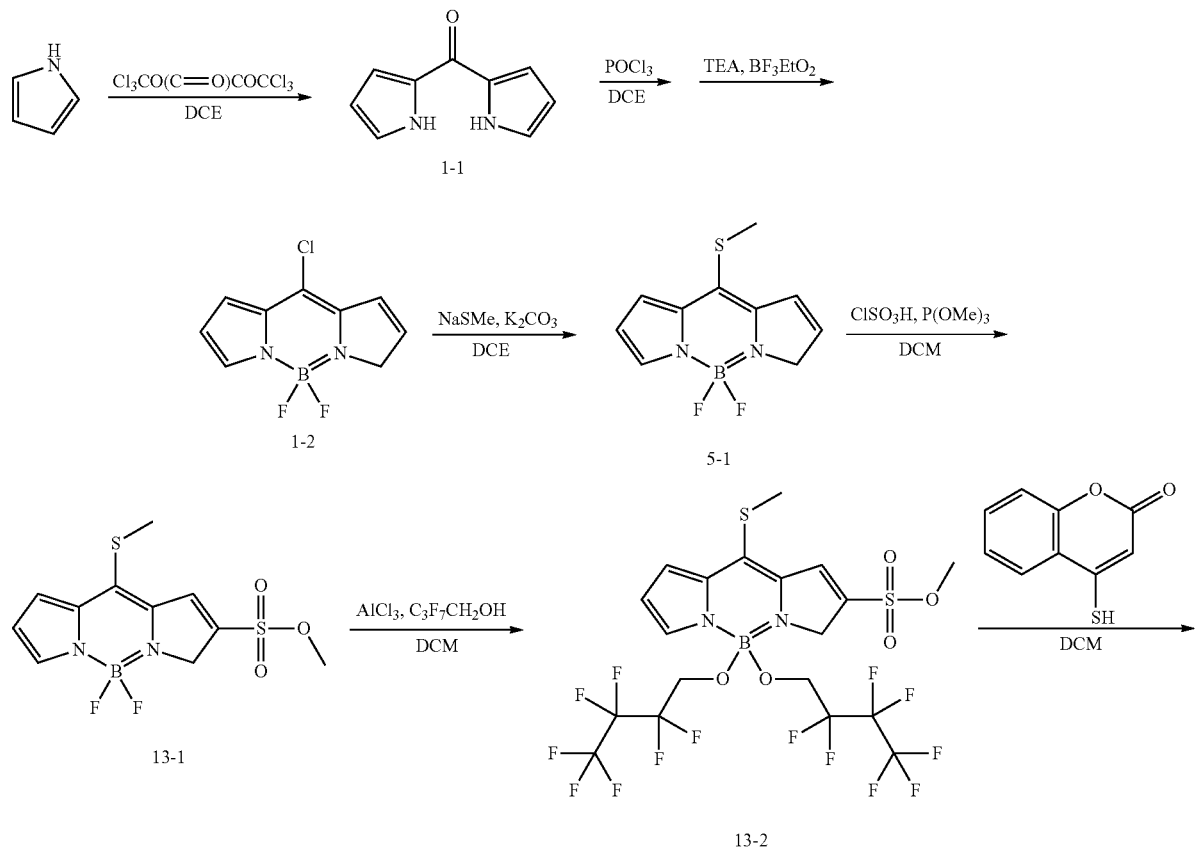

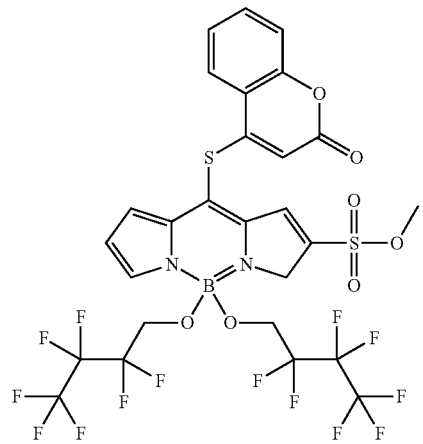

13

(1) Synthesis of Compound 13-1

3 g of Compound 5-1 was dissolved in dichloromethane, and 1.2 equivalents of chlorosulfonic acid (ClSO₃H) were slowly put thereinto at −40° C. under a nitrogen atmosphere. The temperature was slowly increased to room temperature, and then the reaction was confirmed. After confirming disappearance of the starting material, trimethyl phosphite was put thereinto, the resulting mixture was stirred, and then an extraction was performed by using chloroform. The organic layer was dried by using anhydrous magnesium sulfate, and the solvent was removed by distillation under reduced pressure. The residue was sufficiently stirred by using methanol, and then 3.1 g of Compound 13-1 was obtained through recrystallization. (Yield: 79%)

(2) Synthesis of Compound 13-2

3.1 g of Compound 13-1 was dissolved in dichloromethane, 5 equivalents of aluminum chloride were put thereinto, and the resulting mixture was stirred. 3 equivalents of heptafluorobutanol were put thereinto, the resulting mixture was heated and stirred, and then when the reaction was terminated, an extraction was performed by using water and chloroform. The remaining aluminum was removed by laying celite and filtering the organic layer, and moisture was removed by using anhydrous magnesium sulfate. The solvent was removed by distillation under reduced pressure, and then the residue was recrystallized by using methanol to obtain 4.5 g of Compound 13-2. (Yield: 68%)

(3) Synthesis of Compound 13

4.0 g of Compound 13 was obtained by performing synthesis in the same manner as in the synthesis of Compound 11-2, except that 4-thiol coumarin and Compound 13-2 were used instead of trifluoromethyl phenyl methanethiol and Compound 11-1, respectively. (Yield: 75%)

HR LC/MS/MS m/z calcd for $C_{27}H_{17}BF_{14}N_2O_7S_2$ (M+): 822.0347; found: 822.0351

Preparation Example 14. Synthesis of Compound 14

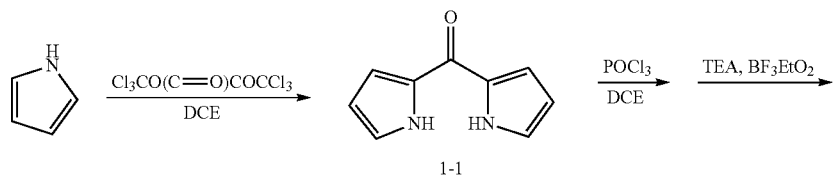

1-1

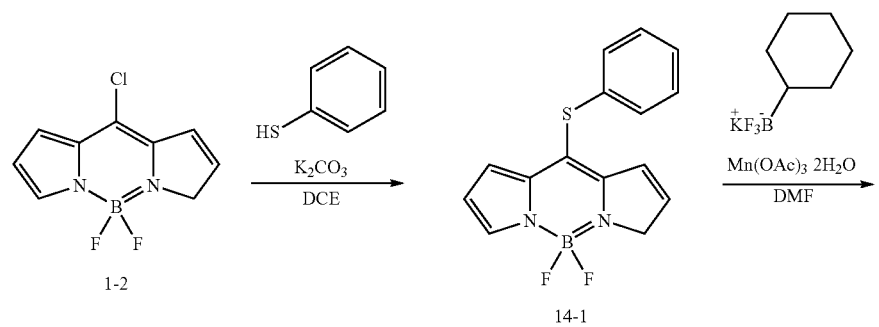

1-2

14-1

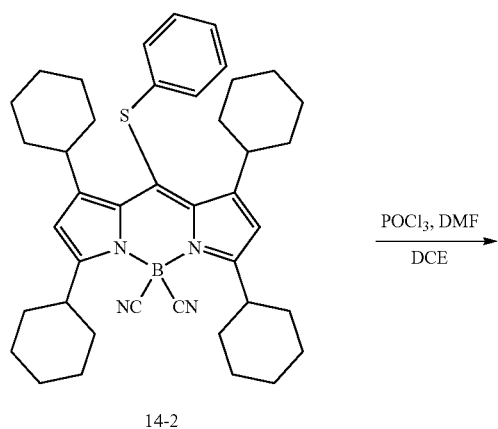

14-2

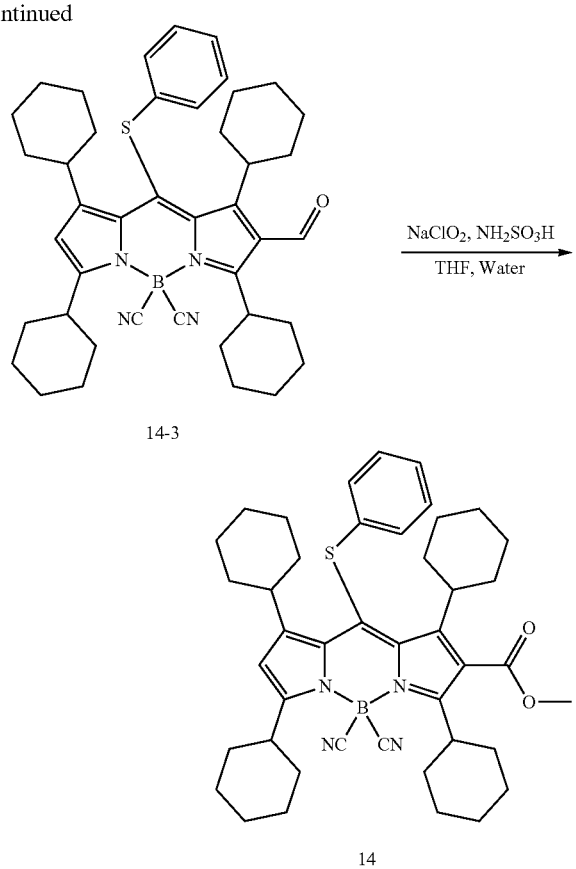

14-3

14

(1) Synthesis of Compound 14-1

3.2 g of Compound 14-1 was obtained by performing synthesis in the same manner as in the synthesis of Compound 1-3, except that thiophenol was used instead of phenol. (Yield: 82%)

(2) Synthesis of Compound 14-2

4.3 g of Compound 14-2 was obtained by performing synthesis in the same manner as in the synthesis of Compound 4-2, except that Compound 14-1 was used instead of Compound 4-1. (Yield: 63%)

(3) Synthesis of Compound 14-3

3.6 g of Compound 14-3 was obtained by performing synthesis in the same manner as in the synthesis of Compound 1-4, except that Compound 14-2 was used instead of Compound 1-3, and 5 equivalents of each of $POCl_3$ and DMF were used. (Yield: 82%)

(4) Synthesis of Compound 14

3.1 g of Compound 14 was obtained by performing synthesis in the same manner as in the synthesis of Compound 1-5, except that Compound 14-3 was used instead of Compound 1-4. (Yield: 83%)

HR LC/MS/MS m/z calcd for $C_{43}H_{53}BN_4O_2S$ (M+): 700.3982; found: 700.3985

Preparation Example 15. Synthesis of Compound 15

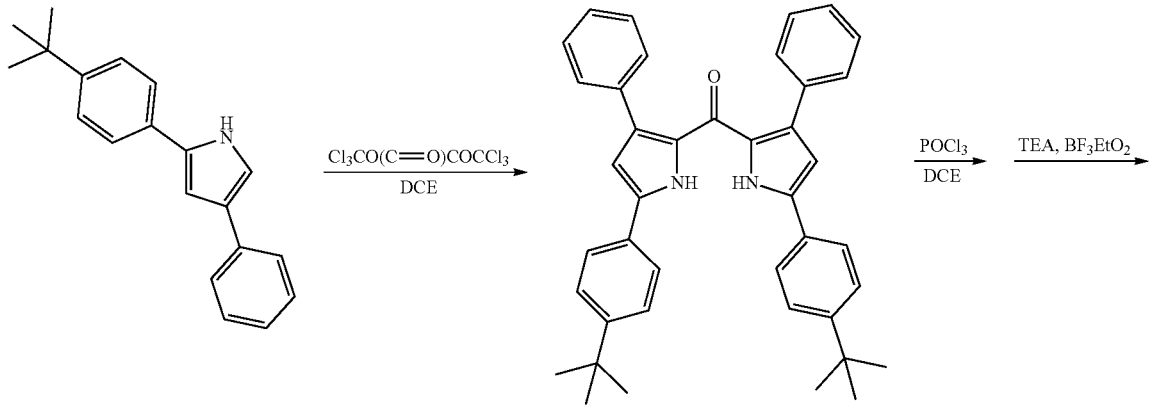

7-1

-continued
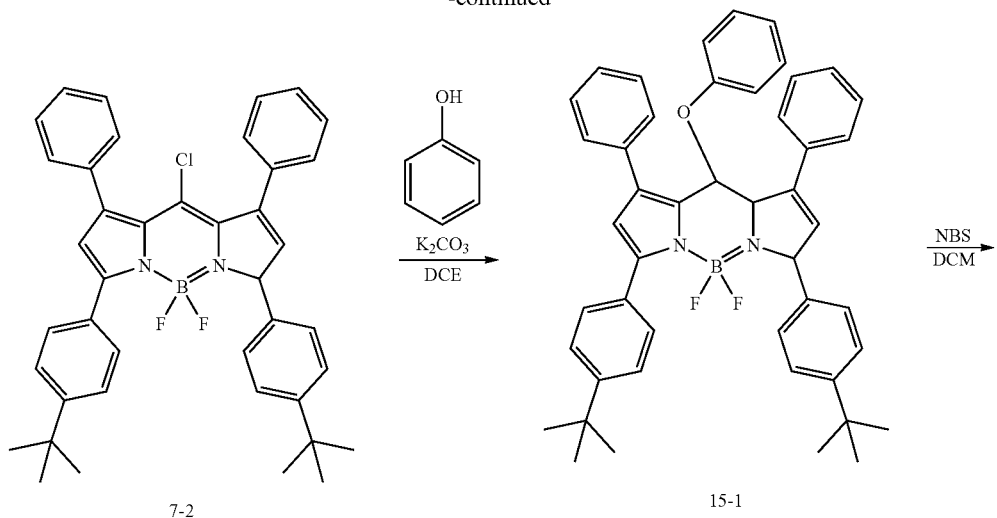
7-2　　15-1
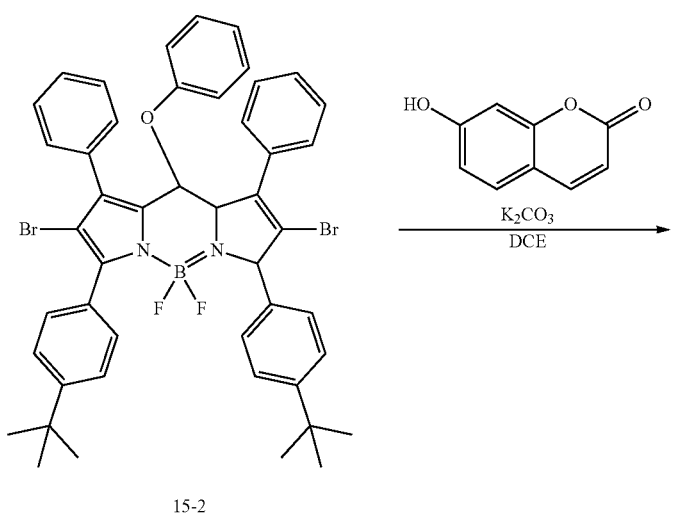
15-2
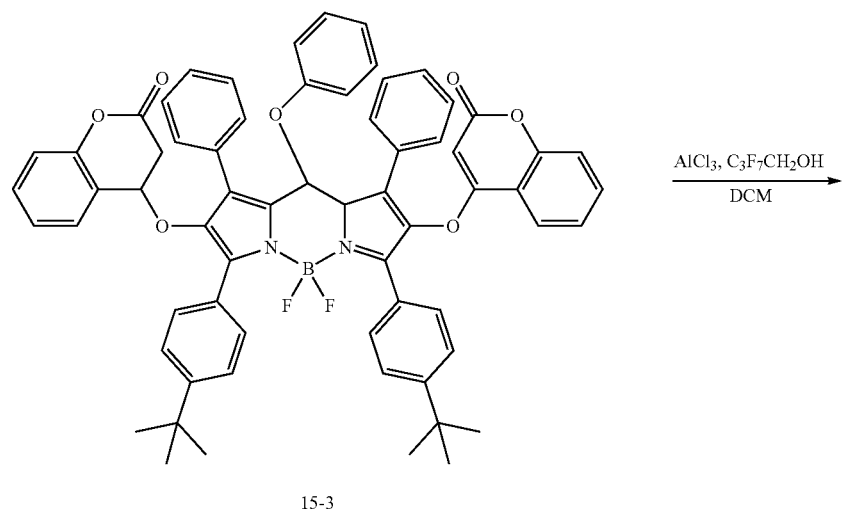
15-3

-continued

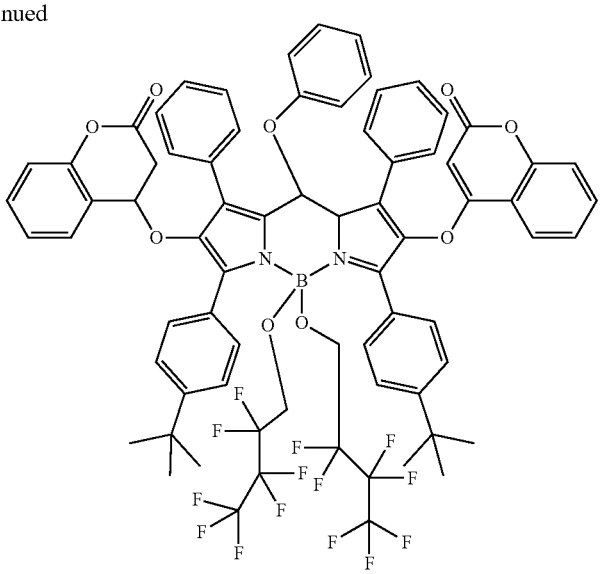

15

(1) Synthesis of Compound 15-1

4.3 g of Compound 15-1 was obtained by performing synthesis in the same manner as in the synthesis of Compound 1-3, except that Compound 7-2 was used instead of Compound 1-2. (Yield: 79%)

(2) Synthesis of Compound 15-2

4.2 g of Compound 15-2 was obtained by performing synthesis in the same manner as in the synthesis of Compound 3-2, except that Compound 15-1 and NBS were used instead of Compound 3-1 and NIS, respectively. (Yield: 80%)

(3) Synthesis of Compound 15-3

3.9 g of Compound 15-3 was obtained by performing synthesis in the same manner as in the synthesis of Compound 12-2, except that Compound 15-2 was used instead of Compound 12-1. (Yield: 80%)

(4) Synthesis of Compound 15

3.5 g of Compound 15 was obtained by performing synthesis in the same manner as in the synthesis of Compound 13-2, except that Compound 15-3 was used instead of Compound 13-1. (Yield: 66%)

HR LC/MS/MS m/z calcd for $C_{73}H_{55}BF_{14}N_2O_9$ (M+): 1380.3777; found: 1380.3772

Example 1

Compound 1 (maximum absorption wavelength of 502 nm, maximum emission wavelength of 516 nm, and full width half maximum of 29 nm in a toluene solution) being an organic phosphor was dissolved in a solvent xylene to prepare a first solution.

A thermoplastic resin SAN (styrene-acrylonitrile copolymer) was dissolved in a solvent xylene to prepare a second solution. The first solution and the second solution were mixed such that the amount of the organic phosphor was 0.5 part by weight based on 100 parts by weight of SAN, and the mixed solution was uniformly mixed. A solid content and a viscosity in the mixed solution were 20 wt % and 200 cps, respectively. A color conversion film was produced by coating the solution on a PET base material, and then drying the solution.

The brightness spectrum of the produced color conversion film was measured by a spectroradiometer (SR series manufactured by Topcon, Inc.). Specifically, the produced color conversion film was stacked on one surface of a light guide plate of a backlight unit including an LED blue backlight (a maximum light emission wavelength of 450 nm) and the light guide plate, a prism sheet and a DBEF film were stacked on the color conversion film, and then the brightness spectrum of the film was measured. An initial value was set such that the luminance of the blue LED light was 600 nit based on the absence of the color conversion film when the brightness spectrum was measured.

Example 2

An experiment was performed in the same manner as in Example 1, except that Compound 2 (maximum absorption wavelength of 495 nm, maximum emission wavelength of 507 nm, and full width half maximum of 26 nm in a toluene solution) was used instead of Compound 1.

Example 3

An experiment was performed in the same manner as in Example 1, except that Compound 3 (maximum absorption wavelength of 505 nm, maximum emission wavelength of 518 nm, and full width half maximum of 25 nm in a toluene solution) was used instead of Compound 1.

Example 4

An experiment was performed in the same manner as in Example 1, except that Compound 4 (maximum absorption wavelength of 514 nm, maximum emission wavelength of 528 nm, and full width half maximum of 23 nm in a toluene solution) was used instead of Compound 1.

Example 5

An experiment was performed in the same manner as in Example 1, except that Compound 5 (maximum absorption wavelength of 510 nm, maximum emission wavelength of 523 nm, and full width half maximum of 23 nm in a toluene solution) was used instead of Compound 1.

Example 6

An experiment was performed in the same manner as in Example 1, except that Compound 6 (maximum absorption wavelength of 576 nm, maximum emission wavelength of 610 nm, and full width half maximum of 36 nm in a toluene solution) was used instead of Compound 1.

Example 7

An experiment was performed in the same manner as in Example 1, except that Compound 7 (maximum absorption wavelength of 587 nm, maximum emission wavelength of 620 nm, and full width half maximum of 40 nm in a toluene solution) was used instead of Compound 1.

Example 8

An experiment was performed in the same manner as in Example 1, except that Compound 8 (maximum absorption wavelength of 582 nm, maximum emission wavelength of 614 nm, and full width half maximum of 38 nm in a toluene solution) was used instead of Compound 1.

Example 9

An experiment was performed in the same manner as in Example 1, except that Compound 9 (maximum absorption wavelength of 584 nm, maximum emission wavelength of 618 nm, and full width half maximum of 38 nm in a toluene solution) was used instead of Compound 1.

Example 10

An experiment was performed in the same manner as in Example 1, except that Compound 10 (maximum absorption wavelength of 590 nm, maximum emission wavelength of 625 nm, and full width half maximum of 26 nm in a toluene solution) was used instead of Compound 1.

Example 11

An experiment was performed in the same manner as in Example 1, except that Compound 11 (maximum absorption wavelength of 543 nm, maximum emission wavelength of 557 nm, and full width half maximum of 26 nm in a toluene solution) was used instead of Compound 1.

Example 12

An experiment was performed in the same manner as in Example 1, except that Compound 12 (maximum absorption wavelength of 556 nm, maximum emission wavelength of 570 nm, and full width half maximum of 29 nm in a toluene solution) was used instead of Compound 1.

Example 13

An experiment was performed in the same manner as in Example 1, except that Compound 13 (maximum absorption wavelength of 529 nm, maximum emission wavelength of 546 nm, and full width half maximum of 28 nm in a toluene solution) was used instead of Compound 1.

Example 14

An experiment was performed in the same manner as in Example 1, except that Compound 14 (maximum absorption wavelength of 538 nm, maximum emission wavelength of 553 nm, and full width half maximum of 24 nm in a toluene solution) was used instead of Compound 1.

Example 15

An experiment was performed in the same manner as in Example 1, except that Compound 15 (maximum absorption wavelength of 613 nm, maximum emission wavelength of 630 nm, and full width half maximum of 35 nm in a toluene solution) was used instead of Compound 1.

Comparative Example 1

An experiment was performed in the same manner as in Example 1, except that the following compound mPh-BODIPY (maximum absorption wavelength of 503 nm, maximum emission wavelength of 516 nm, and full width half maximum of 26 nm in a toluene solution) was used instead of Compound 1.

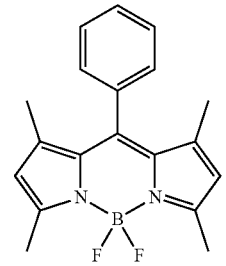

Comparative Example 2

An experiment was performed in the same manner as in Example 1, except that the following compound pPh-BODIPY (maximum absorption wavelength of 570 nm, maximum emission wavelength of 613 nm, and full width half maximum of 42 nm in a toluene solution) was used instead of Compound 1.

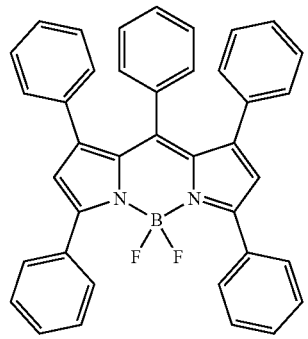

The results of Examples 1 to 15 and Comparative Examples 1 and 2 are shown in the following Table 3.

TABLE 3

| | Compound | Emission wavelength of film λmax (nm) | FWHM (nm) | QY (%) | Abs intensity (1000 hr, %) |
|---|---|---|---|---|---|
| Example 1 | 1 | 532 | 44 | 94 | 96.6 |
| Example 2 | 2 | 524 | 39 | 96 | 94.8 |
| Example 3 | 3 | 532 | 43 | 93 | 96.5 |
| Example 4 | 4 | 542 | 42 | 97 | 99.2 |
| Example 5 | 5 | 537 | 40 | 95 | 95.2 |
| Example 6 | 6 | 626 | 45 | 89 | 95.1 |
| Example 7 | 7 | 637 | 50 | 83 | 94.3 |
| Example 8 | 8 | 628 | 47 | 86 | 98.2 |
| Example 9 | 9 | 632 | 48 | 87 | 99.6 |
| Example 10 | 10 | 641 | 46 | 85 | 98.5 |
| Example 11 | 11 | 574 | 39 | 96 | 96.3 |
| Example 12 | 12 | 584 | 43 | 94 | 97.0 |
| Example 13 | 13 | 559 | 42 | 93 | 95.9 |
| Example 14 | 14 | 567 | 42 | 96 | 97.2 |
| Example 15 | 15 | 643 | 44 | 89 | 95.3 |
| Comparative Example 1 | mPhBODIPY | 530 | 45 | 91 | 91.2 |
| Comparative Example 2 | pPhBODIPY | 605 | 58 | 75 | 93.0 |

In Table 3, λmax, FWHM, QY, and Abs intensity mean the maximum emission wavelength, the full width half maximum, the quantum yield, and the absorption intensity, respectively.

From Table 3, it can be confirmed that the color conversion film according to the present invention has high light emitting efficiency and excellent stability as compared to the Comparative Examples.

The invention claimed is:

1. A compound represented by the following Chemical Formula 1:

[Chemical Formula 1]

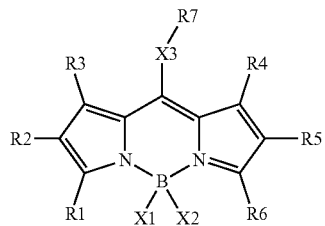

in Chemical Formula 1,
wherein a combination of R1 to R6 is any one from 13A, 14A, 21A, 25A, 44A, 70A, 95A and 126A to 132A as set forth in Table 1, and
wherein a combination of X1 to X3 and R7 is any one from 2B, 3B, 9B, 17B, 23B, 35B, 37B, 46B, 47B, 50B, 51B, 83B and 101B as set forth in Table 2,
provided that when the combination of R1 to R6 is 21A in Table 1, the combination of X1 to X3 and R7 is not 2B in Table 2:

TABLE 1

| #A | R1 | R2 | R3 |
|---|---|---|---|
| 13A | H | (coumarin-7-yl ester linkage) | H |
| 14A | H | (7-oxy-coumarin linkage) | H |
| 21A | CH₃ | H | CH₃ |
| 25A | CH₃ | (2-fluorophenyl) | CH₃ |
| 44A | (phenyl) | (phenyl) | (phenyl) |

TABLE 1-continued
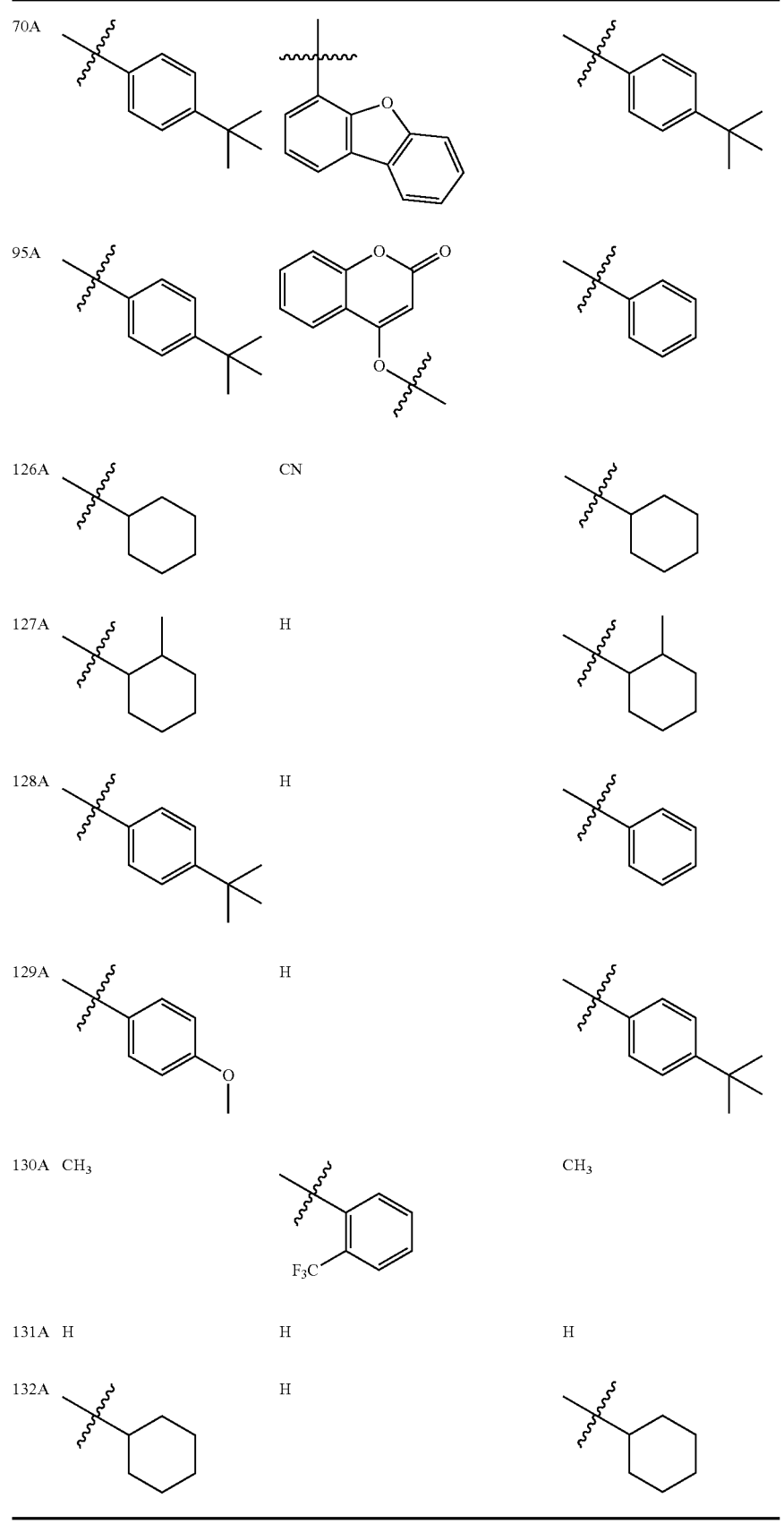

TABLE 1-continued
| | R4 | R5 | R6 |
|---|---|---|---|
| 13A | H | 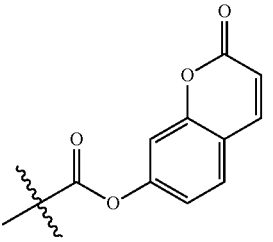 | H |
| 14A | H | 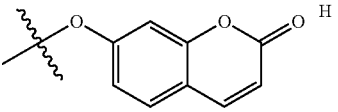 | H |
| 21A | CH₃ | H | CH₃ |
| 25A | CH₃ | 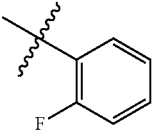 [SMILES: *c1ccccc1F] | CH₃ |
| 44A | 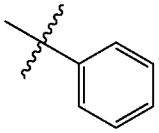 [SMILES: *c1ccccc1] | 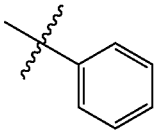 [SMILES: *c1ccccc1] | 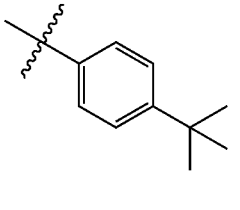 [SMILES: *c1ccc(C(C)(C)C)cc1] |
| 70A | 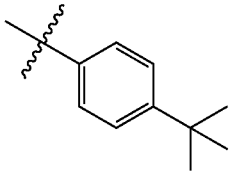 [SMILES: *c1ccc(C(C)(C)C)cc1] | 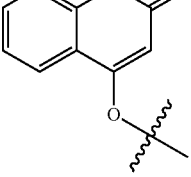 | 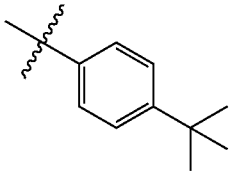 [SMILES: *c1ccc(C(C)(C)C)cc1] |
| 95A | 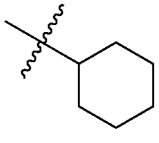 [SMILES: *C1CCCCC1] | 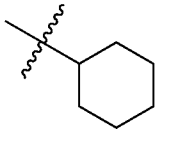 [SMILES: *C1CCCCC1] | 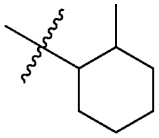 [SMILES: *C1CCCCC1C] |
| 126A | 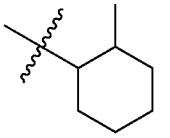 [SMILES: *C1CCCCC1C] | CN |  |
| 127A |  | CN |  |

TABLE 1-continued
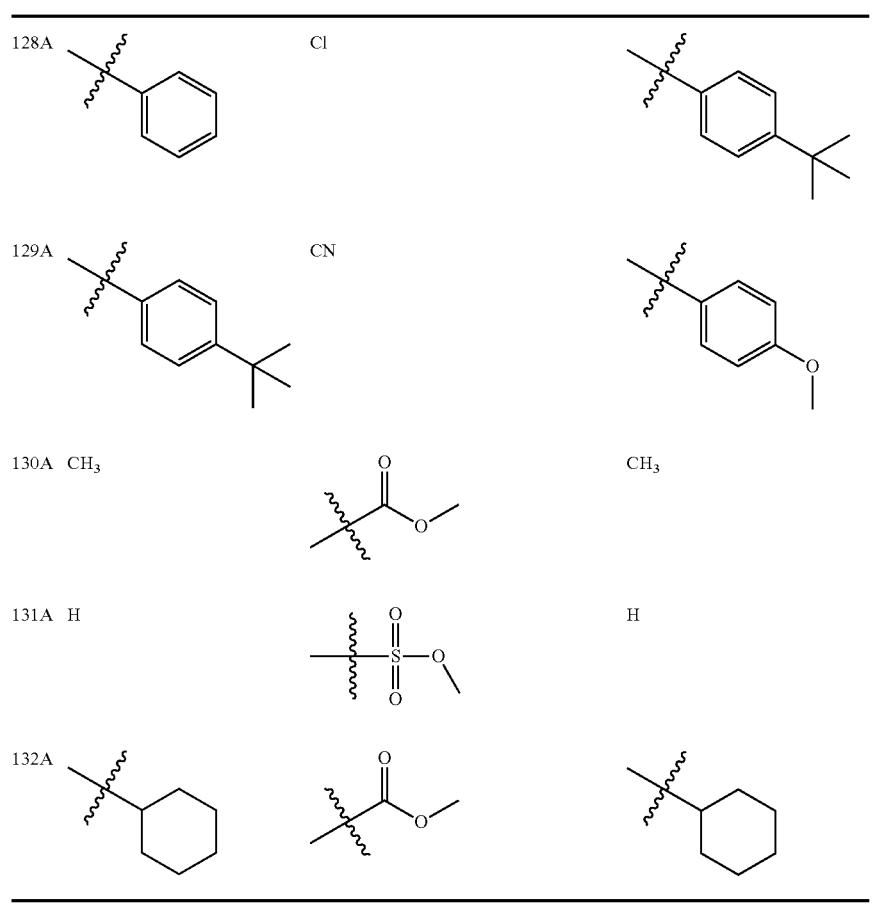
TABLE 2
| #B | X1 | X2 | X3 | R7 |
|---|---|---|---|---|
| 2B | F | F | O | |
| 3B | F | F | O | |
| 9B | CN | CN | O | |
| 17B | | | O | |
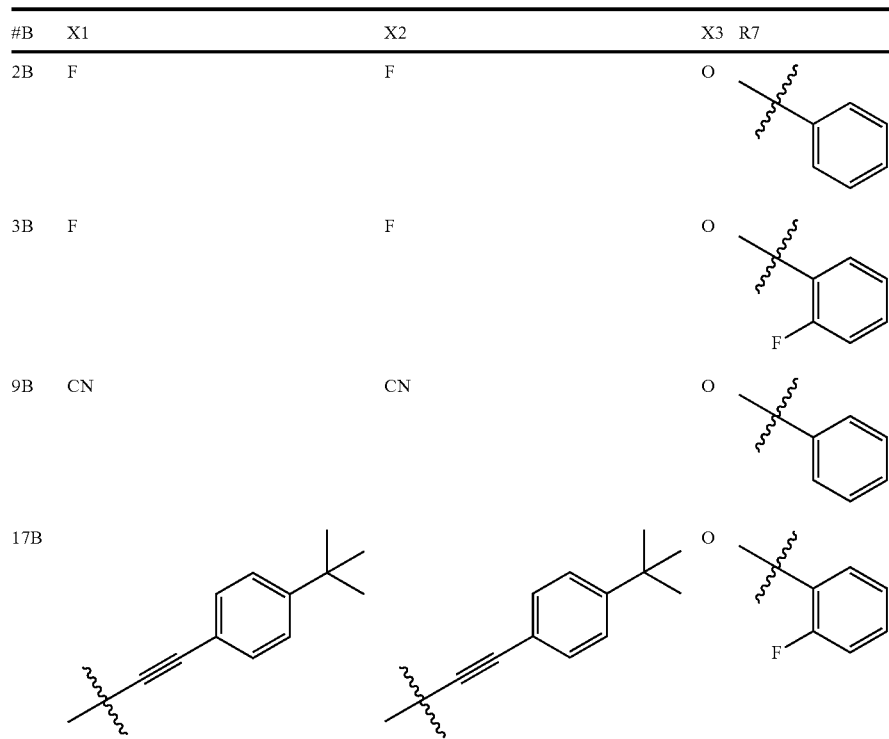

TABLE 2-continued

| #B | X1 | X2 | X3 | R7 |
|---|---|---|---|---|
| 23B | —O—C(=O)—CF₃ | —O—C(=O)—CF₃ | O | phenyl |
| 35B | —O—C₆H₄—NO₂ (para) | —O—C₆H₄—NO₂ (para) | O | dibenzofuranyl |
| 37B | —O—CH₂—CF₂—CF₂—CF₃ | —O—CH₂—CF₂—CF₂—CF₃ | O | phenyl |
| 46B | F | F | S | —CH₂—C₆H₄—CF₃ (para) |
| 47B | F | F | S | coumarin-7-yl (2H-chromen-2-one-7-yl) |
| 50B | CN | CN | S | CH₃ |
| 51B | CN | CN | S | phenyl |
| 83B | —O—CH₂—CF₂—CF₂—CF₃ | —O—CH₂—CF₂—CF₂—CF₃ | S | coumarin-4-yl (2H-chromen-2-one-4-yl) |
| 101B | F | F | O | 2-methoxyphenyl | wherein,

is a moiety bounded to Chemical Formula 1.

2. A color conversion film comprising:
a resin matrix; and
the compound according to claim 1 which is dispersed in the resin matrix.

3. A backlight unit comprising the color conversion film according to claim 2.

4. A display device comprising the backlight unit according to claim 3.

* * * * *